United States Patent
Phebus et al.

(10) Patent No.: US 9,387,544 B2
(45) Date of Patent: Jul. 12, 2016

(54) SMILLED SPLINE APPARATUS AND SMILLING PROCESS FOR MANUFACTURING THE SMILLED SPLINE APPARATUS

(75) Inventors: Dan E. Phebus, Rossville, IN (US); William H. Hayward, Lafayette, IN (US)

(73) Assignee: FAIRFIELD MANUFACTURING COMPANY, INC., Lafayette, IN (US)

( * ) Notice: Subject to any disclaimer, the term of this patent is extended or adjusted under 35 U.S.C. 154(b) by 718 days.

(21) Appl. No.: 13/099,080

(22) Filed: May 2, 2011

(65) Prior Publication Data

US 2012/0282022 A1 Nov. 8, 2012

(51) Int. Cl.
*B25G 3/28* (2006.01)
*B23F 17/00* (2006.01)
(Continued)

(52) U.S. Cl.
CPC .............. *B23F 17/001* (2013.01); *B23C 3/30* (2013.01); *B23C 5/10* (2013.01); *B23F 1/04* (2013.01); *B23F 1/06* (2013.01); *B23P 15/14* (2013.01); *F16D 1/10* (2013.01); *B23C 2265/08* (2013.01); *F16D 2001/103* (2013.01);
(Continued)

(58) Field of Classification Search
CPC ............... Y10T 403/7026; Y10T 409/103975; Y10T 409/105883; B23C 2265/08; B23C 3/30; B23C 5/10; F16D 2001/103; F16D 1/10; B23F 1/04; B23F 1/06; B23F 17/001; B23P 15/14
USPC ............ 403/298, 359.1–359.6, 361; 464/162, 464/182; 409/26, 38, 69
See application file for complete search history.

(56) References Cited

U.S. PATENT DOCUMENTS

| 2,737,855 A | 3/1956 | Wenz |
| 3,285,134 A | 11/1966 | Kehr |

(Continued)

FOREIGN PATENT DOCUMENTS

| CN | 201258963 | 6/2009 |
| CN | 101050792 | 5/2010 |

(Continued)

OTHER PUBLICATIONS

Intellectual Property Office of Australia, Patent Examination Report No. 1, Sep. 4, 2013, Application No. 2011226893, Applicant: Fairfield Manufacturing Company, Inc., pp. 1-5, Australia.

(Continued)

*Primary Examiner* — Gregory Binda
*Assistant Examiner* — Nahid Amiri
(74) *Attorney, Agent, or Firm* — Woodling, Krost and Rust

(57) ABSTRACT

A spline connection apparatus includes a male spline apparatus and a female collar apparatus coupled together. The male spline apparatus includes an external spline and a plurality of first tooth spaces having spline relief portions for tool clearance extending angularly and conically into a shoulder portion and base portion of the male spline apparatus. The female collar apparatus includes and internal spline and a plurality of second tooth spaces having an internal spline relief portion for tool clearance extending angularly and conically into the counterbore engagement surface of the female collar apparatus. The external teeth of the external spline and the internal teeth of the internal are equal in length. The effective face width of the engagement is equal to the length of the external and internal teeth.

21 Claims, 35 Drawing Sheets

(51) Int. Cl.

| | |
|---|---|
| *B23C 3/30* | (2006.01) |
| *B23C 5/10* | (2006.01) |
| *B23F 1/04* | (2006.01) |
| *B23F 1/06* | (2006.01) |
| *F16D 1/10* | (2006.01) |
| *B23P 15/14* | (2006.01) |

(52) U.S. Cl.
CPC . *Y10T 403/7026* (2015.01); *Y10T 409/103975* (2015.01); *Y10T 409/105883* (2015.01)

(56) References Cited

U.S. PATENT DOCUMENTS

| | | | |
|---|---|---|---|
| 3,638,352 A | 2/1972 | Christiansen | |
| 3,851,980 A | 12/1974 | Worth et al. | |
| 3,880,267 A | 4/1975 | Auble et al. | |
| 3,915,059 A | 10/1975 | Pine | |
| 3,991,516 A | 11/1976 | Cicero | |
| 4,106,877 A | 8/1978 | Ferguson | |
| 4,175,404 A | 11/1979 | Schopf | |
| 4,409,873 A | 10/1983 | Kundikoff | |
| 4,454,699 A | 6/1984 | Strobl | |
| 4,732,489 A | 3/1988 | Tanaka | |
| 4,856,167 A | 8/1989 | Sabroff et al. | |
| 5,454,661 A | 10/1995 | Litvin et al. | |
| 5,716,156 A * | 2/1998 | Bayer et al. | 403/282 |
| 5,791,113 A | 8/1998 | Glowa et al. | |
| 6,021,826 A | 2/2000 | Daniell | |
| 6,032,390 A | 3/2000 | Bierwith | |
| 6,045,292 A * | 4/2000 | Placide et al. | 403/359.3 |
| 6,227,775 B1 | 5/2001 | Klammer | |
| 6,230,385 B1 | 5/2001 | Nelson | |
| 6,378,206 B1 | 4/2002 | Minegishi | |
| 6,591,715 B2 | 7/2003 | Avis | |
| 6,675,545 B2 | 1/2004 | Chen et al. | |
| 6,761,008 B2 | 7/2004 | Chen et al. | |
| 6,912,786 B2 | 7/2005 | Jinkins | |
| 7,104,021 B2 | 9/2006 | Apfelthaler | |
| 7,165,910 B2 | 1/2007 | Sundheimer et al. | |
| 7,214,021 B2 | 5/2007 | Caponi | |
| 7,220,083 B2 | 5/2007 | Festeau et al. | |
| 7,387,462 B2 * | 6/2008 | Hacker | 403/359.6 |
| 7,506,533 B2 * | 3/2009 | Bailey et al. | 73/23.35 |
| 7,577,491 B2 | 8/2009 | Chen et al. | |
| 7,784,394 B2 | 8/2010 | Nishimura | |
| 7,806,634 B2 | 10/2010 | Festeau et al. | |
| 7,905,687 B2 | 3/2011 | Dufour et al. | |
| 2001/0002756 A1 | 6/2001 | Baerts et al. | |
| 2002/0025219 A1 | 2/2002 | Horikawa | |
| 2002/0110415 A1 | 8/2002 | Dowling, Jr. et al. | |
| 2002/0159827 A1 | 10/2002 | Bentley | |
| 2003/0099509 A1 * | 5/2003 | Narasimhan et al. | 403/359.1 |
| 2003/0235479 A1 | 12/2003 | Chihara | |
| 2004/0052575 A1 | 3/2004 | Draggoo et al. | |
| 2004/0081513 A1 | 4/2004 | Huber et al. | |
| 2004/0131419 A1 | 7/2004 | Hammond | |
| 2005/0171631 A1 | 8/2005 | Arvin | |
| 2005/0254890 A1 | 11/2005 | Schulz | |
| 2005/0271467 A1 | 12/2005 | Ong | |
| 2006/0291954 A1 | 12/2006 | Igarashi et al. | |
| 2007/0048082 A1 | 3/2007 | Hoffmann et al. | |
| 2007/0077116 A1 | 4/2007 | Leimann | |
| 2007/0104535 A1 | 5/2007 | Valovick | |
| 2007/0140786 A1 | 6/2007 | Sundheimer et al. | |
| 2007/0177939 A1 | 8/2007 | Kozlowski et al. | |
| 2007/0183844 A1 | 8/2007 | Steinrisser | |
| 2007/0212167 A1 * | 9/2007 | Chiang | 403/359.1 |
| 2007/0264077 A1 | 11/2007 | Kitahata et al. | |
| 2008/0069636 A1 | 3/2008 | Saito et al. | |
| 2008/0124168 A1 | 5/2008 | Lescure et al. | |
| 2008/0230289 A1 | 9/2008 | Schoon et al. | |
| 2009/0021062 A1 | 1/2009 | Lehmann | |
| 2009/0074506 A1 | 3/2009 | Sugiyama et al. | |
| 2009/0252549 A1 | 10/2009 | Takeuchi et al. | |
| 2009/0317182 A1 | 12/2009 | Szentmihalyi | |
| 2010/0014913 A1 | 1/2010 | Murgatroyd et al. | |
| 2010/0074679 A1 | 3/2010 | Kroneneberg et al. | |
| 2010/0178102 A1 | 7/2010 | Brehmer et al. | |
| 2011/0070020 A1 | 3/2011 | Tabler | |
| 2011/0203897 A1 * | 8/2011 | Keating | 192/112 |
| 2012/0003058 A1 | 1/2012 | Hutter | |
| 2013/0121779 A1 | 5/2013 | Geiser | |

FOREIGN PATENT DOCUMENTS

| | | | |
|---|---|---|---|
| DE | 181934 | 12/1905 | |
| DE | 2159264 A1 * | 6/1973 | F16B 4/004 |
| DE | 3880267 T2 | 4/1993 | |
| DE | 102008063858 A1 | 7/2010 | |
| EP | 1046456 B1 | 1/2011 | |
| GB | 1021819 A1 * | 11/1964 | F16B 4/004 |
| JP | 58211020 A * | 12/1983 | |
| JP | 63-29638 | 2/1988 | |
| JP | 1-87334 | 6/1989 | |
| JP | 7-279983 | 10/1995 | |
| JP | 2005205923 | 8/2005 | |
| JP | 200995895 | 5/2009 | |
| JP | 2009250356 | 10/2009 | |

OTHER PUBLICATIONS

New Zealand Patent Application Serial No. 596120, in the Name of Fairfield Manufacturing Company, Inc., Filed Oct. 31, 2011, Examination Report (Office Action) Dated Nov. 4, 2011.

Robert Rich Robins, Tooth Engagement Evaluation of Involute Spline Couplings, Thesis Submitted to the Faculty of Brigham Young University, Department of Mechanical Engineering, Brigham Young University, Dec. 2008.

Australian Government, IP Australia, Patent Examination Report No. 2, Patent Application No. 2011226893, Applicant: Fairfield Manufacturing Company, Inc., Date of Issue: Aug. 18, 2014, pp. 1-3.

Russian Patent Office, Official Action, Application No. 2012102648/02(003809), Applicant: Fairfield Manufacturing Company, Inc., Apr. 15, 2013, pp. 1-10.

Korean Intellectual Property Office, Office Action, Notice Requesting Submission of Opinion, Korean Patent Application No. 10-2011-0125941, Jul. 29, 2013, pp. 1-12.

Korean Intellectual Property Office, Translation of Office Action, Notice Requesting Submission of Opinion, Korean Patent Application No. 10-2011-0125941, Jul. 29, 2013, pp. 1-11.

Korean Intellectual Property Office, Office Action, Notice Requesting Submission of Opinion, Korean Patent Application No. 10-2011-0125941, Jun. 30, 2014, pp. 1-6.

Korean Intellectual Property Office, Translaton of Office Action, Notice Requesting Submission of Opinion, Korean Patent Application No. 10-2011-0125941, Jun. 30, 2014, pp. 1-5.

Japan Patent Office, Notification of Reason for Refusal, Translation of Office Action, Japanese Patent Application No. 2011-235544, Feb. 4, 2014, pp. 1-2.

Korean Intellectual Property Office, Notice Requesting Submission of Opinion, pp. 1-23, Jul. 29, 2013, Korean Patent Application No. 10-2011-0125941, Applicant: Fairfield Manufacturing Company, Inc.

thesis entitled Tooth Engagement Evaluation of Involute Spline Couplings, Brigham Young University, Provo, Robert R. Rollins, Aug. 13, 2008, 121 Pages.

U.S. Appl. No. 14/087,857, Conf. No. 1000, Titled: Smilled Spline Apparatus and Smilling Process for Manufacturing the Smilled Spline Apparatus, Inventors Dan E. Phebus et al., filed Nov. 22, 2013.

* cited by examiner

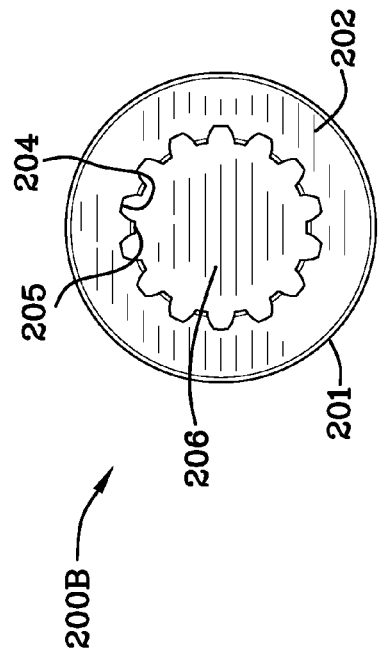
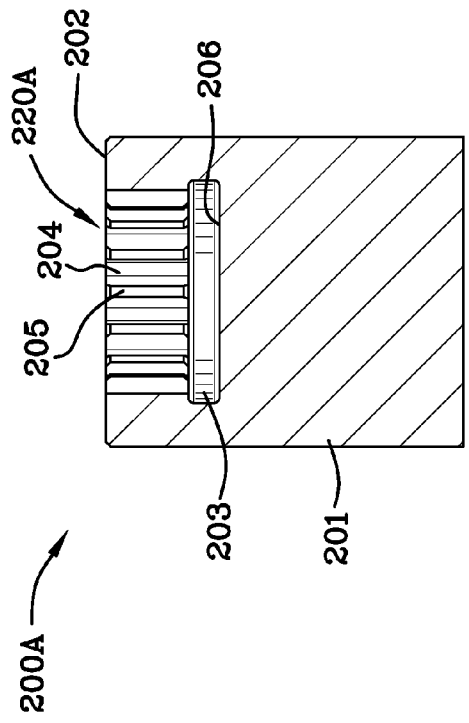
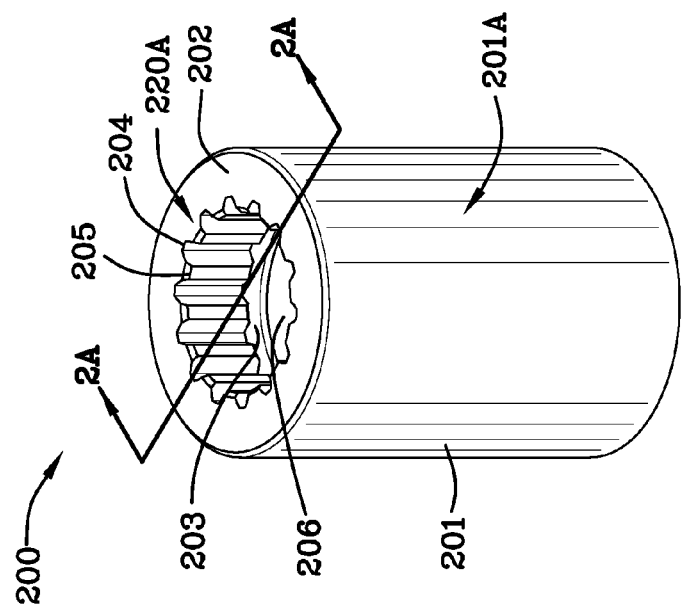

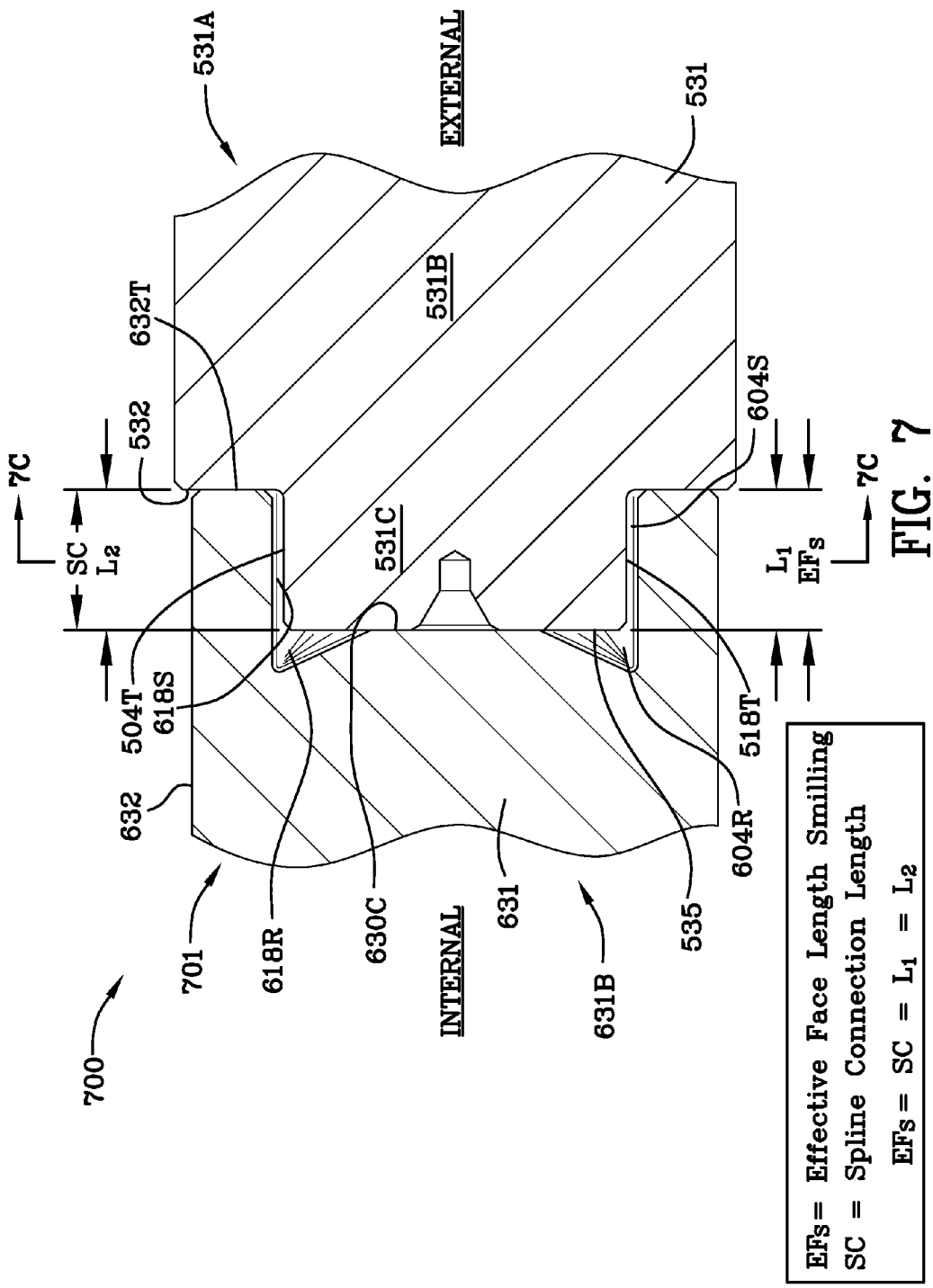

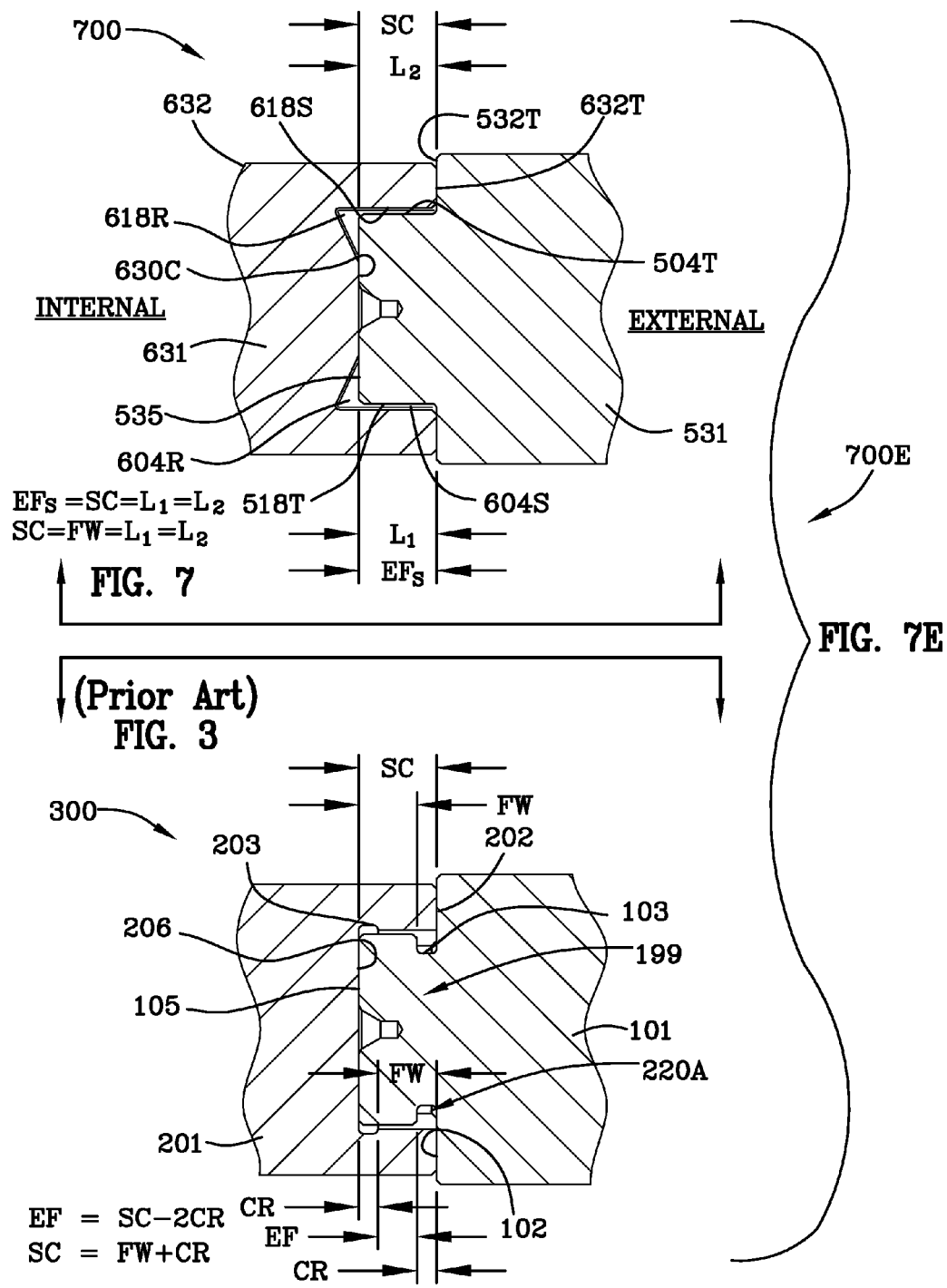

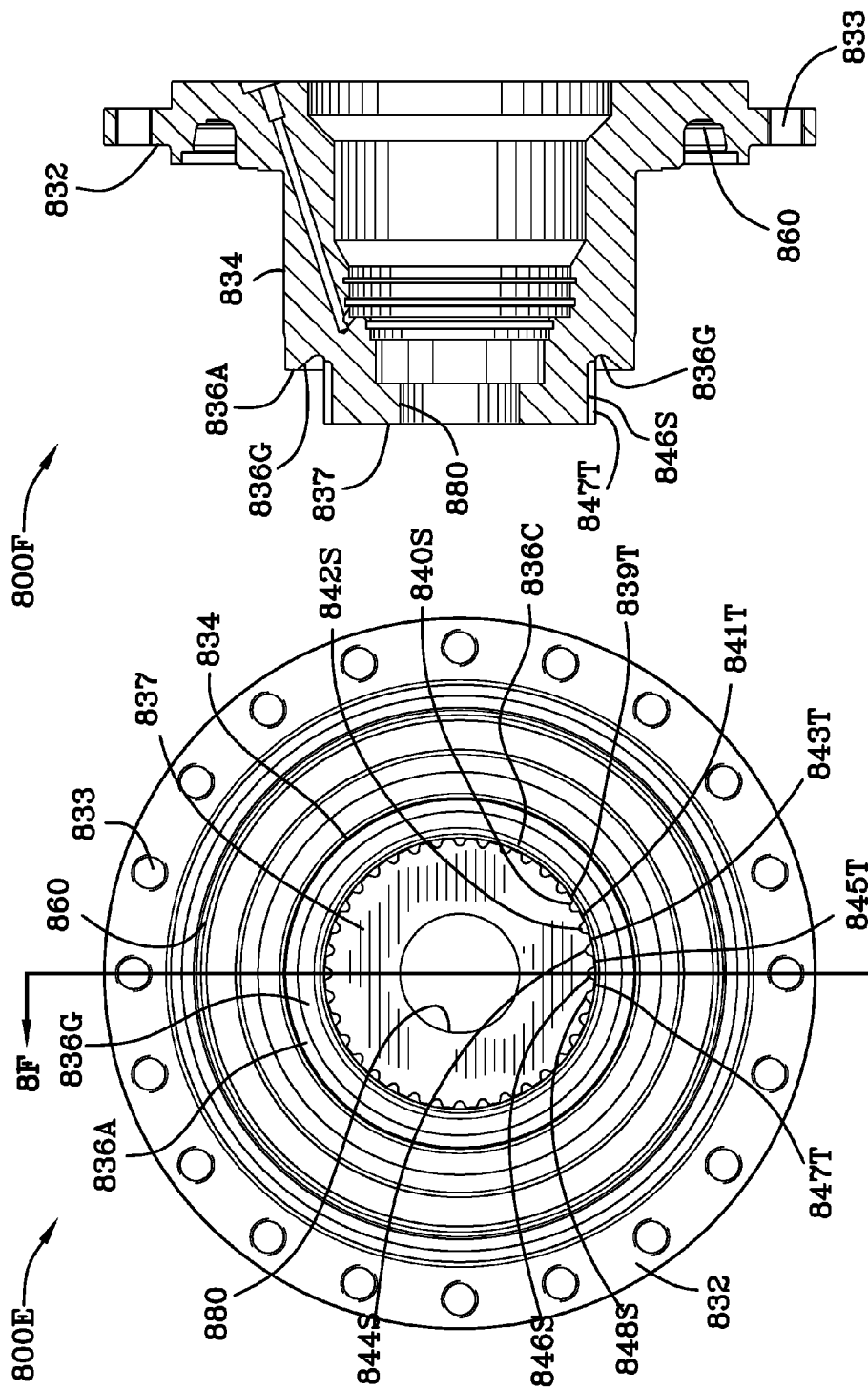

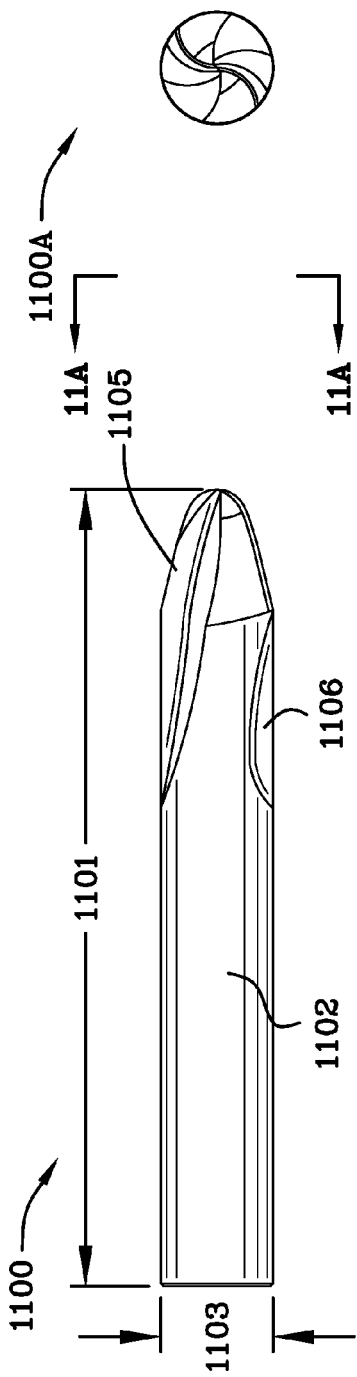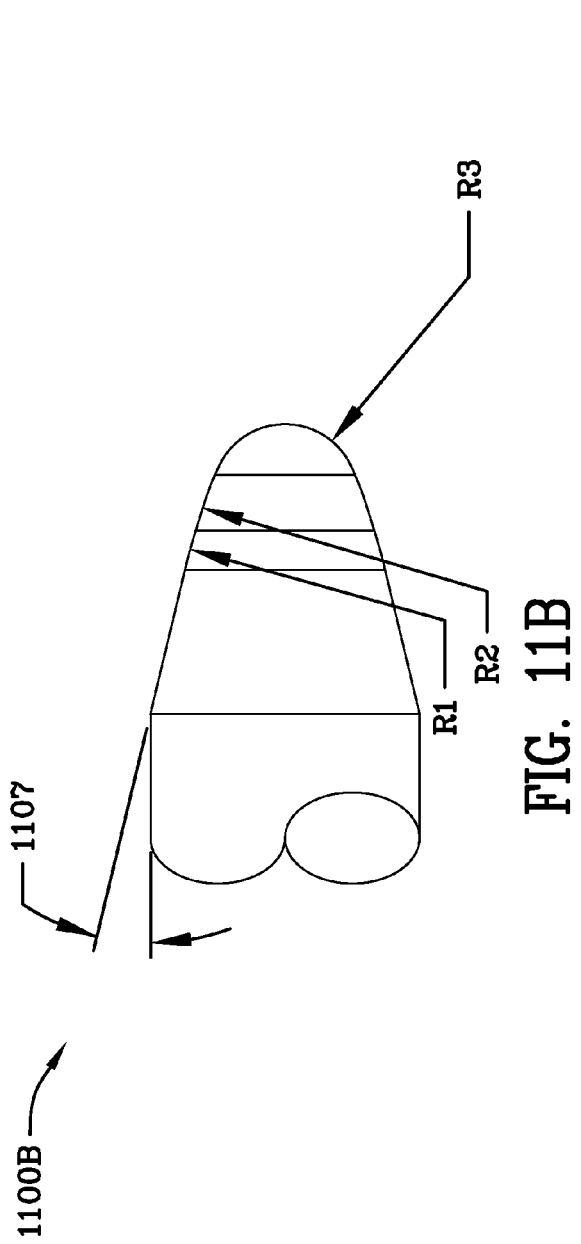
FIG. 11
FIG. 11A
FIG. 11B

SMILLED SPLINE APPARATUS AND SMILLING PROCESS FOR MANUFACTURING THE SMILLED SPLINE APPARATUS

FIELD OF THE INVENTION

The invention is in the field of splines having adjacent features such as shoulders and counterbore surfaces in proximity to splines.

BACKGROUND OF THE INVENTION

A mechanical spline is commonly used to couple a shaft and collar to transmit rotational motion and torque. If no adjacent feature such as a shoulder on the shaft or a counter bore on the collar exists, the full length of spline is engaged and can be utilized for strength and traditional manufacturing methods can be used to produce each component. However, if one or both members have adjacent features, a spline relief is required to allow for tool clearance. The length (or width) of the annular relief(s) reduce(s) the full length of spline engagement which reduces the strength of the connection proportionally. Common prior art methods of machining splines close to adjacent features include shaping and milling. Shaping involves a fixed cutting tool parallel to the spline axis, moving through the usable portion of the spline, into the annularly shaped relived area, and stopping short of the adjacent feature before retracting, reversing direction, and repeating the cycle. Milling involves a rotating cutting tool normal to the spline axis, moving through the usable portion of the spline, into the annularly shaped relived area, and stopping short of the adjacent feature before retracting, reversing direction, and repeating the cycle.

FIG. 1 is a cross-sectional diagrammatic view 100 taken along the lines 1-1 of FIG. 1A of the prior art external spline illustrating the workpiece 101A having a base 101, shoulder 102, cylindrical external spline portion 199, and annular tool relief 103 together with a traditional cutter-shaper 106 and its operating path 108. The cylindrical external spline includes a plurality of teeth 104. Reference numeral 105 indicates the top end portion of the spline.

Still referring to FIG. 1, the cutter-shaper tool 106 includes a plurality of cutter-shaper tool blades 107 which cut the workpiece 101A, or more particularly, which cut the cylindrical spline portion 199. Cutter motion 108 includes a downward stroke 109 of cutter-shaper 106, then a lateral or transverse stroke 110 removing the cutter-shaper tool 106 from the spline (workpiece), then a longitudinal or upward stroke 111 of the cutter-shaper tool, and finally a repositioning stroke 112 moving the cutter-shaper tool 106 in alignment for another cut. Several or multiple passes of the cutter-shaper tool are made to produce a finished part. The workpiece 101A is simultaneously rotated with the cutter shaper tool 106.

FIG. 1A is a perspective view 100A of FIG. 1 and illustrates the annular cutter-shaper tool relief 103 extending circumferentially around the upper cylindrical portion bearing the external spline and underneath the external spline teeth. Referring to FIG. 1A, tooth 121, side of tooth 122 and tooth fillet 123 are illustrated. FIG. 1B is an elevation view 100B of prior art FIG. 1A. FIG. 1C is a top view 100C of prior art FIG. 1A illustrating the same components described above.

FIG. 2 is a perspective view 200 illustrating the base 201, counterbore engagement surface 206, cylindrical internal spline portion (tooth 205, tooth space 204), and shaper-cutter tool relief 203 of the female connection member (collar member) 201A. Reference numeral 202 is used to denote the top of the female connection member 201A. Reference numeral 220A denotes the internal spline. Not shown is the prior art cutter-shaper tool which makes the female collar connection.

FIG. 2A is a cross-sectional view 200A of prior art taken along the lines 2A-2A of FIG. 2. Inner circumferential shaper-cutter tool annular tool relief 203 is illustrated well in FIG. 2A as is counterbore engagement surface 206. Representative tooth 205 and representative tooth space 204 are illustrated well in FIGS. 2A and 2B. FIG. 2B is a top view 200B of FIG. 2.

FIG. 3 is a cross-sectional schematic view 300 of a prior art internal spline 220A and a prior art external spline 199 coupled together illustrating the effective face width, EF, annular cutter-shaper tool reliefs 103, 203 and the total length of the spline connection, SC. EF, the effective face width, of the prior art spline connection is relatively short and thus the length limits the load. By relatively short, it is meant that the effective face width, EF, is just a portion of the spline connection length. The EF of the prior art spline connections may be only 50% of the length of the spline connections. As illustrated in FIG. 3, the manufactured face width, FW, of the exterior spline 199 and the interior spline 220A, are equal.

In designing a spline, the load (torque) required to be transmitted by the spline connection is identified. Next, the spline size as a function of torque required determines an approximate range of the necessary pitch diameter. The torque carrying capacity of a spline is a function the pitch diameter, the shear stress and the length of the spline connection, SC. Once the pitch diameter is specified, the design engineer then calculates the length of the spline connection taking into account that all teeth of the inner and external spline teeth may not be in engagement. It is important to efficiently use the spline connection and to maximize the effective face width, EF in order to transmit torque efficiently. In the prior art illustrated in FIGS. 1, 1A, 1B, 1C, 2, 2A, 2B, and 3, a large annular cutter-shaper relief is required between the end of the spline and an adjacent feature to allow the cutter-shaper to fully cut and retract from the spline. The annular cutter-shaper relief is designated as CR on FIG. 3 and the effective face width is expressed as follows:

$$EF = SC - 2CR$$

Therefore, it can be readily seen from FIG. 3 that length of the annular cutter-shaper tool reliefs reduce the effective face width of the prior art spline connection. The problem with annular cutter-shaper tool reliefs occurs whenever splines are manufactured adjacent features. Typically, the adjacent features are shoulders and counterbores but any adjacent feature regardless of the name applied to it will cause a problem as it will require a substantial tool relief.

SUMMARY OF THE INVENTION

The form of the spline is defined by the shape of the tool and can be straight sided, angular sided, involute, full curve, or other forms that may be advantageous to the design. Smilling can be performed on both external shafts and internal collars with common machine equipment and relatively inexpensive tooling. Smilling is a combination of the words shaping and milling. The smilling process has some characteristics of shaping and some characteristics of rotary milling, and therefore, the name given to this process is "smilling." The products produced with the smilling process are said to have been "smilled."

By combining shaping and milling actions, or smilling, the cutting tool can move through the entire usable portion of the spline and machine an angular relief into the face of the adjacent feature before retracting, reversing direction, and repeating the cycle. The angular relief includes a partially conically shaped portion. The smilling design and manufacturing method eliminates the need for an annular spline relief and the full length of spline engagement can be utilized for strength. The effective width of the spline connection apparatus manufactured by the smilling process conserves space and increases the load carrying capability of the spline connection.

Use of the smilling tool cutter requires just one pass to finish size each tooth space. The rotating cutter is basically standard with the shape of the end producing the form of the tooth space. The form can be straight sided (90°), angular (30° or 45°), involute (as defined by a base circle and pressure angle), full radius (similar to a sine wave), etc. The workpiece is indexed at the completion of each tooth space (360°/number of teeth). The holding angle (inclination angle) would be up to the tool designer (45° provides a stiff angle of attack when entering the shoulder to create the angular relief). One prominent aspect is to smill just beyond the full length of spline engagement into the adjacent shoulder such that the mating parts locate shoulder-to-shoulder with maximum engagement. The relief pockets beyond the shoulder do not engage one another.

The smilling spline connection has been tested satisfactorily with 64% torque carrying capacity above the conventional shape and relief configuration.

A male spline connection apparatus is disclosed which comprises a base portion, a shoulder portion and a cylindrical portion. The shoulder portion resides intermediate the base portion and the cylindrical portion. The cylindrical portion includes an external spline thereon and the external spline includes a plurality of tooth spaces therein circumferentially spaced apart from each other forming a plurality of teeth between adjacent tooth spaces. The tooth spaces are formed by sides of adjacent teeth and a fillet joining the adjacent teeth. Each of the plurality of tooth spaces includes a spline relief portion for tool clearance extending angularly into the shoulder and the base portion of the male spline connection apparatus. Each of the plurality of teeth of the external spline includes sides which may be angular sides, straight sides, involute sides, full curve sides, or straight sides.

A female collar connection apparatus is disclosed which comprises a base portion and an upper portion. The upper portion includes a generally cylindrically shaped hub portion recessed therein. The hub portion includes an internal spline which terminates in a counterbore engagement surface. The internal spline includes a plurality of tooth spaces therein circumferentially spaced apart from each other forming a plurality of teeth between adjacent tooth spaces. The tooth spaces are formed by sides of adjacent teeth and a fillet joining the adjacent teeth. Each of the plurality of tooth spaces includes an angularly oriented spline relief portion for tool clearance extending angularly into the counterbore engagement surface. Each of the plurality of teeth of the internal spline includes sides which may be angular sides, straight sides, involute sides, full curve sides, or straight sides.

A spline connection apparatus is disclosed herein and comprises a male spline apparatus and a female collar apparatus. The male spline connection apparatus includes: a base portion, a shoulder portion and a cylindrical portion. The shoulder portion resides intermediate the base portion and the cylindrical portion. An external spline resides on the cylindrical portion and includes a plurality of first tooth spaces therein circumferentially spaced apart from each other forming external spline teeth between adjacent first tooth spaces. Each of the plurality of first tooth spaces are formed by sides of adjacent external spline teeth and a fillet joining the adjacent external spline teeth. Each of the plurality of first tooth spaces includes an angular spline relief portion for tool clearance extending angularly into the shoulder and base portion of the male spline apparatus. The female collar apparatus includes: a base portion and an upper portion. A generally cylindrically shaped hub portion is recessed in the upper portion of the female collar apparatus. The recessed hub portion includes an inner circumference and an internal spline. The internal spline terminates in a counterbore engagement surface. The internal spline includes a plurality of second tooth spaces therein circumferentially spaced apart from each other forming internal spline teeth between adjacent second tooth spaces. The second tooth spaces are formed by sides of adjacent internal spline teeth and a fillet joining the adjacent internal spline teeth. Each of the plurality of second tooth spaces includes an internal spline relief portion for tool clearance extending angularly into the counterbore engagement surface.

Each of the plurality of external spline teeth of the external spline resides in a respective one of the plurality of the second tooth spaces of the internal spline. Each of the plurality of internal spline teeth of the internal spline resides in a respective one of the plurality of the first tooth spaces of the external spline. Each of the plurality of the external spline teeth of the external spline may interengage two of the plurality of the internal spline teeth and each of the plurality of internal spline teeth may interengage two of the plurality of the external spline teeth of the external spline. Each of the plurality of external spline teeth of the external spline of the male spline apparatus has a first length and each of the plurality of the internal spline teeth of the internal spline of the hub portion of the female collar apparatus has a second length equal to the first length. The first and second lengths are the effective face width, EFs, of the spline connection apparatus made by the smilling process. The entire length of the external spline engages the entire second length of the internal spline to maximize the effectiveness of the torque transfer.

The cylindrical portion of the male spline apparatus engages the counterbore engagement surface of the generally cylindrically shaped hub portion recessed in the upper portion of the female collar apparatus and the shoulder of the male spline apparatus engages the upper portion of the female collar apparatus. As stated above, a portion of the plurality of the external spline teeth interengages a portion of the plurality of the internal spline teeth.

Another expression of the invention includes a spline connection apparatus, comprising: a male member and female member. The male member includes a shoulder portion and a cylindrical portion. The cylindrical portion of the male member extends from the shoulder portion to the top of the upper portion and includes an external spline thereon having a first length. The female member includes a base portion and an upper portion. The upper portion includes a counterbore therein having an internal spline having a second length. The internal spline terminates in a counterbore engagement surface. The male and female members are coupled together with the shoulder portion of the male member engaging the upper portion of the female member. The upper surface of the cylindrical portion of the male member engages the counterbore engagement surface of the female member. The first and second lengths of the splines are equal. The external spline is completely intermeshed with the internal spline and the effective face width of the smilled connection is equal to the first and second length of the splines.

A smilling process for manufacturing an external spline is disclosed and claimed. The process includes the step of determining the load to be carried by the external spline. The load is determined by parameters of the application. A pitch diameter is selected for the external spline based on the determined load. The number of teeth are then selected such that the circular pitch is sufficiently large and that the teeth of the external spline are sufficiently large and capable of handling the specified load. A length of the external spline is then determined based on the determined load and the selected pitch diameter of the external spline. Next, a tool inclination angle, $\beta$, is selected and a part space included angle, $\alpha$, is also selected. The part space included angle is selected from a reasonable range of angles typically desired to accommodate appropriate pressure angles. A tool cone included angle, $2\tau$, is calculated based on an algorithm expressed in terms of $\beta$ and $\alpha$. Once the tool cone included angle, $2\tau$, is known, the length of the rotary cutting tool is determined based on the actual external spline dimensions required. The rotary cutting tool has a cutting portion which is generally conically shaped. Next, the workpiece is chucked in an appropriate workpiece in an endmill. Following the chucking, the workpiece is milled creating an appropriate external space angle (tooth space) using the smilling process with the appropriately sized tool and a 5 axis Mazak endmill. The process further includes smilling an angular tool relief in an adjacent structure of the workpiece for clearance of the tool. The relief is partially conically shaped. Typically, the workpiece is cylindrically shaped and the adjacent structure is a shoulder or a counterbore surface. To create the spline, the workpiece is rotatably indexed which enables milling of a plurality of equally spaced angles about the circumference of the workpiece forming circumferentially spaced spline teeth.

The step of sizing the tool based on the actual external spline dimensions required includes use of an algorithm expressed in terms of the inclination angle, $\beta$, and the part space included angle $\alpha$, to arrive at a tool space included angle, $2\tau$. Once $2\tau$ is known, a cap radius down to the form diameter establishes one end of the tool and the tool cone extends long enough out of the spline to completely smill the spline as desired. Typically, but not exclusively, the inclination angle, $\beta$, is preferably in the range of 30-60° and the part space angle, $\alpha$, is preferably in the range of 40-75°. The algorithm can be performed using an Excel spreadsheet, for example, incorporating the methodology expressed herein below.

The rotary cutting tool includes a carbide conically-shaped cutting portion and the tool includes two straight flutes and a radius cap for creating an angular spline. A single flute may also be used in smilling an angular spline. If an involute spline is desired then the cutting tool includes a plurality of involute radii to produce the appropriate space angle (tooth space) and involute teeth. The involute radii are determined by the desired shape of the involute tooth.

A process for manufacturing an internal spline is disclosed and claimed. The process includes the step of determining the load to be carried by the internal spline which is the same step as described above in connection with the external spline. Next, a pitch diameter of a mating external spline is selected as described above. Next, the length of the internal spline apparatus based on the determined load and the selected pitch diameter of the external spline apparatus is determined. Next, the number of teeth, N, is selected such that the circular pitch of the external spline is sufficiently large and that the teeth of the external spline are capable of handling the load. Next, an external part space included angle, $2\alpha°$, is selected and an internal part space included angle is determined using the formula, $2\alpha°-((360/N)°)$. A tool inclination angle, $\beta$, is selected to determine a tool cone included angle, $2\tau$, based on an algorithm expressed in terms of tool inclination angle $\beta$ and the internal part space included angle, $2\alpha°-((360/N)°)$. The rotary cutting end mill tool is then sized based on the algorithm expressed in terms of the inclination angle $\beta$ and the internal part space included angle $2\alpha°-((360/N)°)$, to arrive at $2\tau$, the tool space included angle. Once $2\tau$ is known, a cap radius down to the form diameter establishes one end of the tool and the tool cone extends long enough out of the part to completely smill the part as desired. An appropriate workpiece is then chucked in a Mazak endmill or any other multiple axis commercially available endmill. The workpiece is then smilled using the rotary cutting carbide tool and an endmill producing an appropriate internal space angle (tooth space) in the workpiece. A rotary cutting carbide tool angularly shaped relief is then smilled in an adjacent structure of the workpiece. Typically, the appropriate workpiece includes a counterbore therein and the counterbore, in turn, has an inner circumference. To produce appropriate circumferentially spaced internal spline teeth and equally spaced appropriate internal space angles (tooth spaces), the workpiece is rotatably indexed which enables smilling a plurality of equally spaced appropriate internal space angles (tooth spaces) about the inner circumference of the counterbore of the workpiece thus forming circumferentially spaced internal spline teeth. The rotary cutting tool used is much less expensive than the shaper-cutter tools which are typically used for manufacturing splines having an annular tool relief.

A process for manufacturing a spline in proximity to an adjacent structure is disclosed and claimed. The workpiece includes an upper cylindrical portion and an adjacent structure, and the upper cylindrical portion includes an end portion and a length. A rotary cutting tool is oriented at an inclination angle with respect to the upper cylindrical portion of the workpiece and, of course, the rotary cutting tool is rotating to perform the desired cutting action. An end portion of the upper cylindrical portion of the workpiece is engaged by the rotating rotary cutting tool.

The rotary cutting tool is moved from the end portion of the upper cylindrical portion of the workpiece removing material by its cutting action along the length of the upper cylindrical portion and into the adjacent structure of the workpiece forming a rotary cutting tool relief. The rotary cutting tool relief is in the form of an angular pocket formed by the conically shaped cutting tool. Tooth spaces are also formed by the cutting action of the tool. Next, the rotary cutting tool is retracted from the adjacent structure of the workpiece along the angle of inclination of the rotating rotary cutting tool. The rotary cutting tool is then returned vertically to its initial position (home) and the workpiece is positioned for the next smilling operation. The workpiece is rotated, or indexed, after cutting each tooth space. The steps of: engaging the end portion of the upper cylindrical portion of the workpiece with the rotating rotary cutting tool; moving the rotating rotary cutting tool from the end portion of the upper cylindrical portion of the workpiece removing material by its cutting action along the length of the upper portion and into the adjacent structure of the workpiece forming a rotary cutting tool relief; and, retracting the rotary cutting tool from the adjacent structure of the workpiece along the angle of inclination of the rotating rotary cutting tool are then repeated.

In connection with this process, a step of sizing the rotary cutting tool for an external spline is based on the part space included angle and the angle of inclination. The just stated process may produce an external spline where the adjacent structure is a shoulder and the rotary cutting tool relief extends at the inclination angle into the shoulder.

Another process for manufacturing a spline in proximity to an adjacent structure is disclosed and claimed. The steps of the process include securing a workpiece having a counterbore therein and an adjacent structure in proximity to the counterbore. The counterbore includes an end portion and a length. In home position, the rotary cutting tool is oriented at an inclination angle with respect to the end portion of the counterbore of the workpiece. The rotary cutting tool is, of course, rotated and brought into engagement with the end portion of the counterbore of the workpiece. Next, the rotating rotary cutting tool moves from the end portion of the counterbore of the workpiece removing material by its cutting action along the length of the counterbore and into the adjacent structure of the workpiece forming a rotary cutting tool relief. Following creation of the rotary cutting tool relief, the rotary cutting tool is retracted from the adjacent structure of the workpiece along the angle of inclination of the rotating rotary cutting tool.

The further steps of the process include: returning the rotary cutting tool to an initial position (home position); indexing the workpiece by rotating the workpiece after creation of each tooth space; and, repeating the steps of: engaging the end portion of the counterbore of the workpiece with the rotating rotary cutting tool; moving the rotating rotary cutting tool from the end portion of the counterbore of the workpiece removing material by its cutting action along the length of the counterbore and into the adjacent structure of the workpiece forming a rotary cutting tool relief; and, retracting the rotary cutting tool from the adjacent structure of the workpiece along the angle of inclination of the rotating rotary cutting tool.

The just stated process may produce an internal spline and the adjacent structure may be a counterbore engagement surface and the rotary cutting tool relief extends at the inclination angle into the counterbore. In connection with this process, a step of sizing the rotary cutting tool is based on the part space included angle and the angle of inclination to arrive at a tool cone included angle.

It is an object of the invention is to make the smilled spline connection length shorter than a conventional spline connection using annular reliefs for the same load carrying capacity.

It is another object of the invention is to make the smilled spline effective face width equal to the width of the spline connection.

It is another object of the invention to increase the load carrying capacity for a given spline connection length and a given pitch diameter.

It is a further object of the present invention to produce a smilled spline connection comprised of a male spline connection apparatus and a female spline connection apparatus wherein angular reliefs or conically shaped reliefs are smilled into adjacent shoulders and counterbores.

It is a further object of the present invention to produce a male spline connection apparatus or a female spline connection apparatus which may be used with a pre-existing (used) spline.

It is a further object of the present invention to eliminate annular reliefs in spline connections to maximize their effective face width and to make their effective face width (or length) equal to the spline connection length.

These and other objects of the invention will be best understood when reference is made to the drawing figures and description of the invention set forth below.

BRIEF DESCRIPTION OF THE DRAWINGS

FIG. 2 is a perspective view of the prior art illustrating the base, shoulder, cylindrical internal spline portion, and relief of the female connection member (collar member).
FIG. 2A is a cross-sectional view of prior art taken along the lines 2A-2A of FIG. 2.
FIG. 2B is a top view of FIG. 2.
FIG. 7 is a cross-sectional schematic of the male spline apparatus and the female collar apparatus completely interengaged or coupled together.

FIG. 7E is a cross-sectional schematic view of both FIG. 7 and FIG. 3, shown in relation to each other, illustrating that the apparatus shown in FIG. 7 made by the smilling process has an effective face width EFs equal to the length of the spline connection, SC, and that the effective face width EF of the prior art in FIG. 3 is much smaller than EFs for the same length of spline connection, SC.

FIG. 8E is a top view of FIG. 8D.

FIG. 8F is a cross-sectional view taken along the lines 8F-8F of FIG. 8E.

FIG. 11 is a front view of the involute carbide end mill cutting tool having first and second flutes.

FIG. 11A is an end view of the involute carbide end mill cutting tool taken in the direction of the lines 11A-11A.

FIG. 11B is an enlargement of the surfaces of the involute end mill illustrating different radii, R1, R2 and R3.

DESCRIPTION OF THE INVENTION

Figure 4:
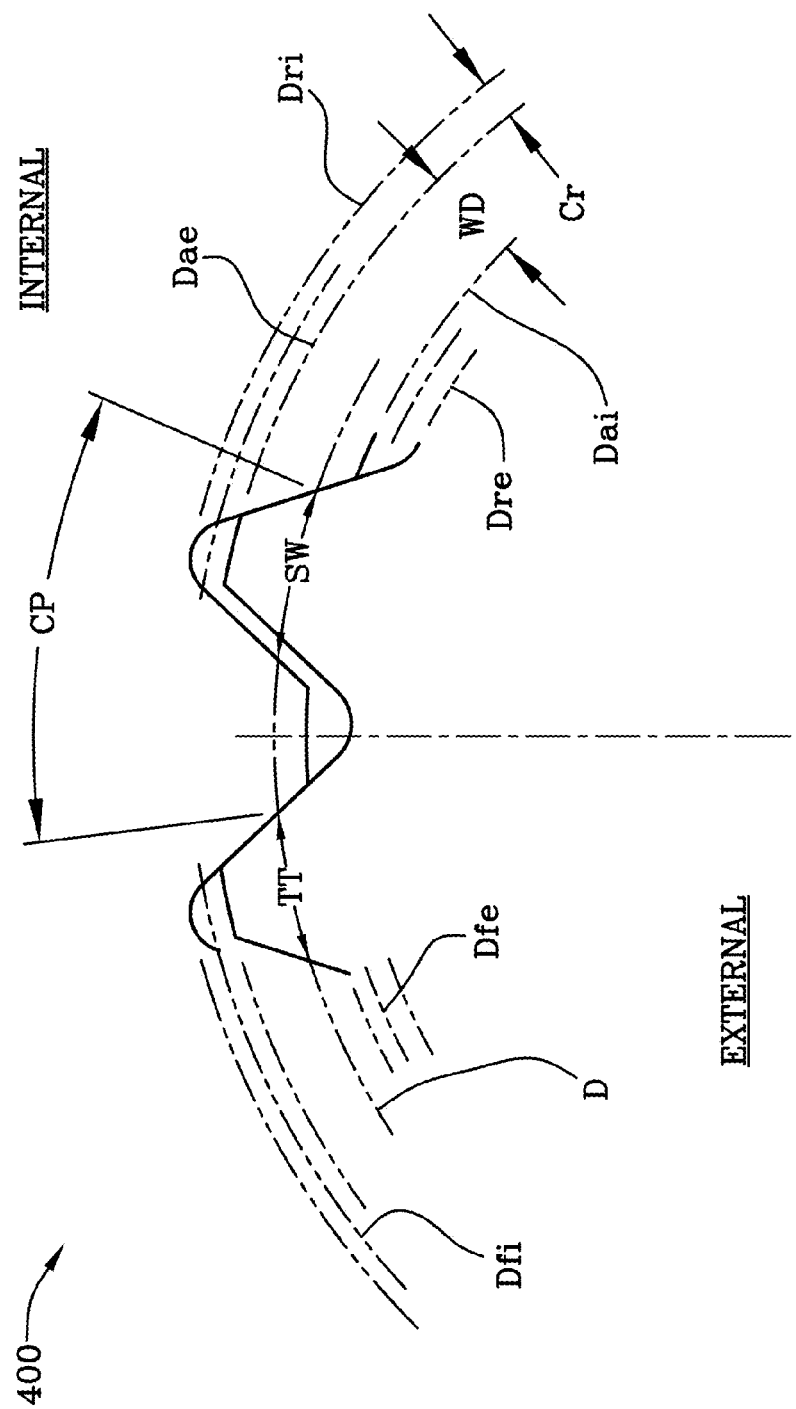
FIG. 4 is a schematic of the external and internal splines of an angular spline connection apparatus manufactured using the smilling process illustrating the pitch diameter, the major and minor external diameters, the major and minor internal diameters and the circular pitch.

FIG. 4 is a schematic 400 of the external and internal splines of an angular spline connection apparatus manufactured using the smilling process illustrating the pitch diameter, D, the major internal diameter, Dri, the major external diameter, Dae, the minor internal diameter, Dai, the minor external diameter, Dre, and the circular pitch, CP. FIG. 4 also illustrates the tooth thickness, TT, of the angular external teeth and the space width, SW, of the internal spline. Dfi, form internal diameter, and Dfe, form external diameter, are illustrated on FIG. 4 as are the WD, working depth, and Cr, clearance between the external spline teeth and Dri, major internal diameter.

Figure 4A:
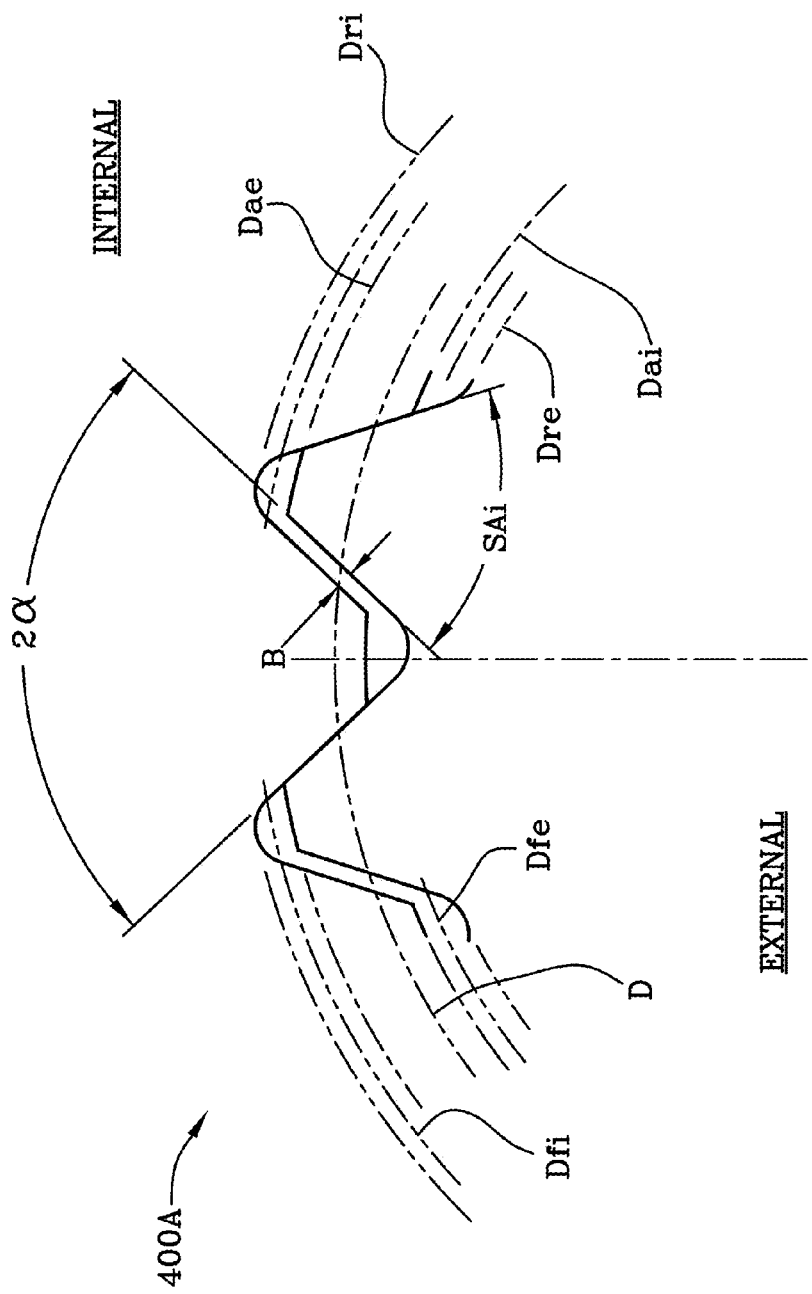
FIG. 4A is a schematic of the external and internal splines of an angular spline connection apparatus manufactured using the smilling process illustrating the external space angle, the internal tooth angle, the internal space angle, and the external tooth angle.

FIG. 4A is a schematic 400A of the external and internal splines of an angular spline connection apparatus manufactured using the smilling process illustrating the external space angle, SAe, the internal tooth angle, TAi, the internal space angle, SAi, and the external tooth angle, TAe. SAe is assumed to be 60° which is equal to 2α and the value for α, the part slot half angle, is used to calculate the tool cone included angle, 2τ. Once 2τ is known, a cap radius down to the form diameter establishes one end of the tool and the tool cone extends long enough out of the part to make a complete part. The internal part space, SAi, included angle $(2\alpha° - ((360/N)°))$ is illustrated in FIG. 4A where α is the part slot half angle and N is the number of teeth. Backlash, B, is also illustrated in FIG. 4A.

Figure 4B:
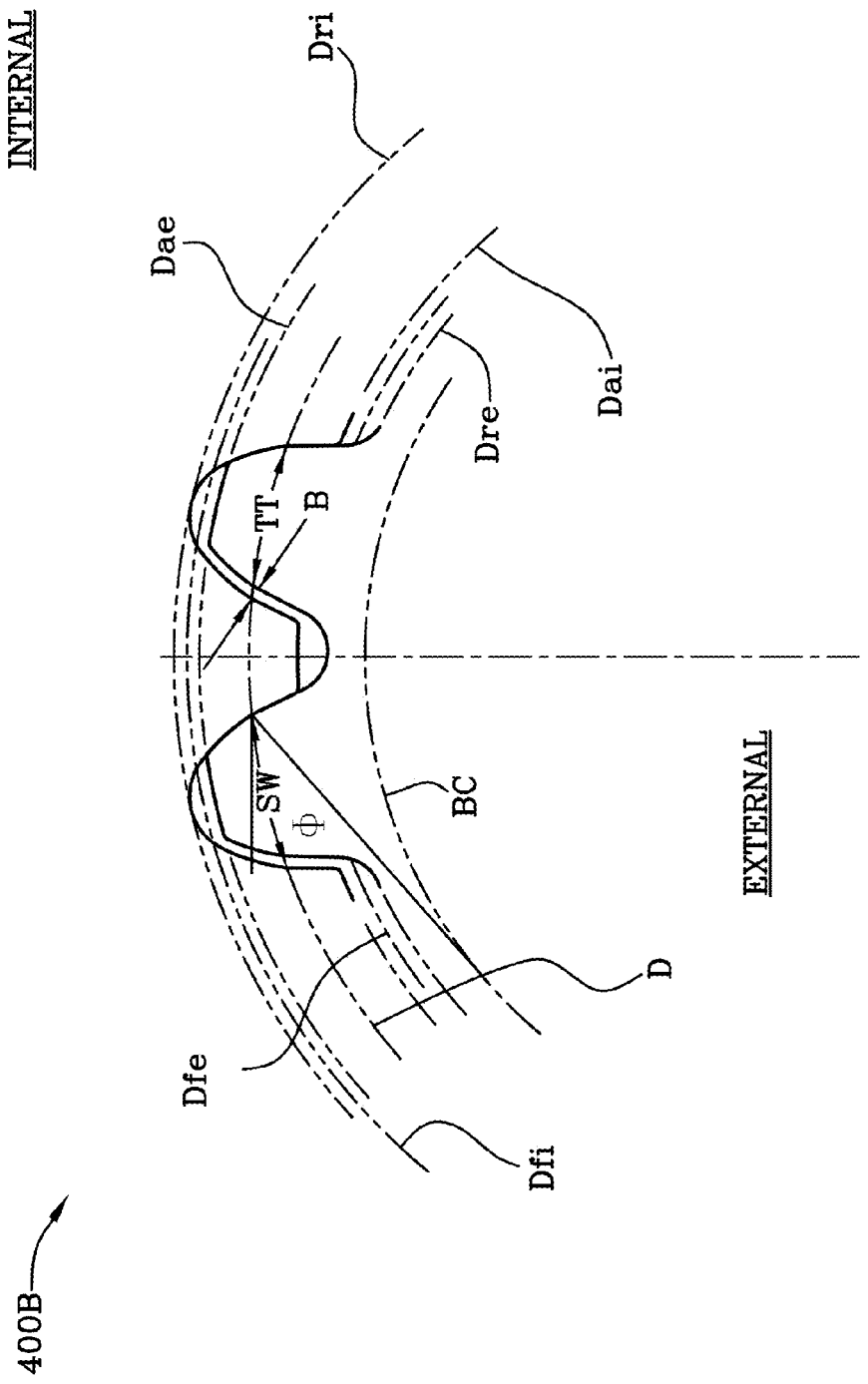
FIG. 4B is a schematic of the external and internal splines of an involute spline connection apparatus manufactured using the smilling process illustrating the pitch diameter, the major and minor external diameters, the major and minor internal diameters and the circular pitch.

FIG. 4B is a schematic 400B of the external and internal splines of an involute spline connection apparatus manufactured using the smilling process illustrating the pitch diameter, D, the major internal diameter, Dri, the major external diameter, Dae, the minor internal diameter, Dai, the minor external diameter, Dre, and the circular pitch, CP. FIG. 4B also illustrates the tooth thickness, TT, of the involute external teeth and the space width, SW, of the internal spline. Dfi, form internal diameter, and Dfe, form external diameter, are illustrated on FIG. 4B. The pressure angle Φ and the backlash, B, are also illustrated in FIG. 4B. In the instance of the involute example, the SAe is assumed to be 60° which is equal to 2α, and the value for α, the part slot half angle, and the inclination angle are used to calculate the tool included angle which is then used along with other parameters to calculate the tool size for actual smilling of the splines. Once 2τ is known, a cap radius down to the form diameter establishes one end of the tool and the tool cone extends long enough out of the part to smill a complete part. The internal part space, SAi, included angle $(2\alpha° - ((360/N)°))$ where α is the part slot half angle and N is the number of teeth, is used to calculate the tool included angle which is then used along with other parameters to calculate the tool size for actual smilling of the splines. Once 2τ is known, a cap radius down to the form diameter establishes one end of the tool and the tool cone extends long enough out of the part to smill a complete part. Backlash, B, and the base circle are also illustrated in FIG. 4B.

FIG. 11 is a front view 1100 of the involute carbide end mill cutting tool 1102 having first 1104 and second 1105 flutes. Reference numeral 1101 is used to express the length of the tool and reference numeral 1103 signifies the diameter of the shank FIG. 11A is an end view 1100A of the involute carbide end mill cutting tool 1102 taken in the direction of the lines 11A-11A. FIG. 11B is an enlargement 1100B of the surfaces of the involute end mill illustrating different radii, R1, R2 and R3. These radii cut and involute tooth on either an external spline or an internal spline as described herein. Reference numeral 1107 expresses an angle which is τ, the tool cone included half angle.

Figure 12A:
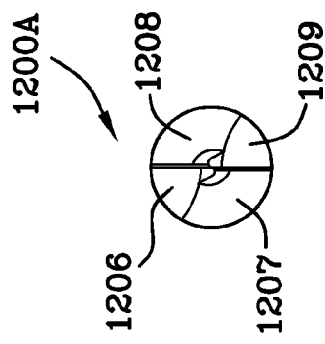
FIG. 12A is an end view of the angular carbide end mill cutting tool of FIG. 12.
Figure 12:
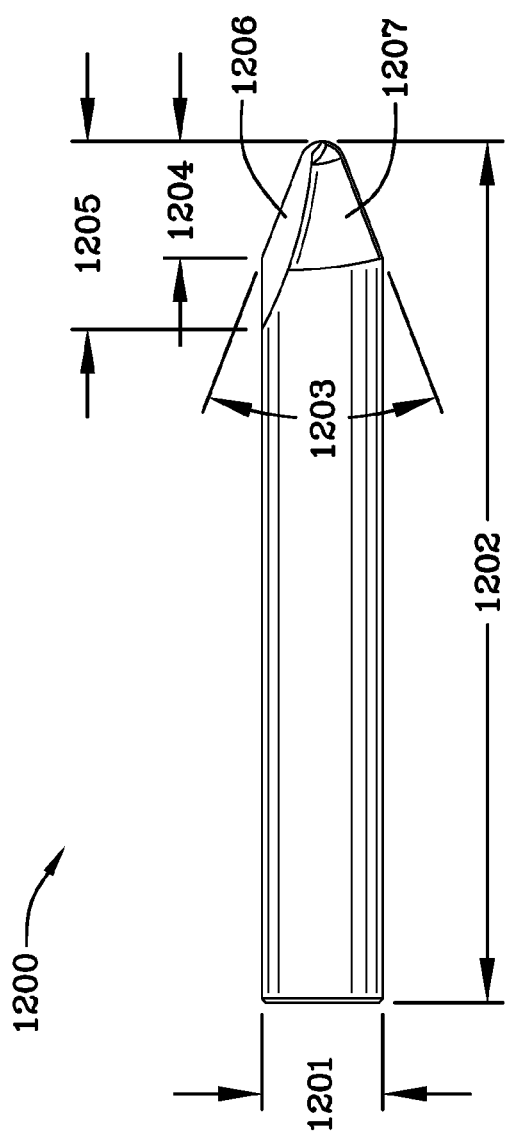
FIG. 12 is front view of an angular carbide end mill cutting tool.

FIG. 12 is front view 1200 of an angular carbide end mill cutting tool 1201A which is generally conically shaped. FIG. 12A is an end view 1200A of the angular carbide end mill cutting tool 1201A of FIG. 12 Shank diameter 1201 of angular carbide end mill cutting tool 1201A, length 1202 of cutting tool, and the tool cone included angle 1203 are illustrated in FIG. 12A. Cutting surface length 1204 and length 1205 of the flute surfaces are also illustrated in FIG. 12A. Reference numerals 1206, 1207 indicate the first flute and reference 1208, 1209 indicate the second flute.

Referring to FIG. 4A, for a part space included angle of 2α=60°, and an inclination angle, β, 45°, the tool cone included angle 1203 is calculated to be 41.40° using the formulas set forth below derived from FIG. 9E. Once 2τ is known, a cap radius down to the form diameter establishes one end of the tool and the tool cone extends long enough out of the part to smill a complete part.

Figure 9:
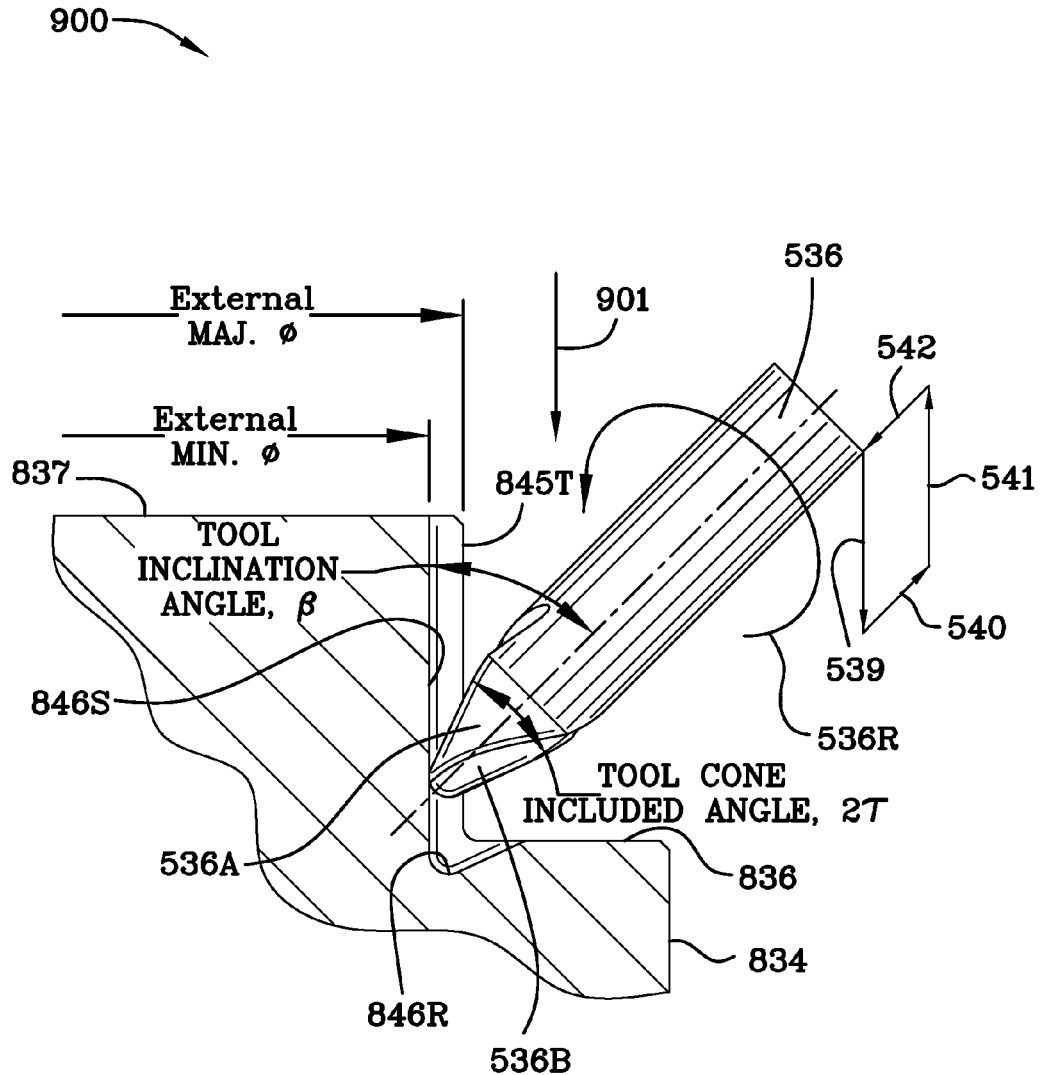
FIG. 9 is a schematic representation of the smilling process illustrating the smilling cutter carbide tool at an inclination angle of 45° with respect to the workpiece.

FIG. 9 is a schematic representation 900 of the smilling process illustrating the angular smilling cutter carbide tool 536 at an inclination angle of 45° with respect to the workpiece cutting the workpiece. Reference numeral 845T is a tooth behind the cutting tool 536.

Referring to FIG. 4A and FIG. 9, reference numeral 846S represents the external space angle, SAe, although only one tooth, 845T, is visible in FIG. 9. By combining shaping and milling actions, or smilling, the cutting tool can move through the entire usable portion of the spline and machine a cutting tool relief 846R into the face of the adjacent feature 836 before retracting 540, reversing direction 541, and repeating the cycle 542, 539, 540, 541. In this example the adjacent features 836 is a shoulder. The smilling design and manufacturing method eliminates the need for an annular spline relief located circumferentially beneath or above the spline. Using the smilling apparatus and process, the full length of the spline may be used for engagement for increased spline connection strength. The effective width of the spline connection apparatus conserves space and increases load carrying capability.

Still referring to FIG. 9, angular oriented cutting tool 536 makes only one pass downwardly as illustrated in FIG. 9. The cutting tool 536 as shown is a right hand cutter. However, any cutting orientation can be used, for instance, a left hand cutter could be used. FIG. 9 also illustrates Dae, the external major diameter, and Dre, the external minor diameter.

Still referring to FIG. 9, an end portion 837 of the upper cylindrical portion of the workpiece is engaged along the path 542 by the rotating rotary cutting tool 536. The rotary cutting tool 536 is moved from the end portion 837 of the upper cylindrical portion of the workpiece along the length of the upper cylindrical portion according to the diagrammatic path 539 forming the space angle 846S (tooth space) and into the adjacent structure 836 (i.e., shoulder 836) of the workpiece forming a rotary cutting tool relief 846R. Next, the rotary cutting tool 536 is retracted from the adjacent structure (shoulder 836) of the workpiece along the path 540 at the angle of inclination of the rotating rotary cutting tool 536. The rotary cutting tool 536 is then returned along path 541 to its initial position and the workpiece is positioned for the next smilling operation. The workpiece is rotatably indexed before the next smilling operation. The steps of: engaging along the path 542 the end portion 837 of the upper cylindrical portion of the workpiece with the rotating rotary cutting tool; moving the rotating rotary cutting tool from the end portion 837 of the upper cylindrical portion of the workpiece along the path 539 and length of the upper portion and into the adjacent structure 836 of the workpiece forming a rotary cutting tool relief; and, retracting the rotary cutting tool along the path 540 from the adjacent structure of the workpiece along the angle of inclination of the rotating rotary cutting tool are then repeated. The rotary cutting tool 536 is then returned along path 541 to its initial position and the workpiece is positioned for the next smilling operation.

Figure 9A:
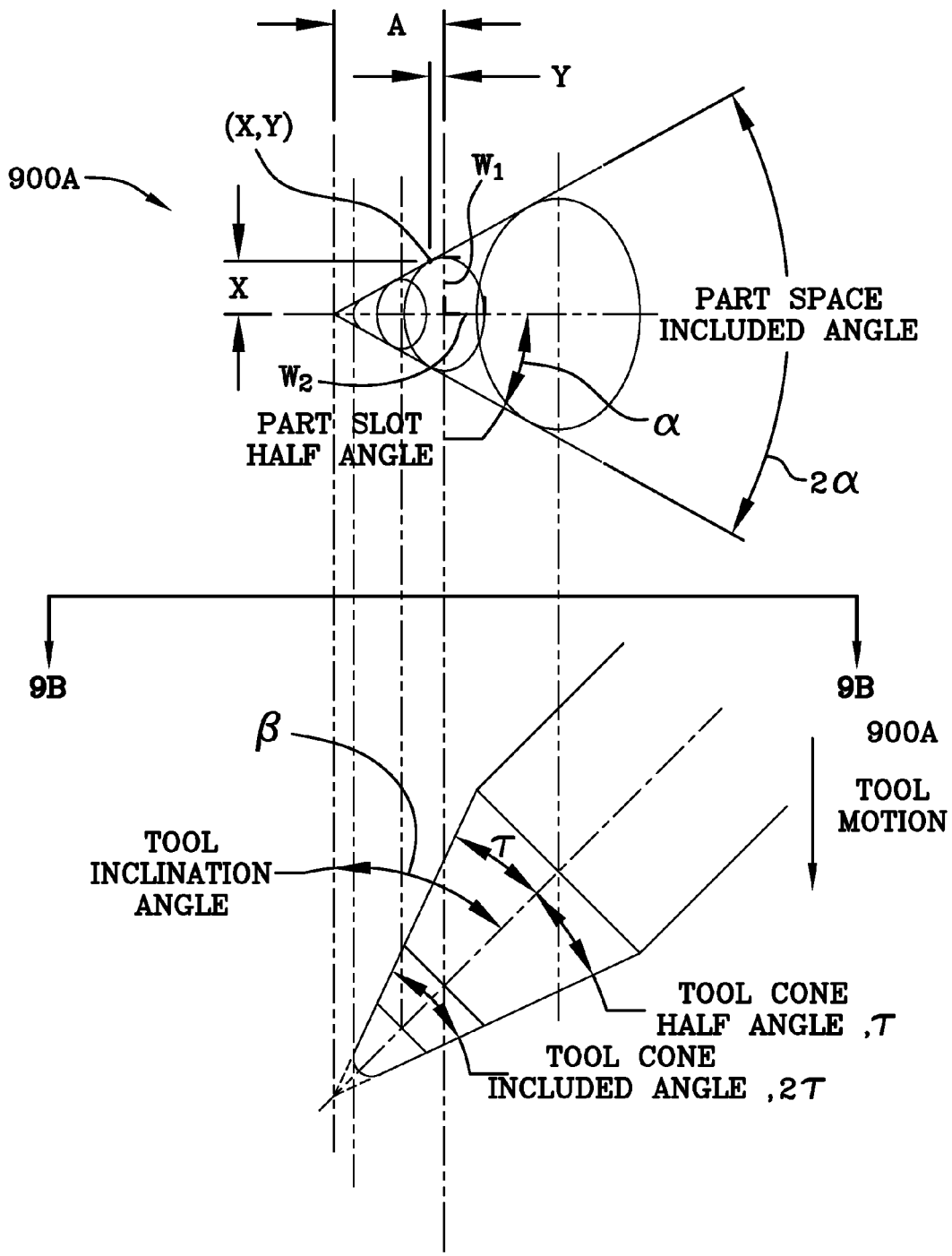
FIG. 9A is a schematic representation of the smilling cutter carbide tool at an inclination angle, β, and a part space included angle, 2α, shown as part of an elliptical projection, to determine the tool cone included angle, 2τ.
Figure 9B:
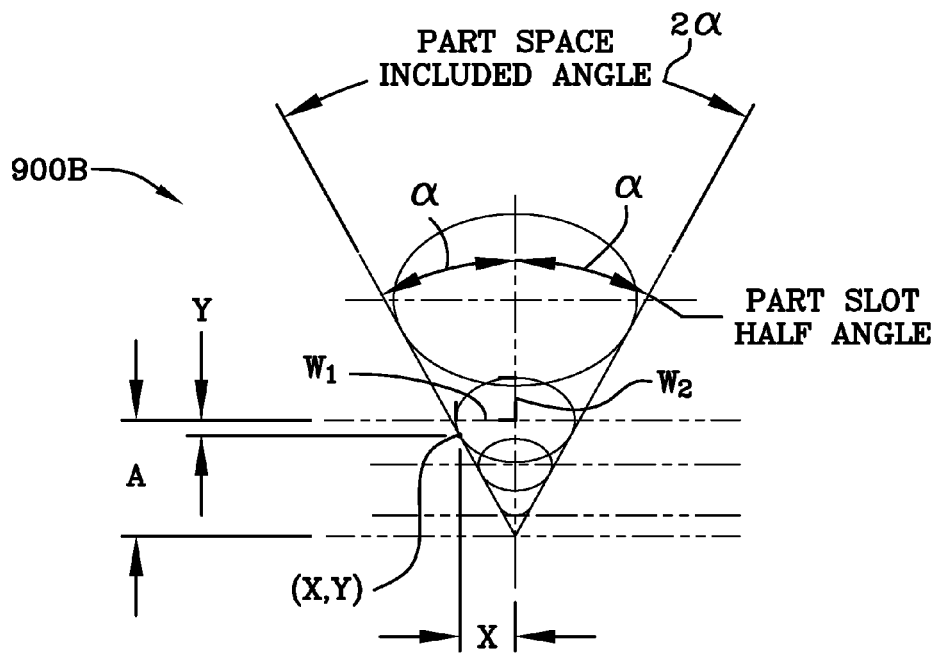
FIG. 9B is a view taken along the lines of 9B-9B of FIG. 9A with the elliptical projection rotated 90° counterclockwise orienting the elliptical projection of the part space included angle with the cutting profile of tool as illustrated in FIG. 9C.
Figure 9C:
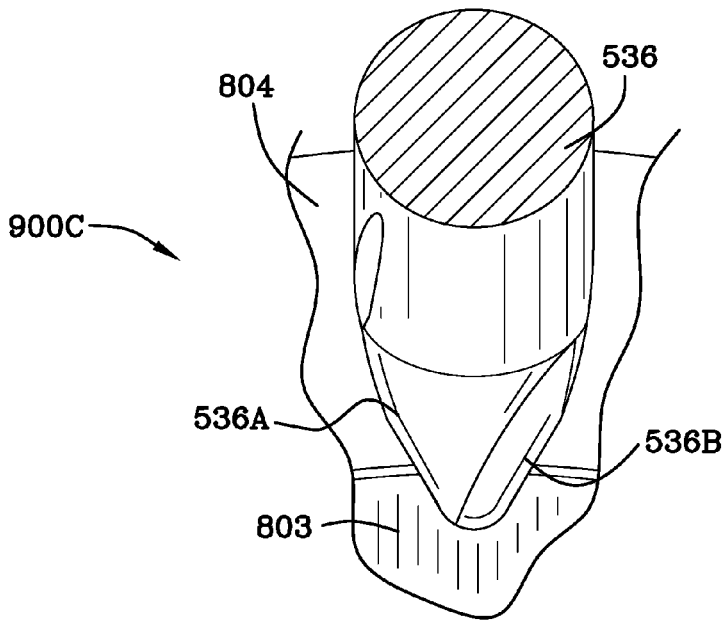
FIG. 9C is an enlarged portion of FIG. 8G illustrating the carbide smilling cutter oriented in the direction of the elliptical projection of the part space included angle.
Figure 9D:
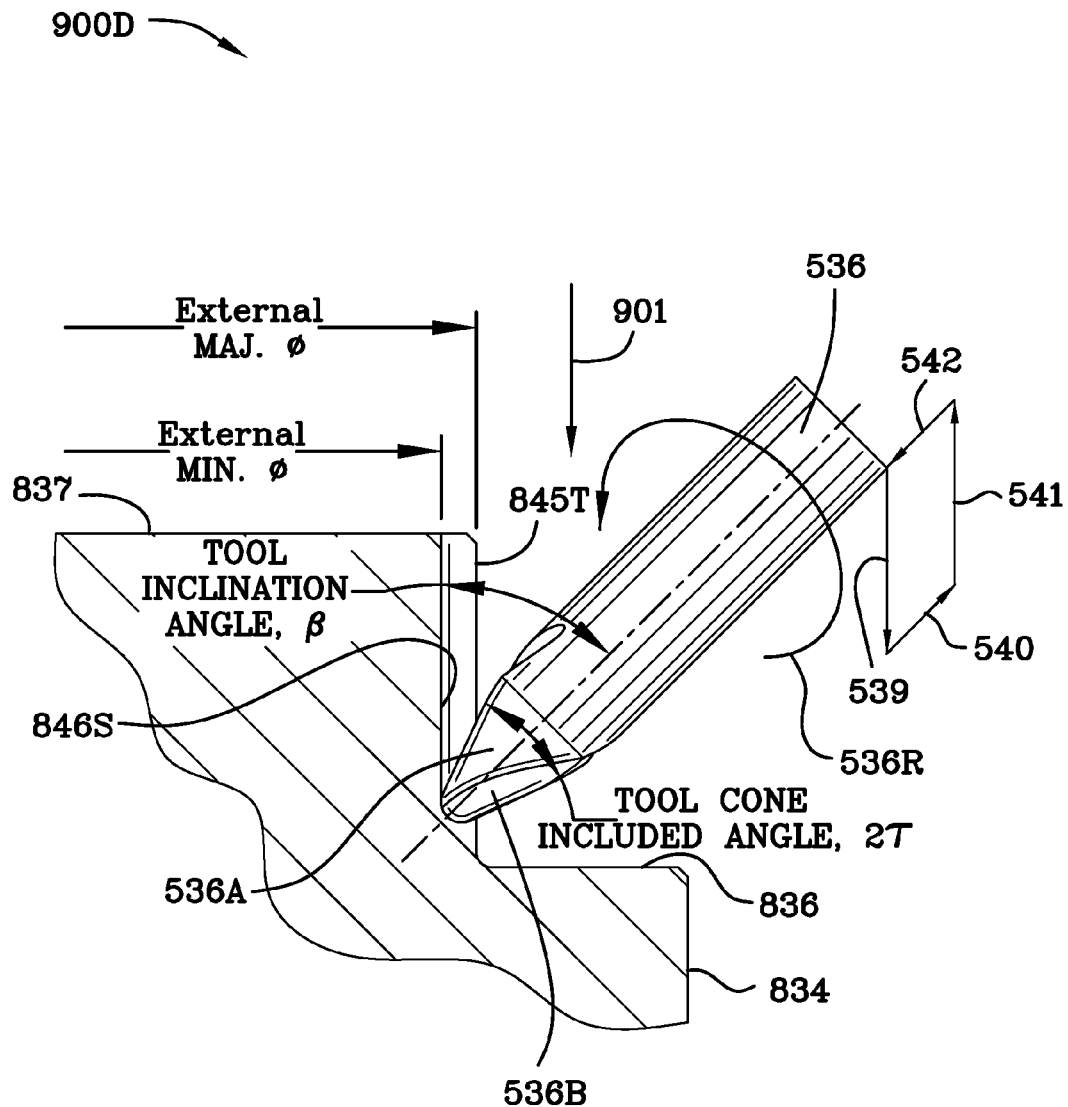
FIG. 9D is a schematic similar to FIG. 9A illustrating material not yet removed from the workpiece.

FIG. 9D is a schematic similar to FIG. 9A illustrating material not yet removed from the workpiece. As stated previously, only one pass is required to remove the material from an external spline or an internal spline.

FIG. 9A is a schematic representation 900A of the smilling cutter carbide tool at an inclination angle, β, in an orthogonal view and a part space included angle, 2α, shown as part of an elliptical projection in a transverse view. FIG. 9B is a view 900B taken along the lines of 9B-9B of FIG. 9A with the elliptical projection rotated 90° counterclockwise orienting the elliptical projection of the part space included angle with the cutting profile of the tool as illustrated in FIG. 9C. FIG. 9C is an enlarged portion 900C of FIG. 8G illustrating the carbide smilling cutter tool 536 oriented in the direction of the elliptical projection of the part space included angle, 2α.

Figure 9E:
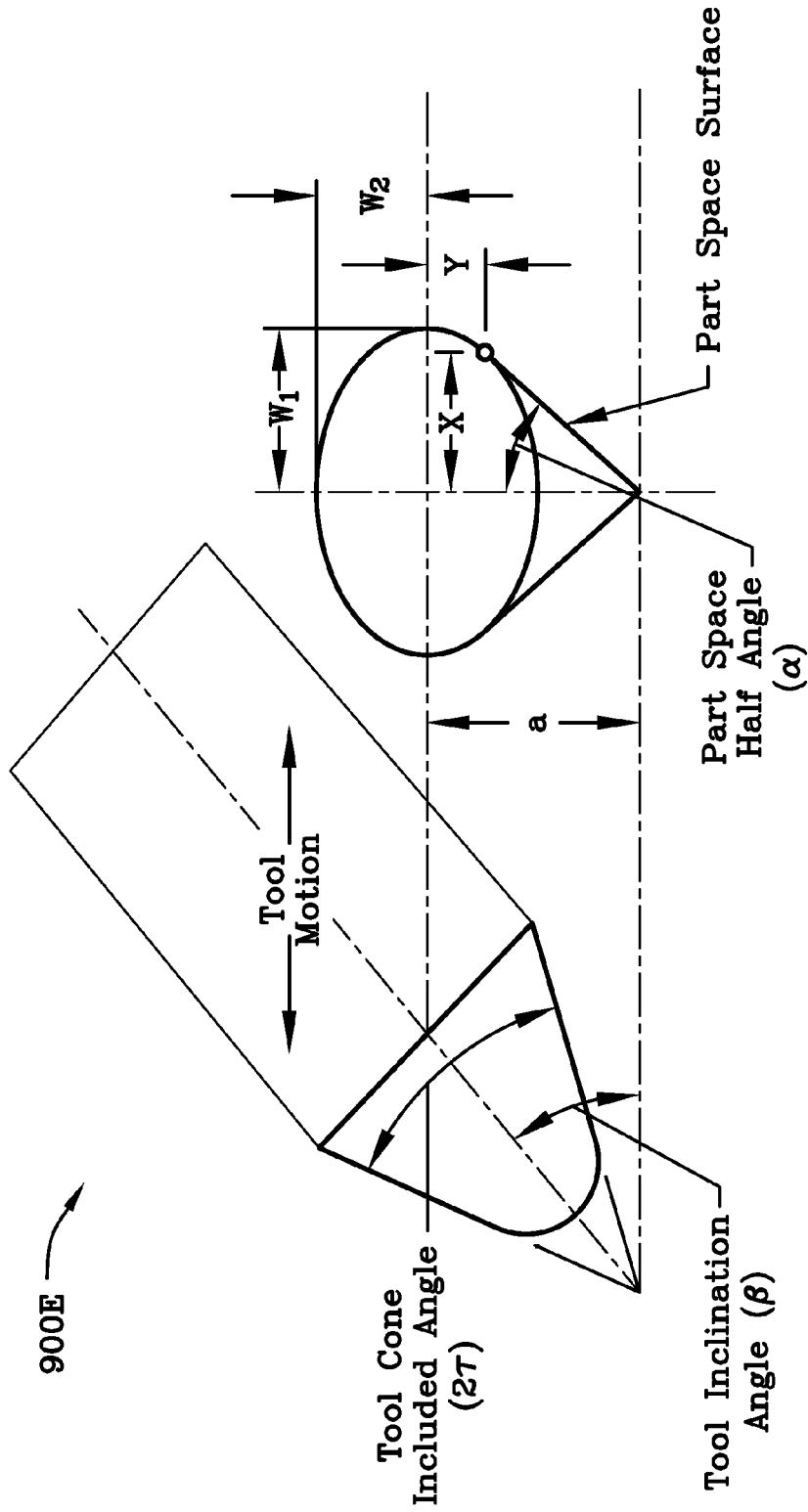
FIG. 9E is a schematic representation of the tool, tool inclination angle and part space half angle upon which the equation for the tool cone included angle is based.

The object of the analysis illustrated in FIG. 9E is the determination of the tool cone included angle, 2τ. Knowledge of the tool cone included angle, 2τ, allows the tool designer to make the tool with the right proportions given the inclination angle, β and the part space half angle, α. The derivation of the solution for τ, given α, the part slot half angle, and β, the inclination angle is as follows based on FIG. 9E. An equivalent derivation could be performed in regard to FIGS. 9A and 9B but is not shown here. Referring to FIG. 9E, locate X, Y coordinates of point P on the tool ellipse that is tangent to part slot surface, where, $W_1$=tool ellipse major semi-axis, $W_2$=tool ellipse minor semi-axis, then find height A which leads to desired result, τ.

Formula of ellipse is:

$$\frac{X^2}{W_1^2} + \frac{Y^2}{W_2^2} = 1 \qquad \text{equation (1)}$$

Take the first derivative of the equation for the ellipse to find the tangent line slope at any point P on the ellipse.

$$\frac{2 \cdot X}{W_1^2} \cdot \frac{dX}{dY} + \frac{2 \cdot Y}{W_2^2} \cdot \frac{dY}{dX} = 0$$

where $$\frac{dX}{dX} = 1 \quad \frac{dY}{dX} = m$$

and then:

$$\frac{2 \cdot X}{W_1^2} + \frac{2 \cdot mY}{W_2^2} = 0$$

solve for Y $$Y = -\frac{W_2^2 \cdot X}{W_1^2 \cdot m}$$

and then substitute Y into equation (1) above and solve for X, $$X = \frac{W_1}{\sqrt{1 + \frac{W_2^2}{W_1^2 \cdot m^2}}}$$

where $W_1 = 1$, $$W_2 = W_1 \cdot \cos\beta$$

$$m = \tan(90 - \alpha) = \frac{1}{\tan\alpha}$$

and by substitution:

$$X = \frac{1}{\sqrt{1 + \cos^2\beta \cdot \tan^2\alpha}}$$

and:

$$Y = \cos\beta \cdot \sqrt{1 - X^2}$$

the values for "a" and τ are obtained from the trigonometry of FIG. 9E.

$$a = \frac{X}{(\tan\alpha)} + Y \quad \tau = \arctan\left(\sin\frac{\beta}{a}\right)$$

Referring to FIG. 9E, once the tool cone half included angle τ is known, then, obviously 2τ is known which is the tool cone included angle. Once 2τ is known, a cap radius down to the form diameter establishes one end of the tool and the tool cone extends long enough out of the part to make a complete part. The actual configuration of the spline external space angle, 2α, together with the desired specifications of the external spline must be taken into consideration.

The procedure for sizing the tool for the rotating angular carbide end mill cutting tool and for the rotating involute carbide end mill cutting tool is substantially the same with the addition of determining the radii R1, R2, and R3 in connection with the involute tool. A design engineer sizes R1, R2 and R3 through a trial and error process based on the dimensions of the involute teeth.

The materials that can be utilized for making splines with the smilling process are any engineering material that can handle the intended loads, such as but not limited to alloy steels 8620, 8820, 4820, 4320, 4340, 4140, 9310, etc. or ductile iron grades D4512, D5506, D7003, etc., or stainless steels of the 300 series.

Figure 5:
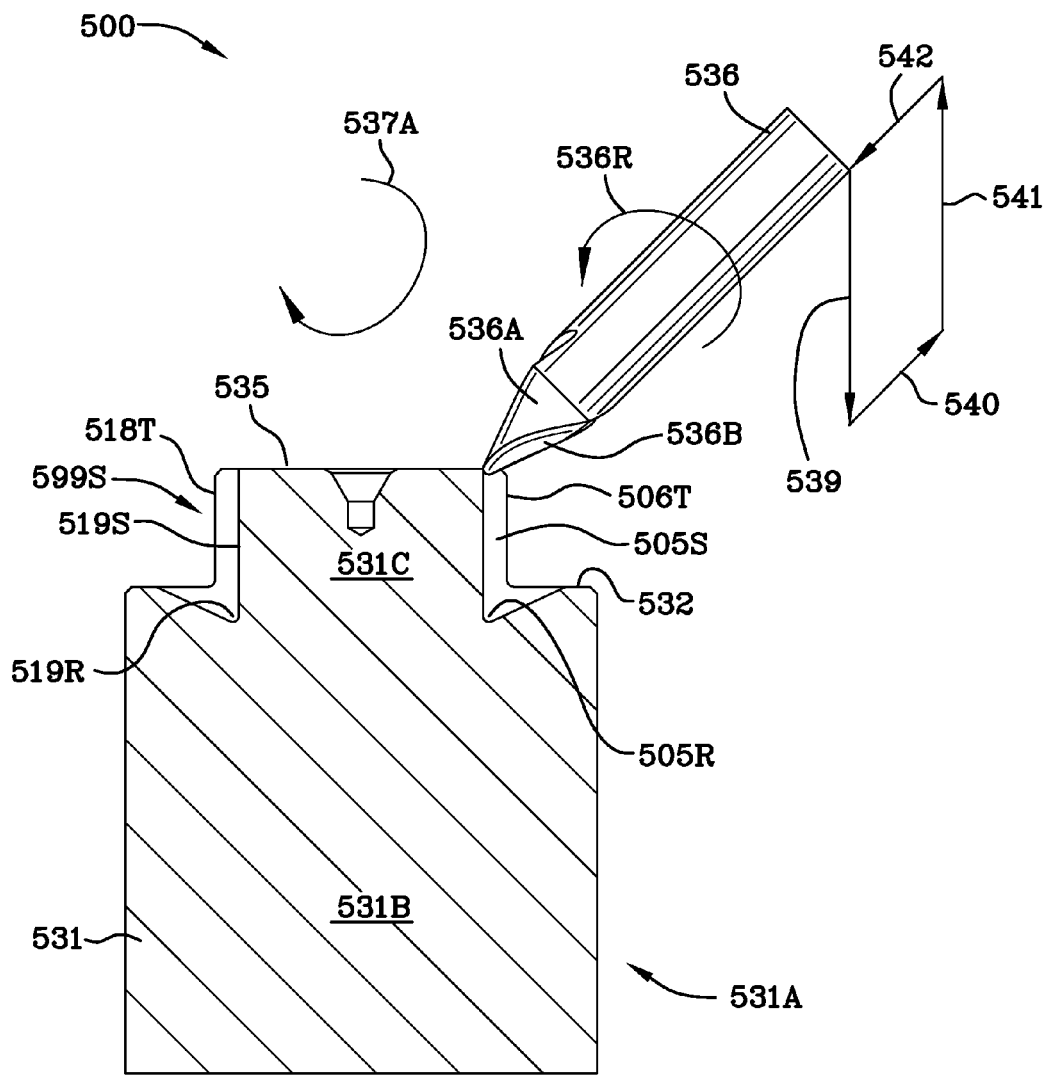
FIG. 5 is a partial cross-sectional diagrammatic view of a workpiece, taken along the lines 5-5 of FIG. 5A, being machined with an angular carbide endmill to produce an external spline with angular reliefs cut into a shoulder portion and a base portion of the workpiece.
Figure 5A:
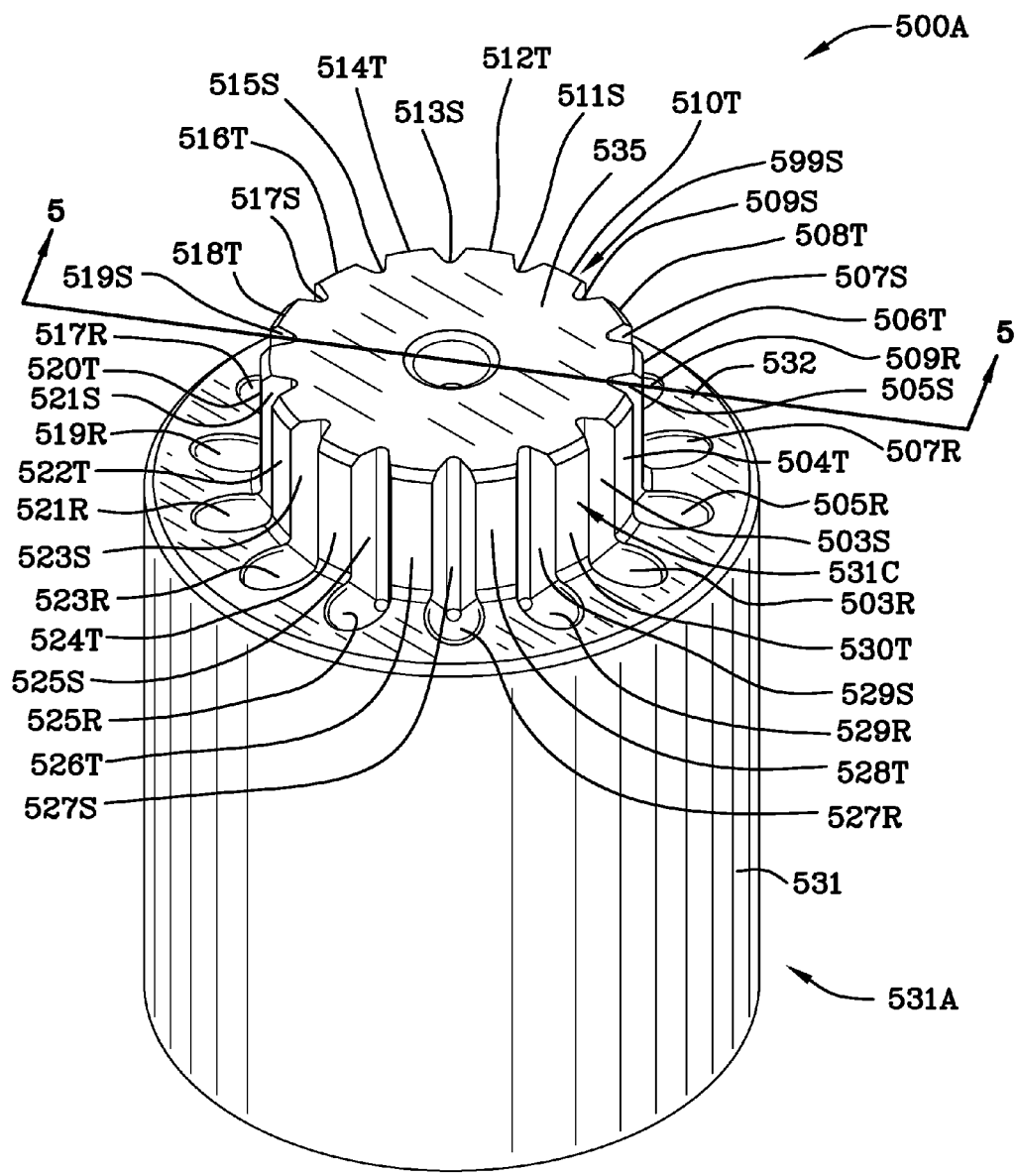
FIG. 5A is a perspective diagrammatic view of a workpiece illustrating a finished external spline on an upper cylindrical portion, and, angular reliefs for tool clearance cut into the intermediate shoulder and base portion.

FIG. 5 is a partial cross-sectional diagrammatic view 500 of a workpiece 531, taken along the lines 5-5 of FIG. 5A, being machined with an angular carbide endmill 536 to produce an external spline with angular cutting tool reliefs 503R, 505R, 507R, 509R, 511R, 513R, 515R, 517R, 519R, 521R, 523R, 525R, 527R, 529R cut into a shoulder portion 532 and a base portion 531B of the workpiece 531.

FIG. 5A is a perspective diagrammatic view 500A of a workpiece illustrating a finished external spline with external spline teeth 504T, 506T, 508T, 510T, 512T, 514T, 516T, 518T, 520T, 522T, 524T, 526T, 528T, 530T on an upper cylindrical portion 531C, and, angular reliefs 503R, 505R, 507R, 509R, 511R, 513R, 515R, 517R, 519R, 521R, 523R, 525R, 527R, 529R for tool clearance cut into the intermediate shoulder 532 and base portion 531B. Also illustrated in FIG. 5A, are the external spaces (tooth spaces) 503S, 505S, 507S, 509S, 511S, 513S, 515S, 517S, 519S, 521S, 523S, 525A, 527S, 529S for mating with internal spline teeth. The cylinder top 535 engages a counterbore engagement surface 630C as described herein below when the external spline apparatus 531A is coupled to the internal spline apparatus 631A as shown in FIG. 7.

Referring to FIGS. 5 and 5A, again, as stated above the rotary cutting tool 536 is shown at the top of the workpiece 531 where it would begin cutting. However, as shown the external space angle (tooth space) is indicated with reference numeral 505S. The tool 536 as illustrated in FIG. 5 is a right hand cutting tool and the arrow 536R illustrates rotation of the tool. Cutting flutes 536A, 536B, are shown on the tool. The tool could also be a left hand cutting tool and it could use just one flute.

The home position of the tool is at the top of arrow 541. The tool 536 is brought into engagement with the workpiece along the path of arrow 542 at the inclination angle, β. The tool next proceeds downwardly along the path of arrow 539 cutting material from the outer circumference of the upper cylindrical portion 531C which results in the cut illustrating slot/space angle/tooth space 505S and the formation of external spline tooth 506T behind the cut. Other tool paths can be used to produce the identical smilling process. For instance the home position could be higher when viewing FIG. 5. The tool continues along path 539 and cuts an angular relief into the shoulder 532 and the base 531B. Reference numeral 540 represents the retraction of the tool along the inclination angle, β. Reference numeral 541 represents the repositioning of the tool along the path 541 to the home position of the tool. While the tool is being moved to its home position, the workpiece 531 is rotated or indexed as indicated by arrow 537A to reposition the workpiece for the next smilling operation. Still referring to FIG. 5, slot/external space angle/tooth space 519S and external spline tooth 518T are illustrated. Reference numeral 519R illustrates an additional angular relief which has been cut into shoulder 532. Each tooth space has a respective angular relief.

Figure 5B:
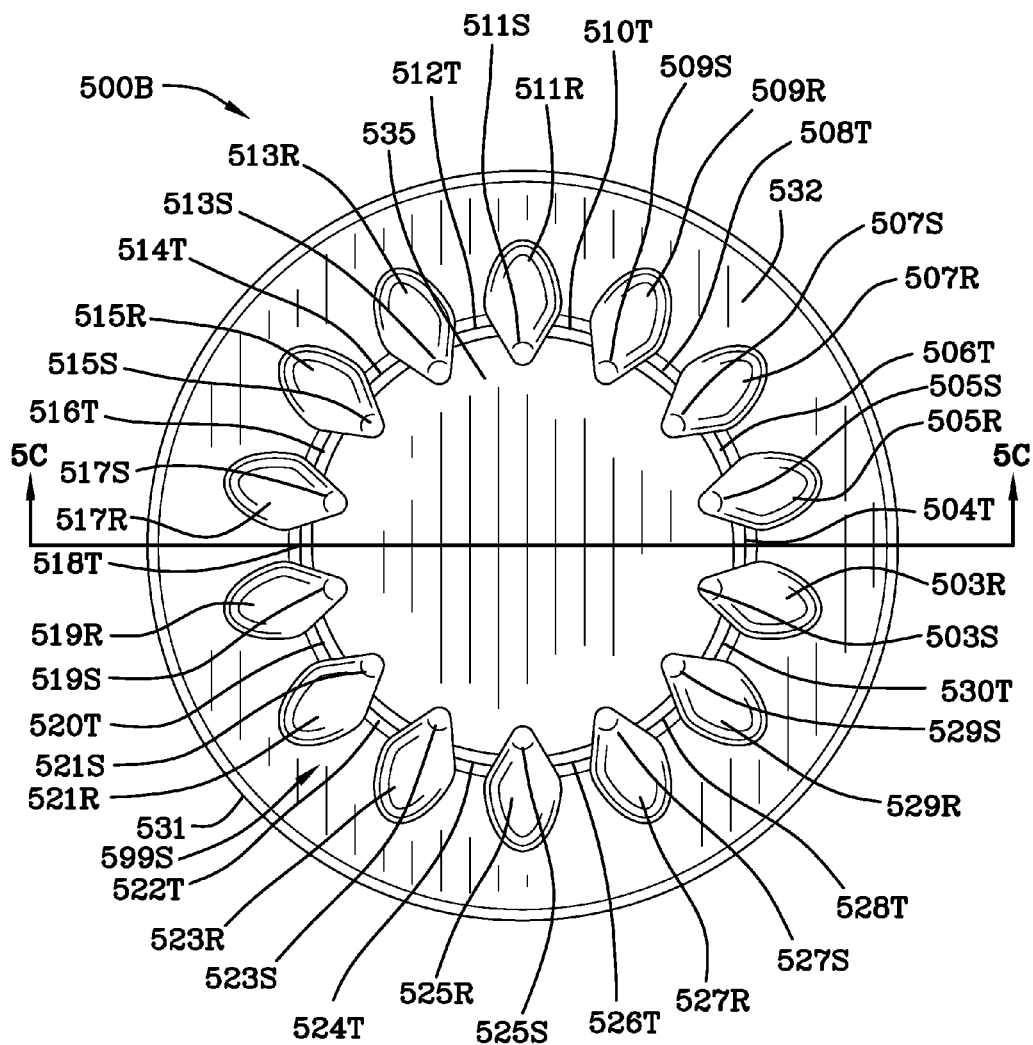
FIG. 5B is a top diagrammatic view of the workpiece depicted in FIG. 5.

FIG. 5B is a top diagrammatic view 500B of the workpiece depicted in FIG. 5 and illustrates the external spline reliefs 503R, 505R, 507R, 509R, 511R, 513R, 515R, 517R, 519R, 521R, 523R, 525R, 527R, 529R for tool clearance, the external spaces (tooth spaces) 503S, 505S, 507S, 509S, 511S, 513S, 515S, 517S, 519S, 521S, 523S, 525A, 527S, 529S for mating with internal spline teeth, and the external spline teeth 504T, 506T, 508T, 510T, 512T, 514T, 516T, 518T, 520T, 522T, 524T, 526T, 528T, 530T.

Figure 5C:
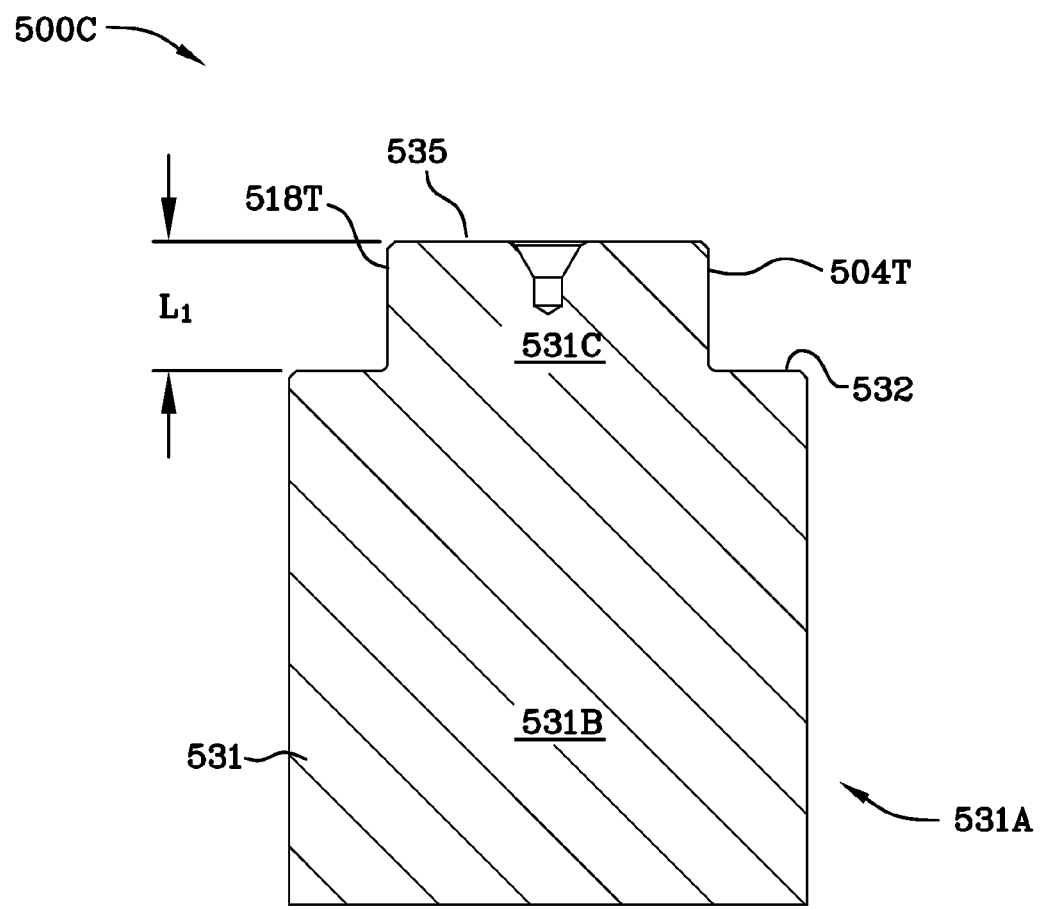
FIG. 5C is a cross-sectional view taken along the lines 5C-5C of FIG. 5B.

FIG. 5C is a cross-sectional view 500C taken along the lines 5C-5C of FIG. 5B and it is this view (FIG. 5C) of the external spline that is used in FIG. 7 as discussed hereinbelow in more detail.

Referring to FIGS. 5 and 5A, a male spline connection apparatus 531A is disclosed which comprises a base portion 531B, a shoulder portion 532 and a cylindrical portion 531C. The shoulder portion 532 resides intermediate the base portion 531B and the cylindrical portion 531C. The cylindrical portion 531C includes an external spline 599S thereon and the external spline includes a plurality of tooth spaces 503S, 505S, 507S, 509S, 511S, 513S, 515S, 517S, 519S, 521S, 523S, 525A, 527S, 529S therein circumferentially spaced apart from each other forming a plurality of external spline teeth 504T, 506T, 508T, 510T, 512T, 514T, 516T, 518T, 520T, 522T, 524T, 526T, 528T, 530T between adjacent tooth spaces. The tooth spaces are formed by sides of adjacent teeth and a fillet joining the adjacent teeth. Each of the plurality of tooth spaces includes a spline relief portion for tool clearance extending angularly into the shoulder 532 and the base portion of the male spline connection apparatus. Each of the plurality of teeth of the external spline includes sides which may be angular sides, straight sides, involute sides, full curve sides, or straight sides.

Figure 6:
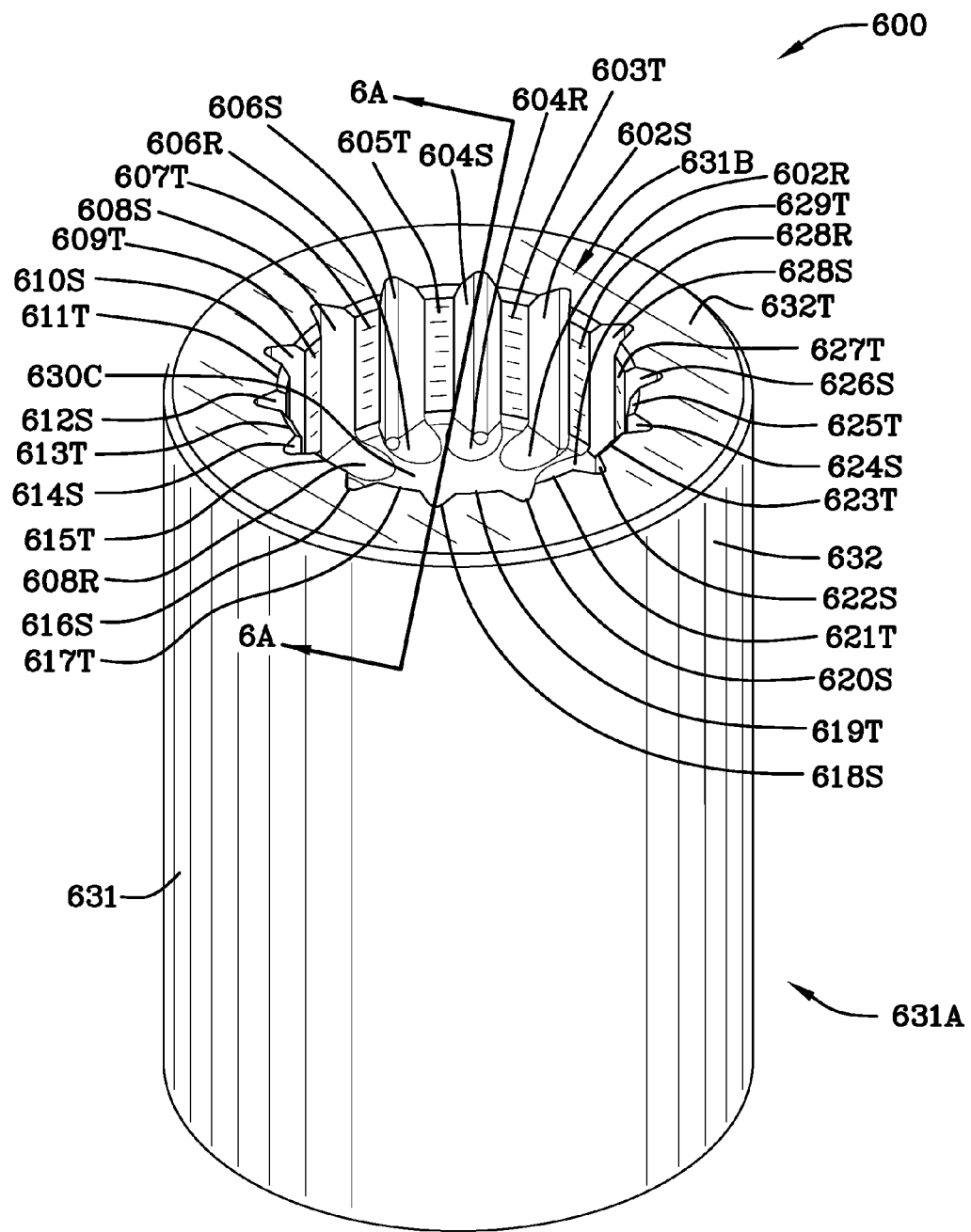
FIG. 6 is a perspective schematic view of the internal spline residing in a counterbore in the workpiece, the counterbore terminating in a counterbore engagement surface.
Figure 6A:
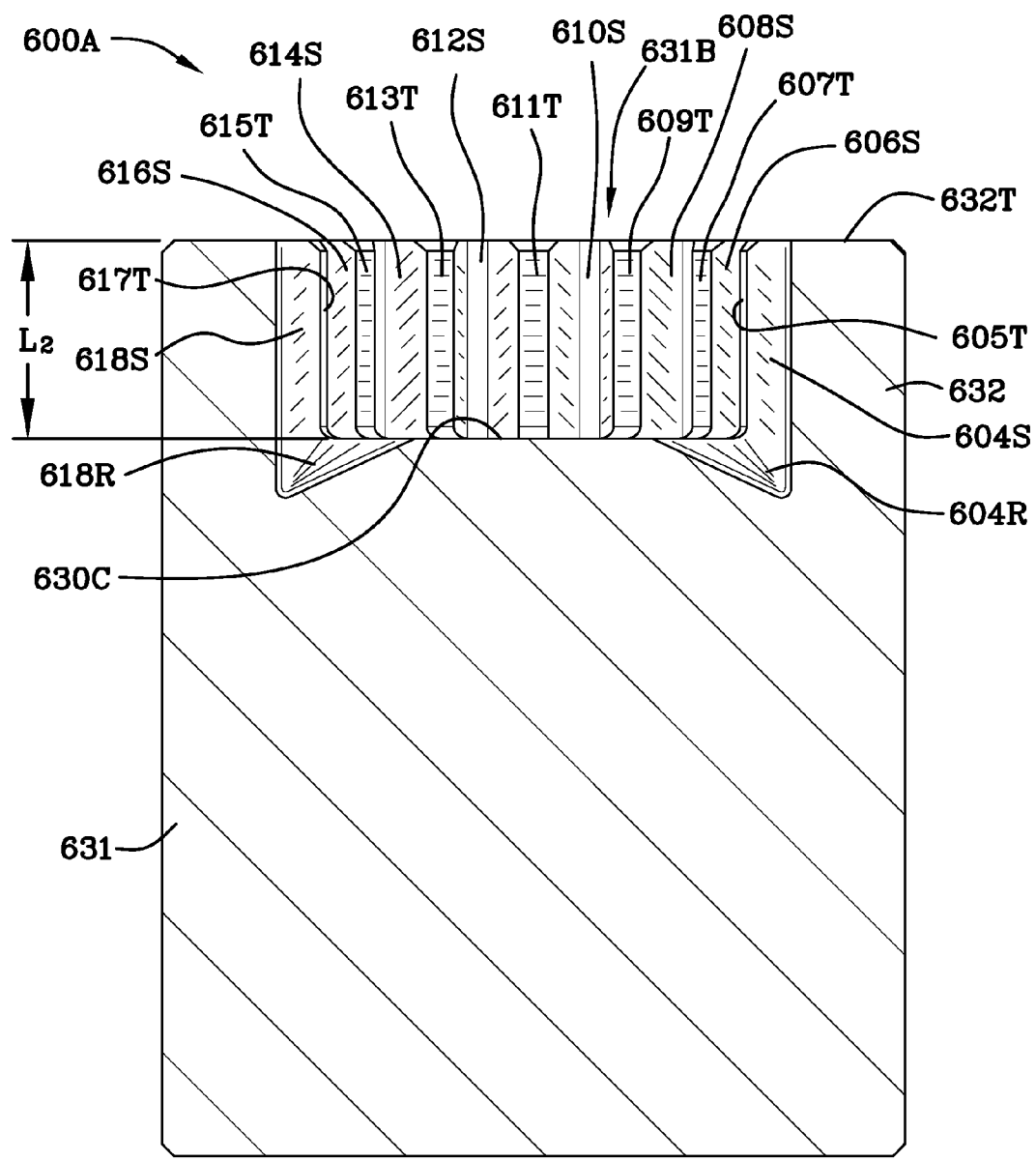
FIG. 6A is a cross-sectional view taken along the lines 6A-6A of FIG. 6 illustrating the internal spline and the angular reliefs cut into the counterbore engagement surface and the upper portion of the workpiece.
Figure 6B:
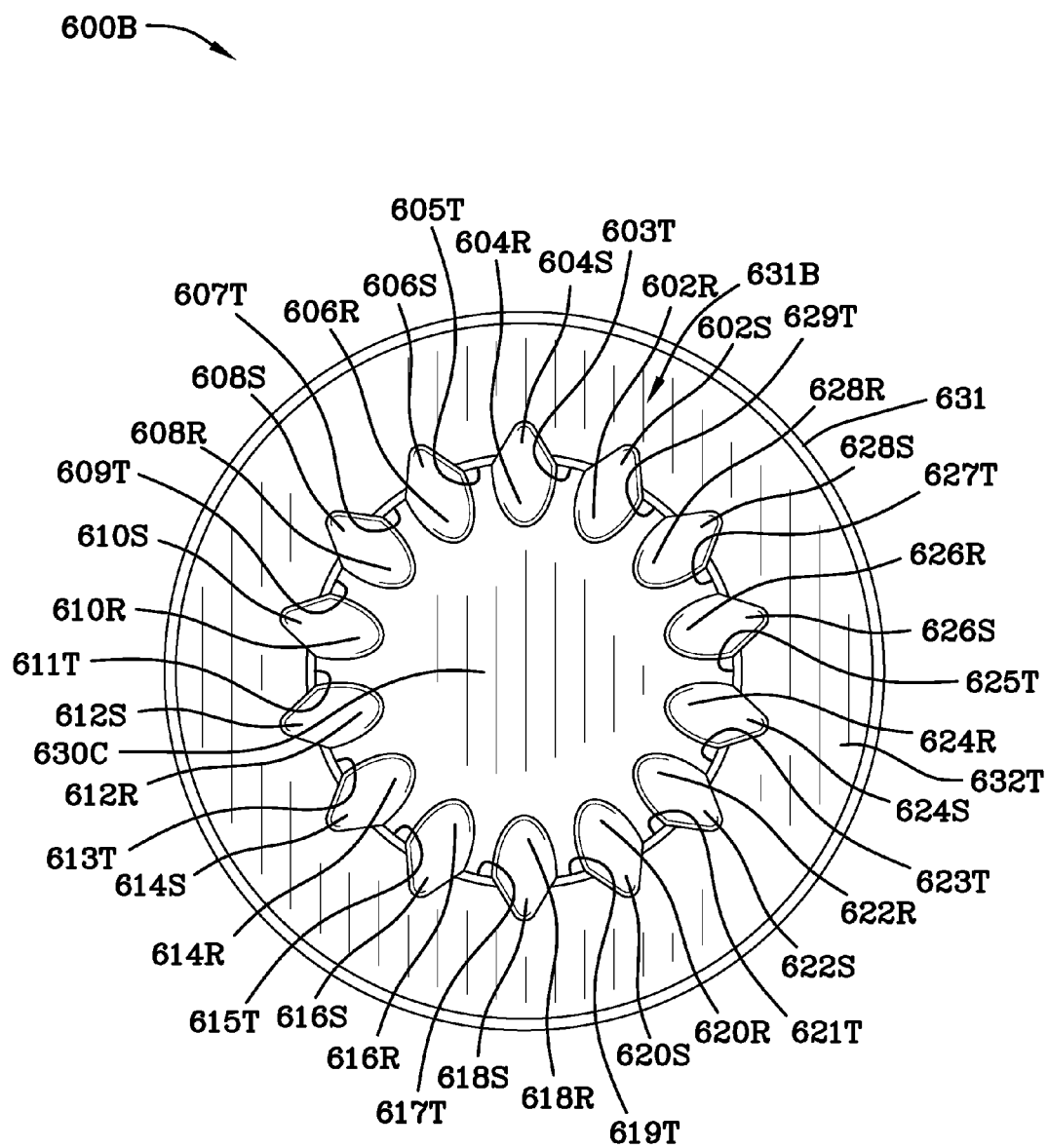
FIG. 6B is a top view of the workpiece illustrated in FIGS. 6 and 6A illustrating the upper surface of the top portion of the workpiece.

FIG. 6 is a perspective schematic view 600 of an internal spline manufactured by the smilling process wherein counterbore 631B resides generally in the center of the workpiece 631A. The workpiece 631A includes a base portion 631 and an upper portion 632. Sometimes, as used herein, the term female collar apparatus is used to define the structure set forth in FIGS. 6, 6A and 6B. Circumferential counterbore 631B terminates in an adjacent structure, namely, a counterbore engagement surface 630C. FIG. 6A is a cross-sectional view 600A taken along the lines 6A-6A of FIG. 6 illustrating the internal spline 631B, the angular tool reliefs 602R, 604R, 604R, 508R, 610R, 612R, 614R, 616R, 618R, 620R, 622R, 624R, 626R, 628R cut into the counterbore engagement surface 630C and the upper portion of the workpiece 632T. FIG. 6A is used in FIG. 7 as will be described hereinbelow in greater detail. FIG. 6B is a top view 600B of the workpiece illustrated in FIGS. 6 and 6A depicting the upper surface 632T of the top portion of the workpiece.

FIGS. 6, 6A and 6B illustrate a generally circumferential counterbore 631B in the upper portion of the workpiece 631A. A plurality of internal spaces (tooth spaces) for interengagement by external spline mating teeth, 602S, 604S, 606S, 608S, 610S, 612S, 614S, 616S, 618S, 620S, 622S, 624A, 626S, 628S are illustrated in FIGS. 6, 6A and 6B as being equally spaced about the inner circumference of the counterbore. The counterbore continues into the top of the workpiece 631A to a desired depth (or the depth can be expressed as a length) and terminates in a flat counterbore engagement surface 630C. The counterbore engagement surface 630C is an adjacent structure in which angular tool reliefs are created using the smilling process. A plurality of internal spline teeth, 603T, 605T, 607T, 609T, 611T, 613T, 615T, 617T, 619T, 621T, 623T, 625T, 627T, angular tool reliefs 602R, 604R, 604R, 508R, 610R, 612R, 614R, 616R, 618R, 620R, 622R, 624R, 626R, 628R and the counterbore engagement surface 630C are also shown in FIGS. 6, 6A and 6B. Each tooth space has a respective angular tool relief associated therewith.

Referring to FIGS. 6, 6A and 6B, a female collar connection apparatus 631A is disclosed which comprises a base portion 631 and an upper portion 632. The upper portion includes a generally cylindrically shaped hub portion 631B recessed therein. The hub portion includes an internal spline which terminates in a counterbore engagement surface 630C. The internal spline includes a plurality of tooth spaces 602S, 604S, 606S, 608S, 610S, 612S, 614S, 616S, 618S, 620S, 622S, 624A, 626S, 628S therein circumferentially spaced apart from each other forming a plurality of teeth 603T, 605T, 607T, 609T, 611T, 613T, 615T, 617T, 619T, 621T, 623T, 625T, 627T between adjacent tooth spaces. The tooth spaces are formed by sides of adjacent teeth and a fillet joining the adjacent teeth. Each of the plurality of tooth spaces includes a spline relief portion for tool clearance extending angularly into the counterbore engagement surface 630C. Each of the plurality of teeth of the internal spline includes sides which may be angular sides, straight sides, involute sides, full curve sides, or straight sides.

FIG. 7 is a cross-sectional schematic 700 of the smilled male spline apparatus 531 and the smilled female collar apparatus 631 completely interengaged or coupled together. FIG. 7 is taken along the lines 7-7 of FIG. 7C. The female collar apparatus as illustrated in FIG. 6A is illustrated in FIG. 7. The male spline apparatus 531 as is illustrated in FIG. 5C is illustrated in FIG. 7 in mating engagement with the female collar apparatus 631. Still referring to FIG. 7, when the male spline and female spline apparatus are fully coupled, the top surface 535 of the cylindrical portion of the external spline interengages the counterbore engagement surface 630C. External spline tooth 504T is shown in slot or internal space (tooth space) 618S of the internal spline apparatus. External spline tooth 518T is shown in slot or internal space (tooth space) 604S of the female member. Angular tool reliefs 618R, 604R are illustrated as being cut into the counterbore engagement surface 630C which resides in the upper portion 632. Top 632T of the female (internal) spline apparatus (female collar apparatus) engages intermediate shoulder 532 of the male (external) spline apparatus. Angular tool reliefs of the male spline are obscured in the view of FIG. 7 because the cross-sectional cut is taken through external spline teeth 504T-518T as illustrated in FIG. 5B as being along the line 5C-5C.

Still referring to FIG. 7, the effective face width (smilling), EFs, is equal to the spline connection length, SC. Utilization of the entire length of external spline teeth and internal spline teeth, wherein the lengths of the external spline teeth, $L_1$, and the internal spline teeth, $L_2$, are the same enables considerably increased load carrying ability for a given spline connection length, and a given pitch diameter of the internal spline teeth and structure. See FIG. 7B where $L_1$ and $L_2$ are shown.

Still referring to FIGS. 5-7, a spline connection apparatus 701 is disclosed therein and comprises a male spline apparatus 531A and a female collar apparatus 631A. The male spline connection apparatus 531A includes: a base portion 531, a shoulder portion 532 and a cylindrical portion 531C. The shoulder portion 532 resides intermediate the base portion 531B and the cylindrical portion, 531C. An external spline resides on the cylindrical portion 531C and includes a plurality of first tooth spaces 503S, 505S, 507S, 509S, 511S, 513S, 515S, 517S, 519S, 521S, 523S, 525A, 527S, 529S therein circumferentially spaced apart from each other forming external spline teeth between adjacent first tooth spaces. Each of the plurality of first tooth spaces are formed by sides of adjacent external spline teeth and a fillet joining the adjacent external spline teeth. Each of the plurality of first tooth spaces includes a spline relief portion for tool clearance extending angularly into the shoulder and base portion of the male spline apparatus. The female collar apparatus 631A includes: a base portion 631 and an upper portion 632. A generally cylindrically shaped hub portion is recessed in the upper portion 632 of the female collar apparatus. The recessed hub portion includes an inner circumference and an internal spline. The internal spline terminates in a counterbore engagement surface 630C. The internal spline includes a plurality of second tooth spaces 602S, 604S, 606S, 608S, 610S, 612S, 614S, 616S, 618S, 620S, 622S, 624A, 626S, 628S therein circumferentially spaced apart from each other forming internal spline teeth between adjacent second tooth spaces. The second tooth spaces are formed by sides of adjacent internal spline teeth and a fillet joining the adjacent internal spline teeth. Each of the plurality of second tooth spaces includes an internal spline relief portion for tool clearance extending angularly into the counterbore engagement surface.

Each of the plurality of external spline teeth of the external spline resides in a respective one of the plurality of the second tooth spaces of the internal spline. Each of the plurality of internal spline teeth of the internal spline resides in a respective one of the plurality of the first tooth spaces of the external spline. Each of the plurality of the external spline teeth of the external spline may interengage two of the plurality of the internal spline teeth and each of the plurality of internal spline teeth may interengage two of the plurality of the external spline teeth of the external spline.

Referring to FIGS. 5A and 7, each of the plurality of external spline teeth of the external spline of the male spline apparatus has a first length, $L_1$, as measured from the shoulder 532 to the top surface 535 of the cylindrical portion 531C. Referring to FIGS. 6A and 7B, each of the plurality of the internal spline teeth of the internal spline of the hub portion of the female collar apparatus has a second length, $L_2$, as measured from the top 632T of the upper portion 632 to the counterbore engagement surface 630C. The first length, $L_1$ of external spline is equal to the second length, $L_2$, of the internal spline. The first, $L_1$ and second, $L_2$ lengths are the effective face width, EFs, of the spline connection apparatus made by the smilling process as shown in FIG. 7.

Referring to the cylindrical portion 535 of the male spline apparatus 531A engages the counterbore engagement surface 630C of the generally cylindrically shaped hub portion recessed in the upper portion 632 of the female collar apparatus 631A and the shoulder 532 of the male spline apparatus 531A engages the top surface 632T of the upper portion 632 of the female collar apparatus 632. As stated above, a portion of the plurality of the external spline teeth interengage a portion of the plurality of the internal spline teeth. The engagement of the teeth may be full engagement or partial engagement.

Another example or statement of the invention refers to a spline connection apparatus which includes a male member and female member. The male member includes a shoulder portion 532 and a cylindrical portion 531C. The cylindrical portion 531C of the male member extends from the shoulder portion to the top of the upper portion and includes an external spline 599S thereon having a first length, $L_1$. The female member includes a base portion 631 and an upper portion 632. The upper portion includes a counterbore 631 therein having an internal spline having a second length, $L_2$. The internal spline terminates in a counterbore engagement surface 630C. The male and female members are coupled together with the shoulder portion of the male member engaging the upper portion of the female member. The upper surface of the cylindrical portion of the male member engages the counterbore engagement surface of the female member. The first, $L_1$, and second, $L_2$, lengths of the splines are equal. The external spline is completely intermeshed with the internal spline and the effective face width length, EFs of the smilled connection is equal to the first, $L_1$, and second, $L_2$, length of the splines.

Figure 7A:
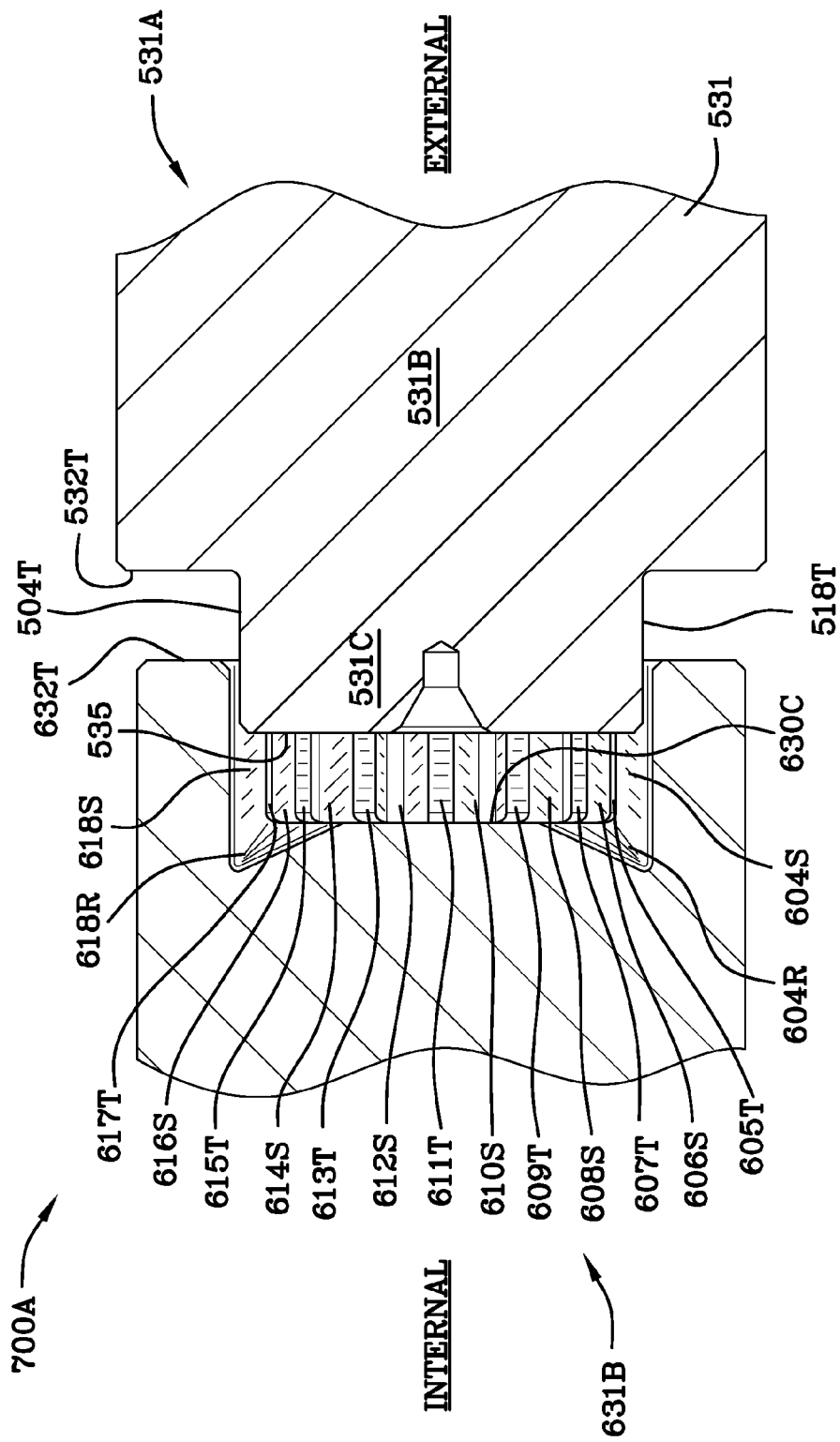
FIG. 7A is a cross-sectional schematic of the male spline apparatus and the female collar apparatus partially interengaged or coupled together.

FIG. 7A is a cross-sectional schematic 700A of the male spline apparatus 531 and the female collar apparatus 631 partially interengaged or coupled together. FIG. 7A illustrates female internal spline teeth 605T, 607T, 609T, 611T, 613T, 615T and 617T which interengage with slots/space angles/tooth spaces in the external spline. Tooth 504T partially engages slot or space (tooth space) 618S and tooth 518T partially engages slot or space (tooth space) 604S. Tooth spaces 604S, 606S, 608s, 610S, 612S, 614S, 616S and 618S as illustrated in FIG. 7A as well. It will be noted that external means are used to ensure that the spline is held together as, for example, when it is fully engaged as shown in FIG. 7.

Figure 7B:
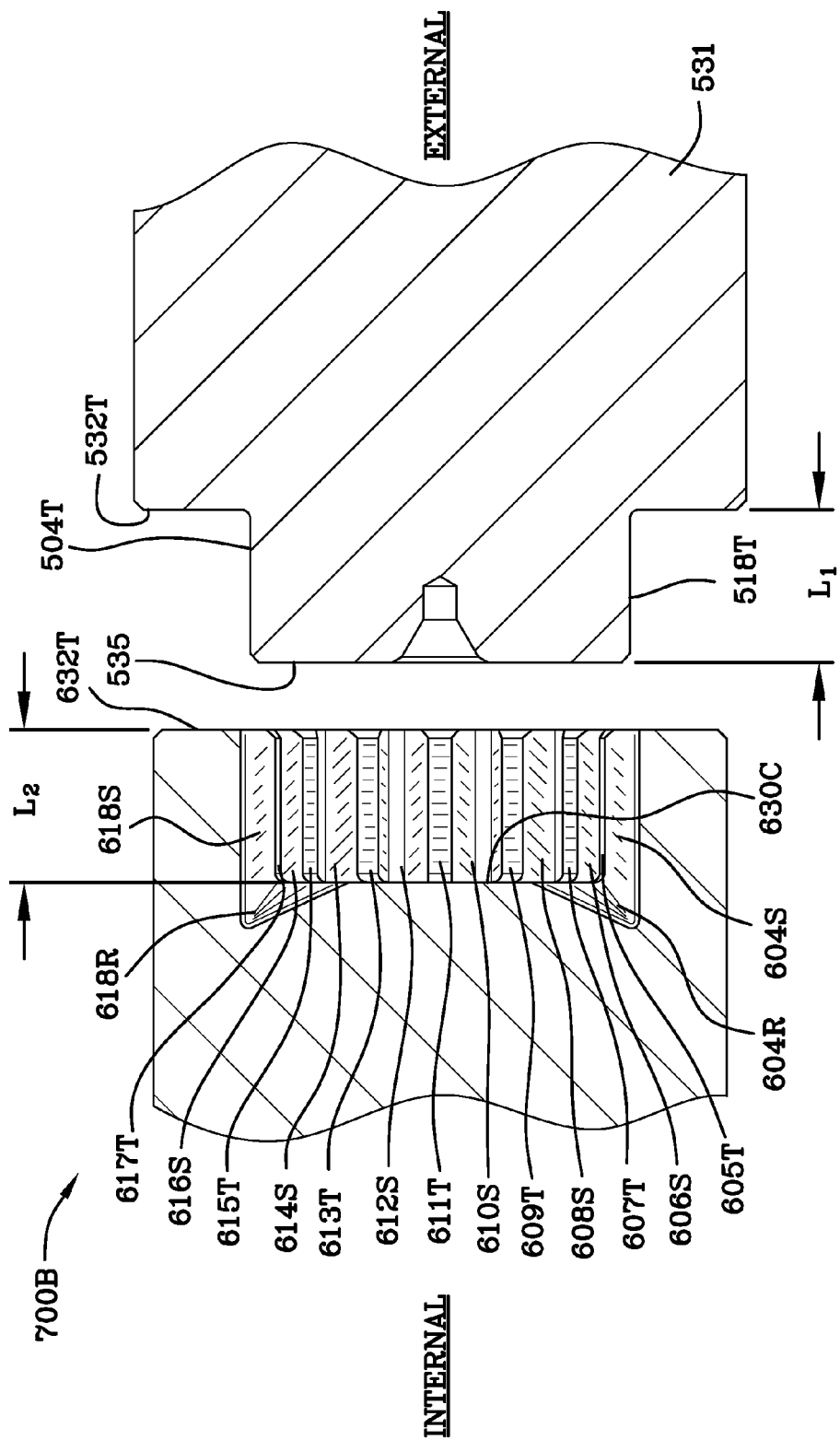
FIG. 7B is a cross-sectional view of the male spline apparatus and the female collar apparatus separated apart from one another.
Figure 7C:
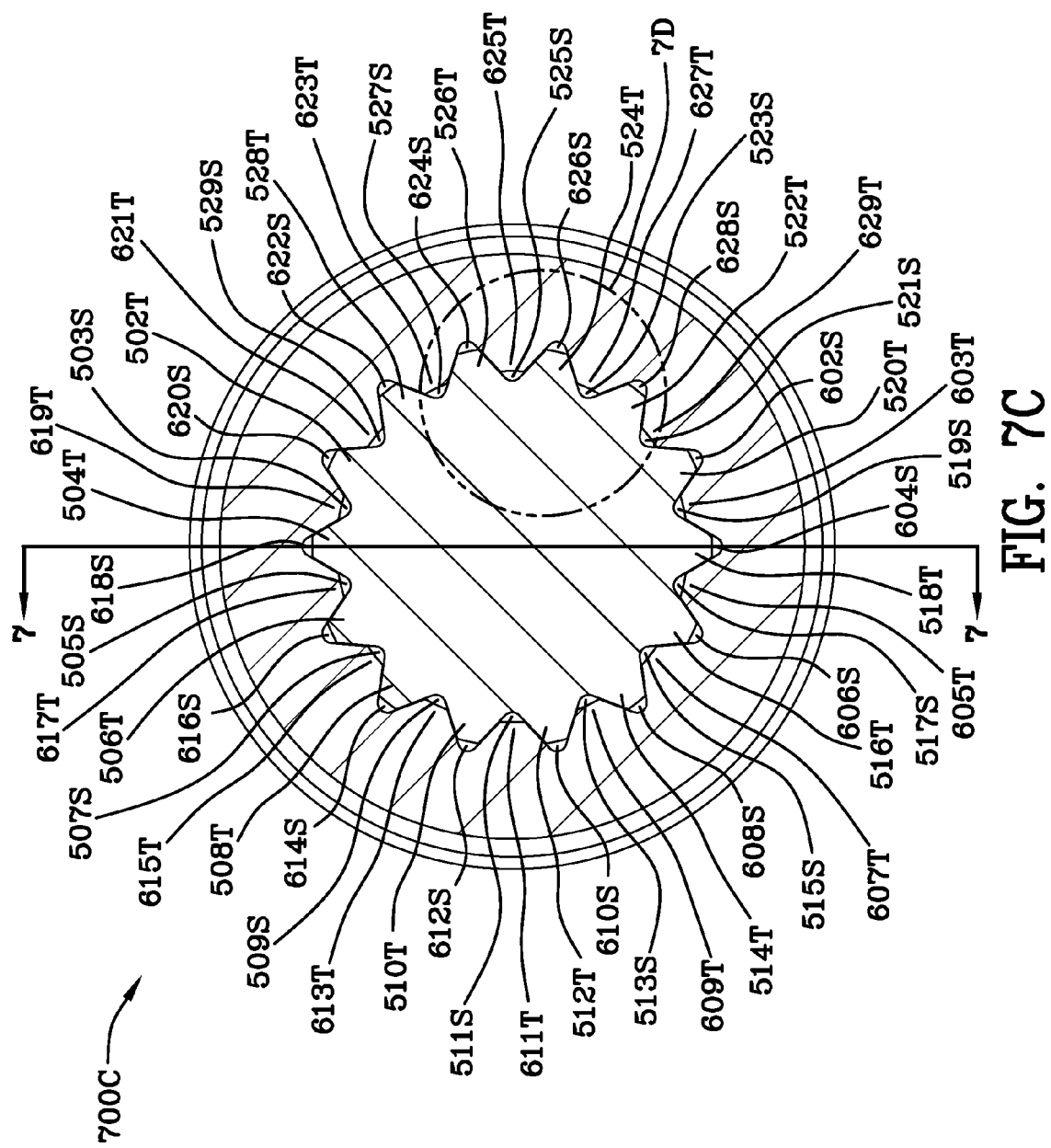
FIG. 7C is a cross-sectional view taken along the lines 7C-7C of FIG. 7 illustrating the external spline of the male spline apparatus and the internal spline of the female spline apparatus in interengagement.
Figure 7D:
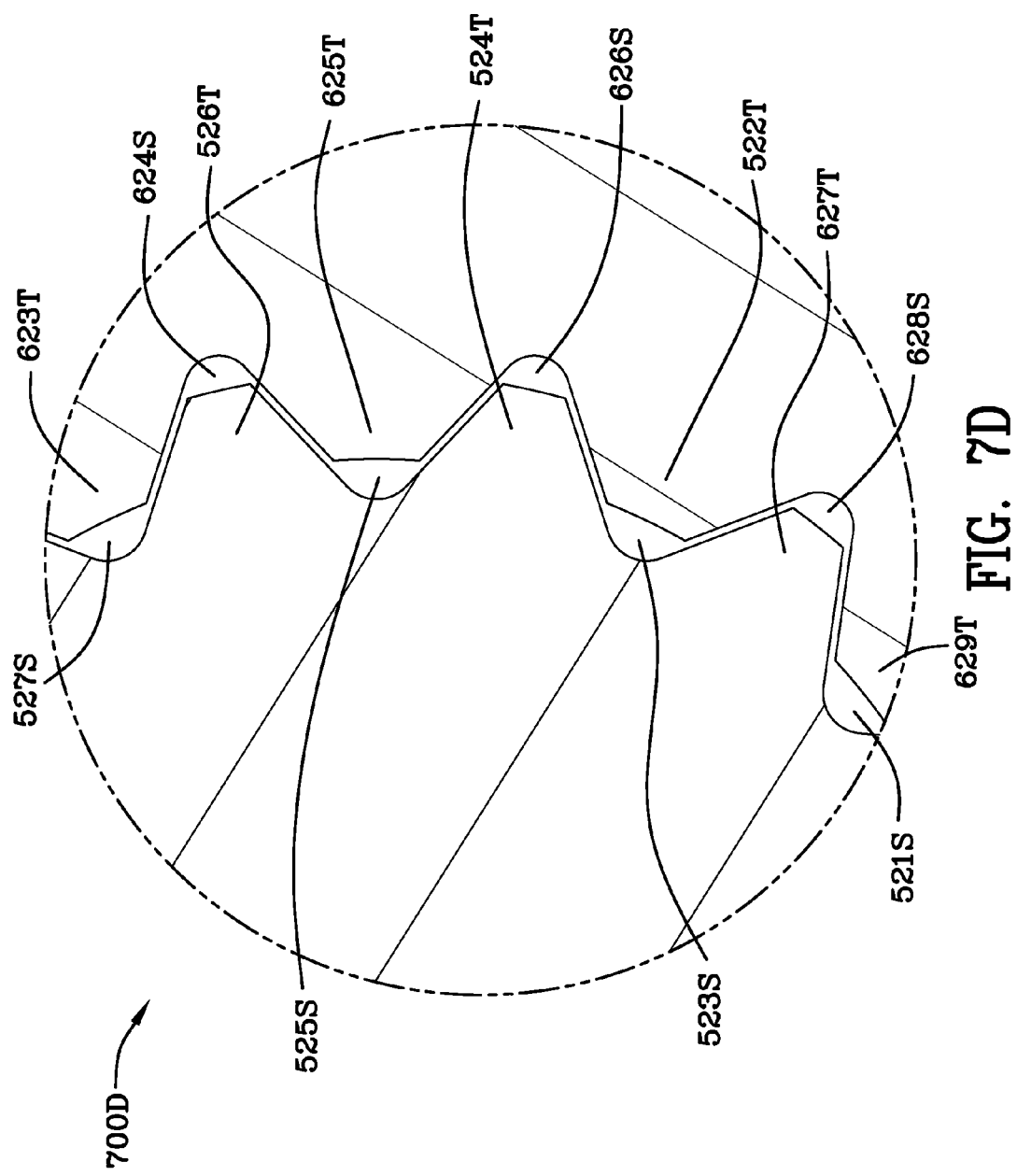
FIG. 7D is an enlarged portion of FIG. 7C.

FIG. 7B is a cross-sectional view 700B of the male spline apparatus 531 and the female collar apparatus 631 separated apart from one another. FIG. 7C is a cross-sectional view 700C taken along the lines 7C-7C of FIG. 7 illustrating the external spline of the male spline apparatus and the internal spline of the female spline apparatus in interengagement. All internal spline teeth, all external spline teeth, all external slots/space angles/tooth spaces, and all internal slots/space angles/tooth spaces are shown in FIG. 7C. FIG. 7D is an enlarged portion 700D of FIG. 7C. External spline teeth 520T, 522T, 524T are illustrated in the enlarged view 700D as are internal teeth 601T, 627T, and 625T. Exterior slots or tooth spaces 521S, 523S and 525S are illustrated in FIG. 7D as are interior slots or tooth spaces 602S, 628S, and 626S.

Figure 3:
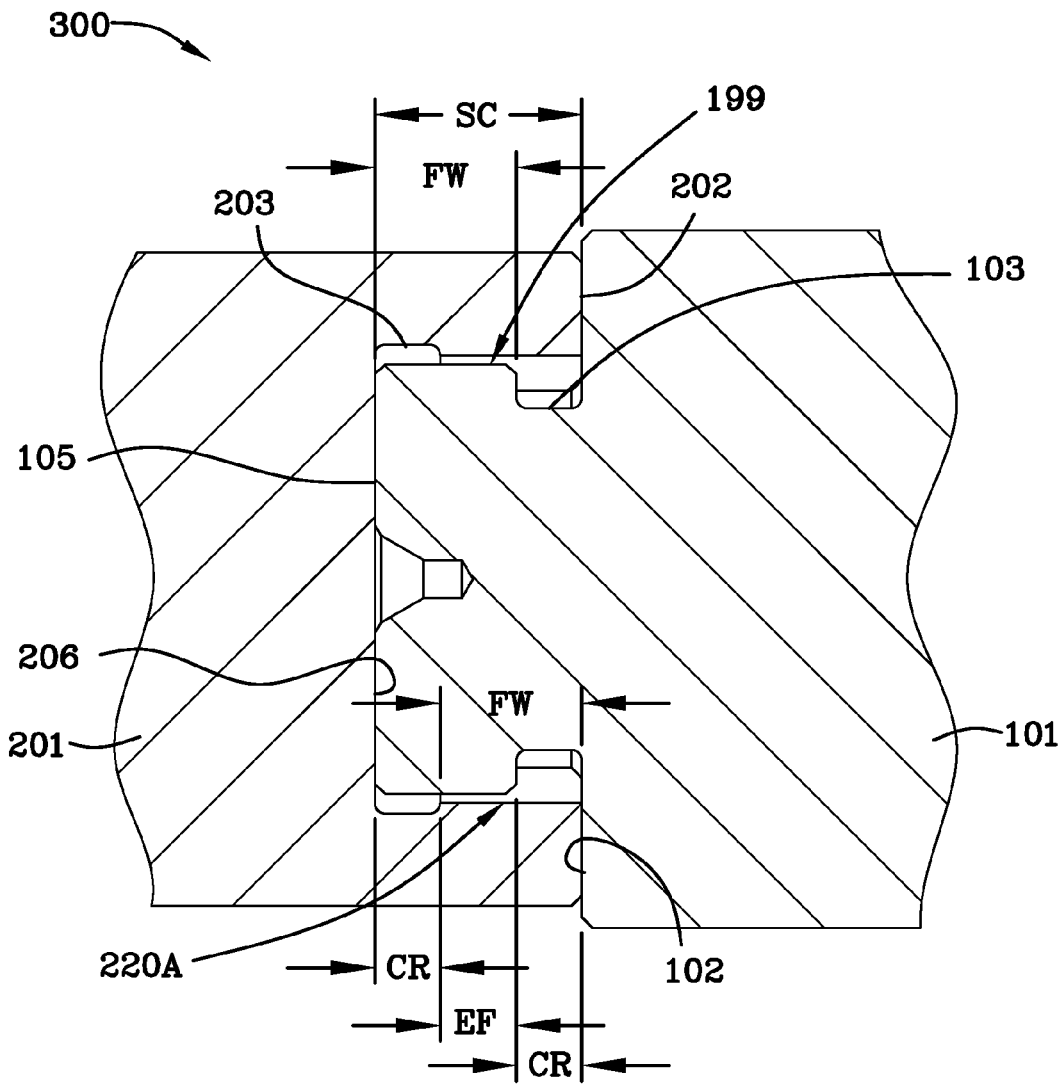
FIG. 3 is a cross-sectional schematic view of a prior art internal and external spline coupled together illustrating the effective face width, annular cutter reliefs and the total length of the spline connection.

FIG. 7E is a cross-sectional schematic view 700E of both FIG. 7 and FIG. 3, shown in relation to each other, illustrating that the apparatus shown in FIG. 7 made by the smilling process has an effective face width EFs equal to the length of the spline connection, SC, and that the effective face width EF of the prior art in FIG. 3 is much smaller than EFs for the same length of spline connection, SC. As indicated in FIG. 3, the manufactured face width, FW, of the exterior spline 199 and the interior spline 220A are equal in length.

The effective face width EF of the prior art is as follows:

$$EF = SC - 2CR$$

and is much smaller than the effective face width (smilling), EFs, as follows:

$$EFs = SC$$

FIG. 7E allows a direct graphical comparison of the smilling spline connection to the prior art of FIG. 3. The smilled spline connection is much more efficient and for a given connection length, SC, the effective width EFs of the smilled connection is much larger than the EF of the prior art.

Figure 8:
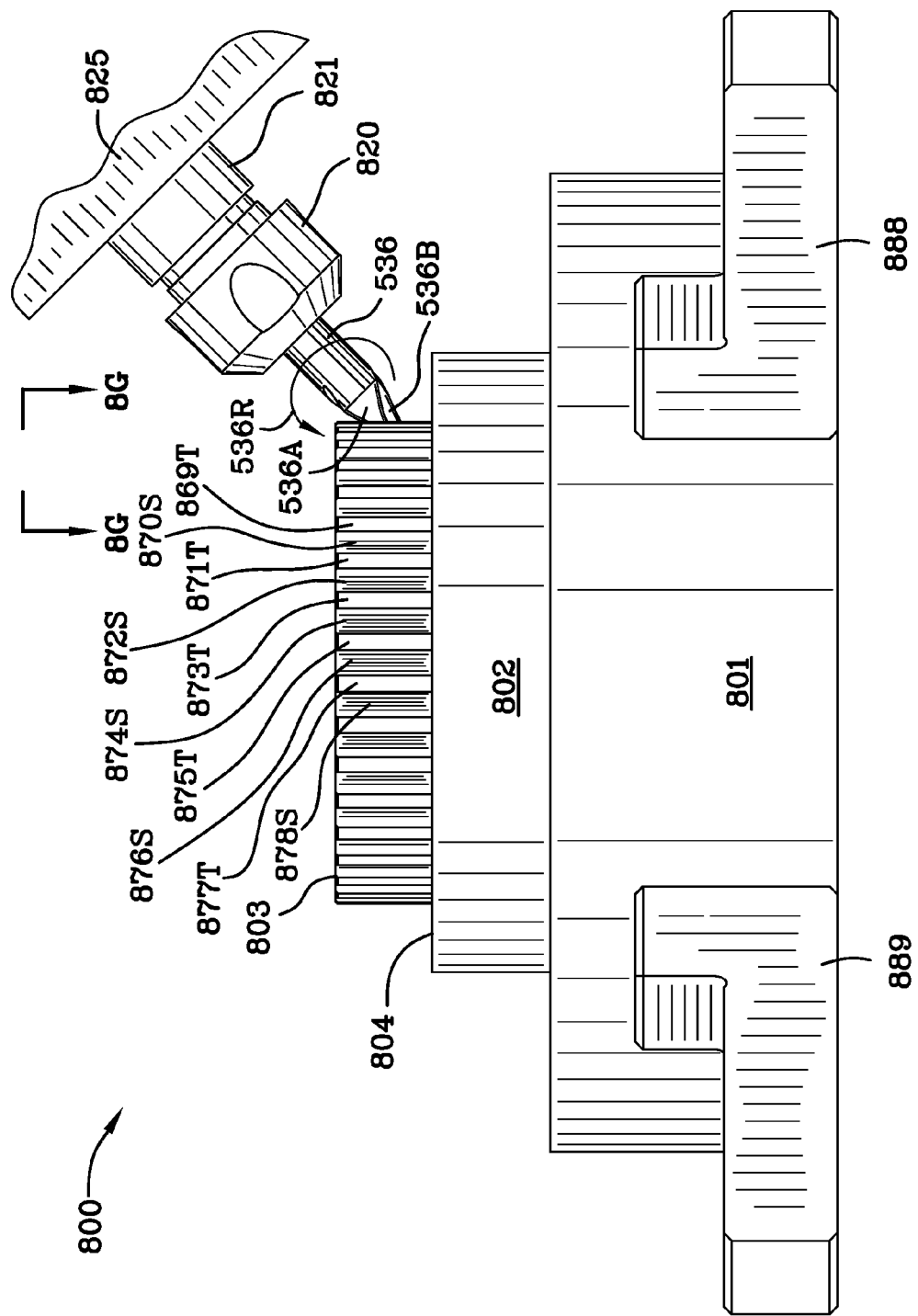
FIG. 8 is a front view of an example of the invention, namely, a male spline apparatus illustrating an external spline being smilled on a workpiece using an endmill tool oriented at an inclination angle of 45°.

FIG. 8 is a front view 800 of an example of the invention, namely, a male spline apparatus illustrating an external spline 899 being smilled on a workpiece using an endmill tool oriented at an inclination angle of 45°. Reference numerals 869T, 871T, 873T, 875T, 877T refer to external spline teeth of the example of FIG. 8 and reference numerals 870S, 872S, 874S, 876S, 878S refer to the space angles (or tooth spaces) for receiving teeth of the mating internal spline. Reference numeral 801 refers to the base of the workpiece, reference numeral 802 refers to the intermediate portion of the workpiece, reference numeral 803 refers to the top of cylindrical portion of the workpiece and reference numeral 804 refers to the shoulder on workpiece. Reference numeral 820 refers to the tool holder, reference numeral 821 refers to the chuck, and reference numeral 825 refers to the Mazak, 5 axis end mill. Any end mill capable of orienting the rotary cutting tool 536 at a suitable inclination angle will be suitable for performing the smilling process. Reference numerals 888, 889 represent chucks holding the workpiece in place.

An additional advantage of the smilling process is reduced machine set-up time as a machine such as, for example, a Mazak 5-axis endmill is able to machine all of the features of one side of the workpiece with one set-up of the machine and the workpiece does not have to be transported to other work stations around a shop. Still additionally, since all of the machining operations for a given side of the workpiece are performed by a single endmill such as the Mazak 5-axis endmill, alignment errors are virtually eliminated. In other words, if one of the external spline teeth is to be aligned with respect to another feature of the workpiece, or, a particular circumferential position of the workpiece is to be aligned with respect to another feature of the workpiece, then since there is a single chucking per side of the workpiece, misalignment errors due re-chucking (multiple set-ups) are eliminated.

Figure 8A:
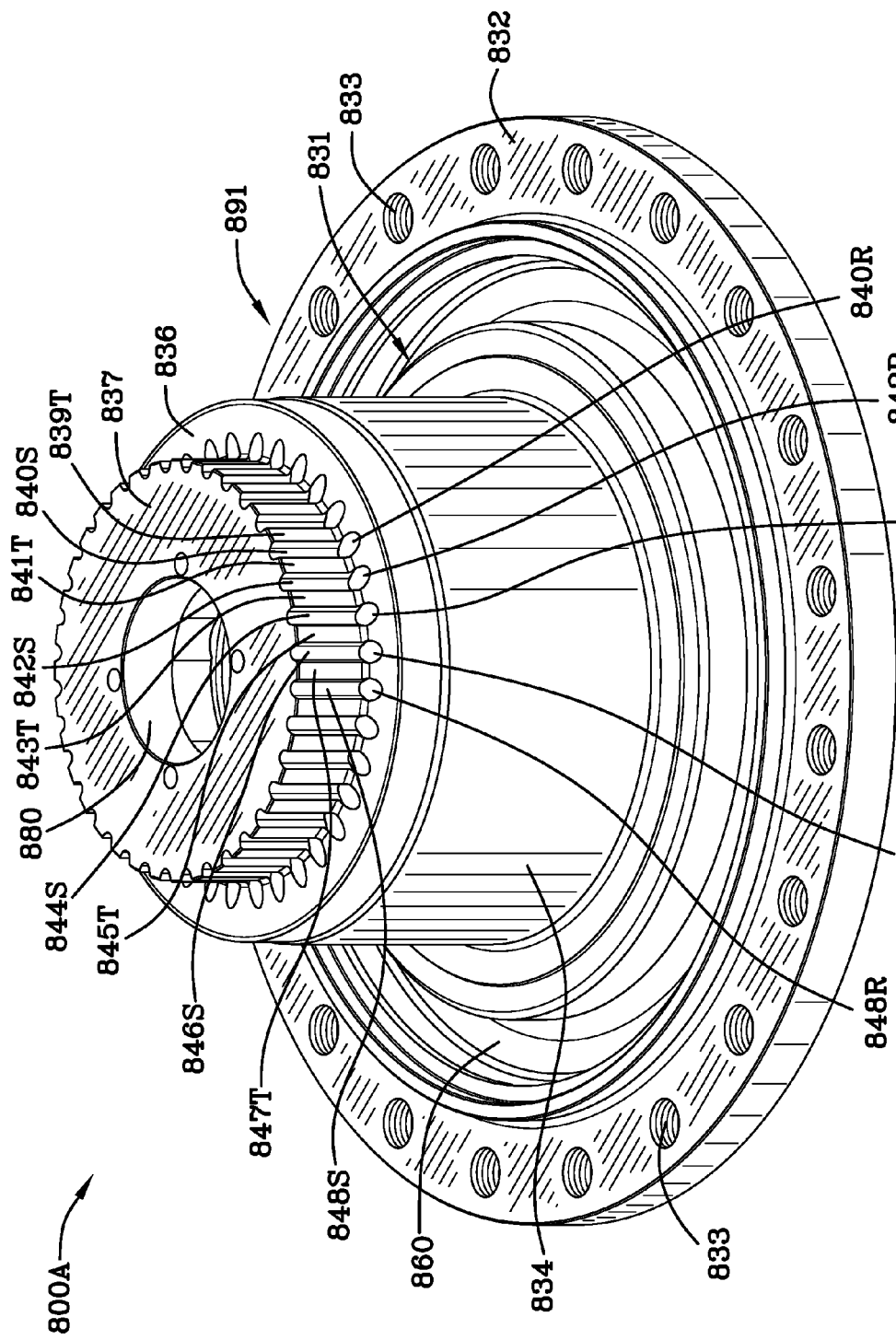
FIG. 8A is a perspective view 800A of another workpiece.

FIG. 8A is a perspective view 800A of another workpiece 831, a spindle. Rim 832 includes threaded bolt holes for affixing the spindle to another structure. Recess 860 extends circumferentially around the cylindrical spindle 834. Passageway 880 passes through the spindle. Shoulder 836 is a structure adjacent the external spline 897. External spline teeth 839T, 841T, 843T, 845T, space angles/tooth spaces/slots 847T, 840S, 842S, 844S, 846S, 848S for receiving a tooth of a mating internal spline, and tool clearance reliefs 840R, 842R, 844R, 846R, 848R are illustrated in FIG. 8A.

Figures 8B, 8C:
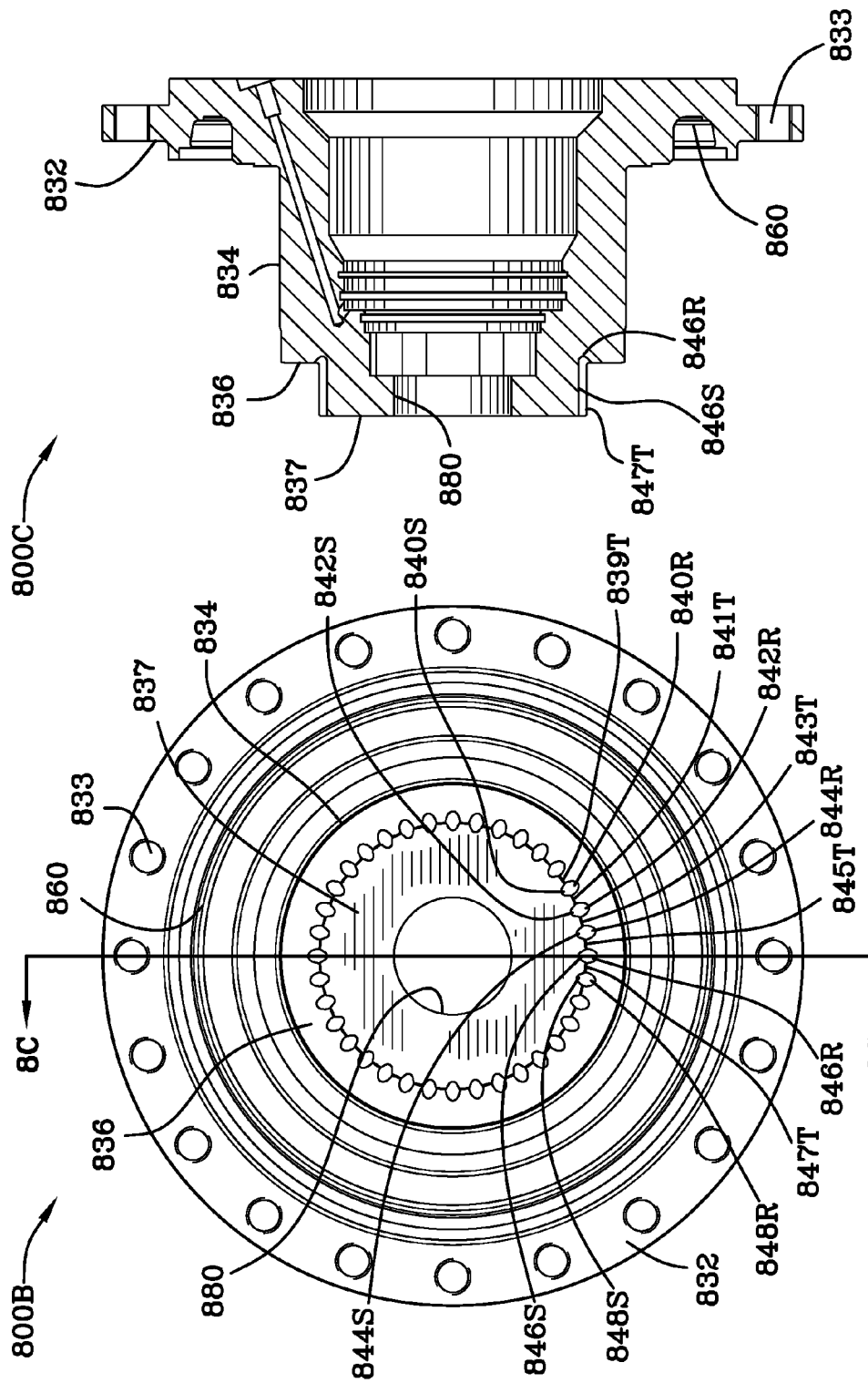
FIG. 8B is a top view 800B of the workpiece of FIG. 8A.
FIG. 8C is a cross-sectional view 800C of FIG. 8B taken along the lines 8C-8C of FIG. 8B.

FIG. 8B is a top view 800B of the workpiece/spindle 831 of FIG. 8A illustrating the features set forth in FIG. 8A. FIG. 8C is a cross-sectional view 800C of the top view of spindle/workpiece 831 of FIG. 8B taken along the lines 8C-8C of FIG. 8B illustrating tooth space 846S and relief 846R.

Figure 8D:
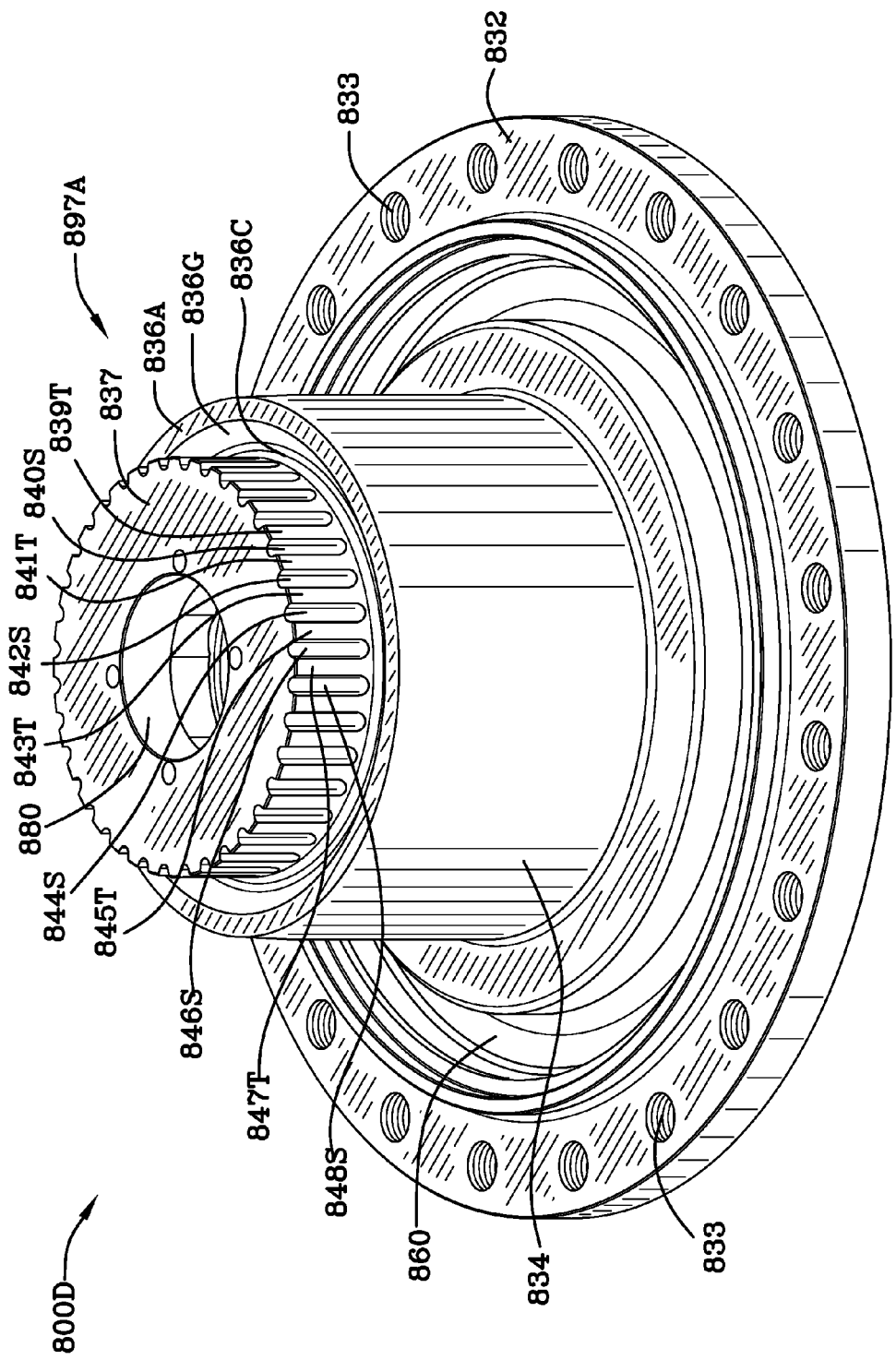
FIG. 8D is another example of the invention, namely, a workpiece similar to the workpiece illustrated in FIGS. 8 and 8A, with a circumferential relief in the shoulder adjacent the external spline.
Figure 8G:
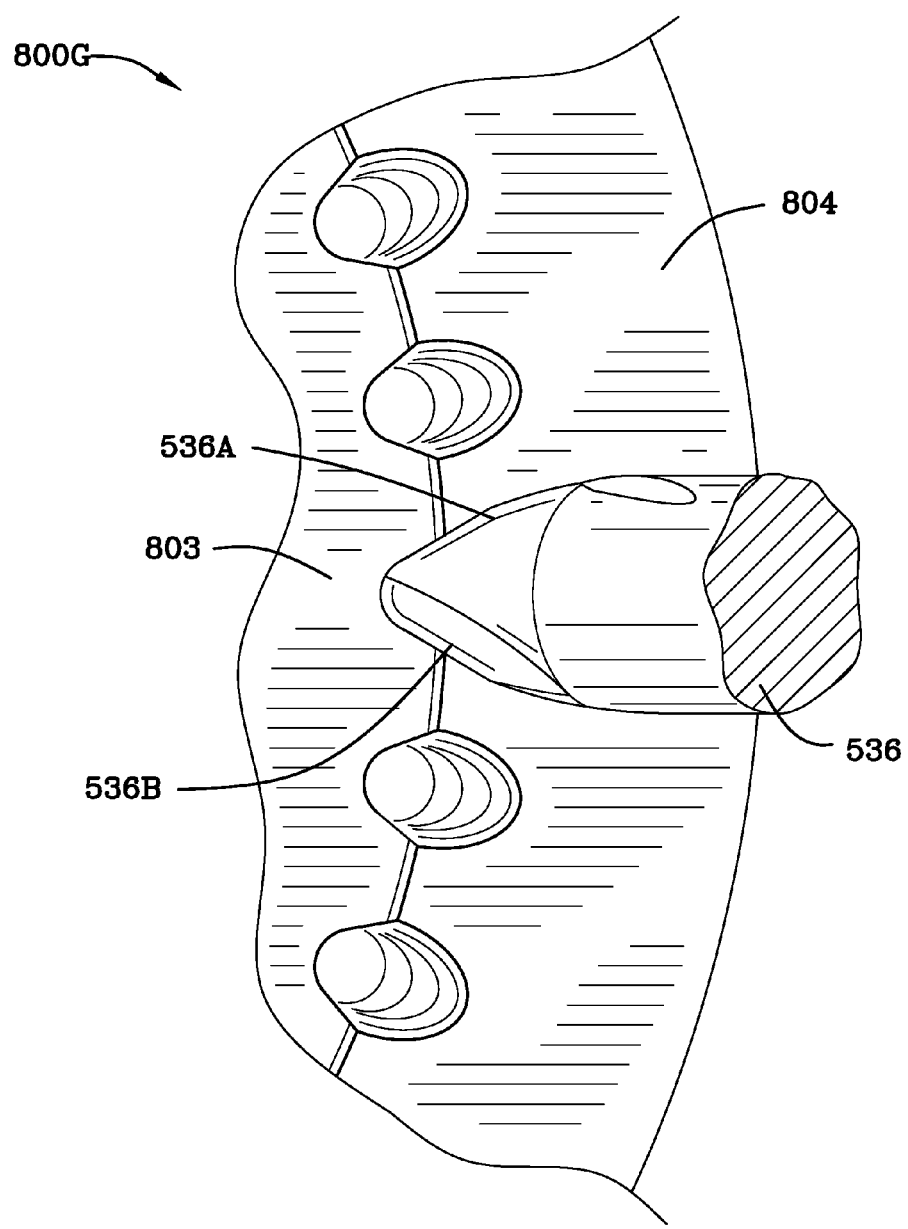
FIG. 8G is a top view taken along the lines 8G-8G of FIG. 8 illustrating the tool smilling an external space (tooth space) into a cylindrical portion of male spline apparatus which is capable of mating with a tooth of an internal spline.

FIG. 8D is another example of the invention, namely, a workpiece similar to the workpiece illustrated in FIGS. 8 and 8A shown in a perspective view 800D, with a circumferential groove 836G in the shoulder 836A adjacent the external spline 897A. In the view of FIG. 8D, a groove 836G and a chamfer 836C within the groove are shown. In the process to make the tooth spaces of the example of FIG. 8D, tool clearance reliefs are not necessary as the groove 836G functions as the relief. FIG. 8E is a top view 800E of FIG. 8D illustrating the same elements and features of FIG. 8D. FIG. 8F is a cross-sectional view taken along the lines 8F-8F of FIG. 8E illustrating tooth space 846S, groove 836G and the chamfer 836C.

FIG. 8G is a top view taken along the lines 8G-8G of FIG. 8 illustrating the tool smilling an unnumbered external tooth space into a cylindrical portion of male spline apparatus 831 which is capable of mating with a tooth of an internal spline. FIG. 8G is used in connection with FIG. 9C to illustrate some of the aspects of the tool.

Figure 10:
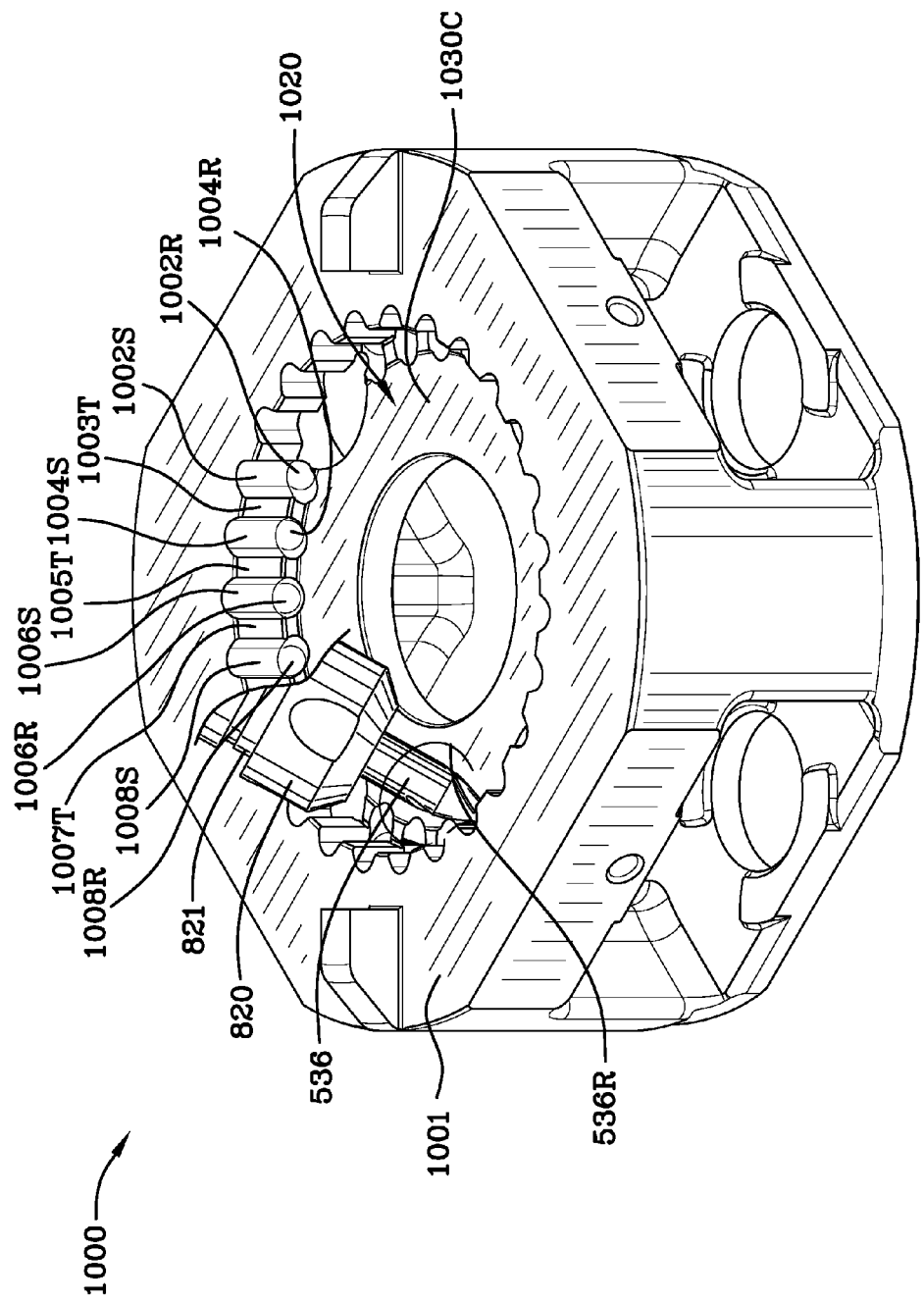
FIG. 10 is a carrier with counterbore and internal spline therein made by the smilling process.
Figure 10A:
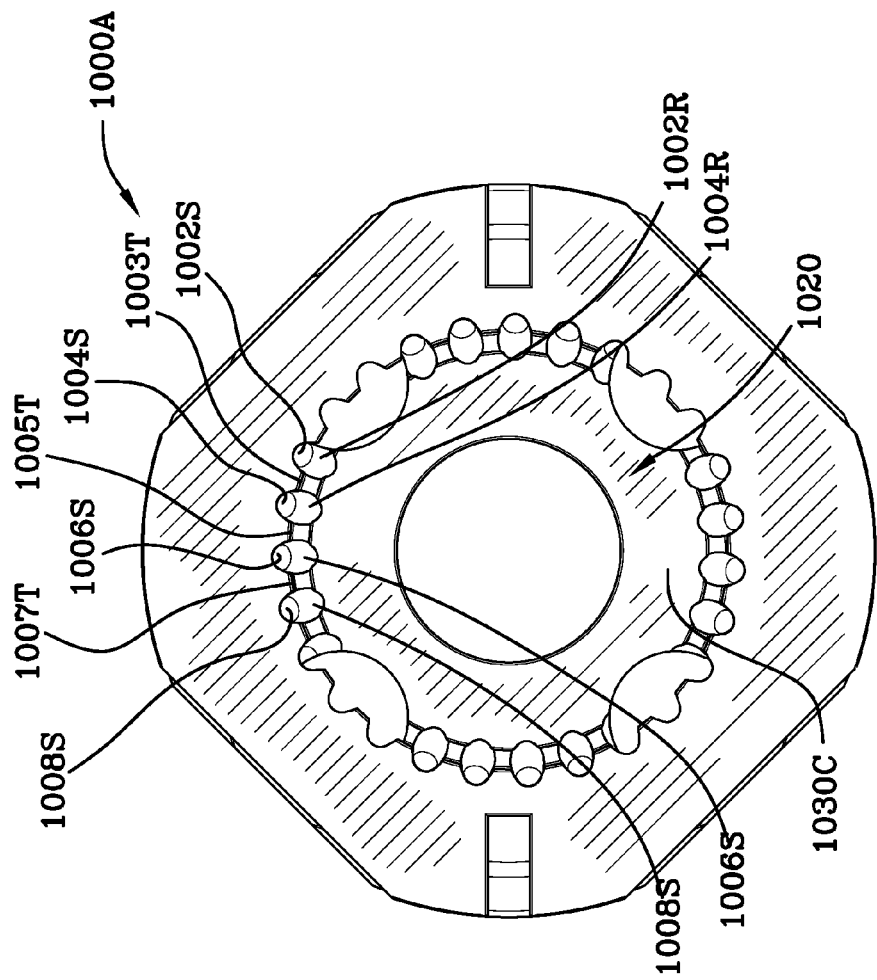
FIG. 10A is a top view of FIG. 10.

FIG. 10 is a perspective view of a carrier 1000 with counterbore and internal spline 1020 therein made by the smilling process. FIG. 10A is a top view 1000A of FIG. 10. The carrier includes a plurality of teeth 1003T, 1005T, 1007T, equally spaced about the inner circumference of the device. Tooth spaces 1002S, 1004S, 1006S and 1008S are equally spaced about the inner circumference of the carrier and are capable of mating with external spline teeth. Carbide cutting cone tool 536 is shown in the process of smilling a tooth space in the inner circumference of the counterbore 1020 as described above.

A process for manufacturing a spline in proximity to an adjacent structure is disclosed and claimed which includes the step of securing a workpiece as well as many other steps. Referring to FIGS. 5 and 9, the workpiece 531A includes an upper cylindrical portion 531C and an adjacent structure 532, and the upper cylindrical portion includes an end or top portion 535 and a length. A rotary cutting tool 536 is oriented at an inclination angle, β, with respect to the upper cylindrical portion 531C of the workpiece and, of course, the rotary cutting tool 536 is rotated 536R. An end portion 535 of the upper cylindrical portion of the workpiece is engaged by moving the tool 536 from its home position (tip of the 541 arrow) by the rotating rotary cutting tool 536. The rotary cutting tool is moved along the line or vector 539 from the end portion 536 of the upper cylindrical portion of the workpiece removing material by its cutting action along the length of the upper cylindrical portion 531C and into the adjacent structure 532 of the workpiece 531A forming a rotary cutting tool relief 505R. Tooth spaces, such as tooth space 505S, are formed by the cutting action of the tool 536. Next, the rotary cutting tool 536 is retracted along the line or vector 540 from the adjacent structure of the workpiece along the angle of inclination of the rotating rotary cutting tool 536. The rotary cutting tool is then returned vertically along the line or vector 541 to its initial position (home) and the workpiece is positioned for the next smilling operation. The workpiece 531A is rotated, or indexed, after cutting each tooth space so that another tooth space may be formed. A spline tooth is formed between two spaced apart tooth spaces. The steps of: engaging the end portion of the upper cylindrical portion of the workpiece with the rotating rotary cutting tool; moving the rotating rotary cutting tool from the end portion of the upper cylindrical portion of the workpiece removing material by its cutting action along the length of the upper portion and into the adjacent structure of the workpiece forming a rotary cutting tool relief; and, retracting the rotary cutting tool from the adjacent structure of the workpiece along the angle of inclination of the rotating rotary cutting tool are then repeated.

In connection with this process, a step of sizing the rotary cutting tool 536 for an external spline is based on the tool cone included angle, 2τ, determined as set forth hereinabove in connection with FIG. 9E, the part space included angle, 2α, which is chosen by the designer as being nominally 60°, and the inclination angle β. Once the angle 2τ is known, the length of the rotary tool is determined. A cap radius is established at the form diameter and the tool cone extends long enough out of the part to completely smill the spaces/slots of the part. The just stated process may produce an external spline where the adjacent structure is a shoulder and the rotary cutting tool relief extends at the inclination angle into the shoulder.

Another process for manufacturing a spline in proximity to an adjacent structure is disclosed and claimed in reference to FIG. 10 and other Figs. Referring to FIG. 10, the steps of the process include securing a workpiece having a counterbore 1020 therein and an adjacent structure 1030C in proximity to the counterbore 1020. Reference numeral 1020 is being used to generally indicate the counterbore and the internal spline formed on the inner circumference of the counterbore. The counterbore 1020 extends to a depth of the counterbore engagement surface 1020. The counterbore includes an end portion 1001 and a length as the distance from the end portion 1001 to the counterbore engagement surface 1030C. In home position, the rotary cutting tool is oriented at an inclination angle with respect to the end portion 1001 of the counterbore 1020 of the workpiece. The rotary cutting tool 536 is, of course, rotated 536R and brought into engagement with the end portion 1001 of the counterbore of the workpiece. Next, the rotating rotary cutting tool 536 moves from the end portion of the counterbore of the workpiece removing material by its cutting action along the length of the counterbore (from end 1001 to counterbore 1020) and into the adjacent structure 1030C of the workpiece forming a rotary cutting tool relief, for example, 1002R. Following creation of the rotary cutting tool relief, the rotary cutting tool is retracted from the adjacent structure of the workpiece along the angle of inclination of the rotating rotary cutting tool.

The further steps of the process include: returning the rotary cutting tool to an initial position (home position); indexing the workpiece by rotating the workpiece after creation of each tooth space; and, repeating the steps of: engaging the end portion of the counterbore of the workpiece with the rotating rotary cutting tool; moving the rotating rotary cutting tool from the end portion of the counterbore of the workpiece removing material by its cutting action along the length of the counterbore and into the adjacent structure of the workpiece forming an angular rotary cutting tool relief; and, retracting the rotary cutting tool from the adjacent structure of the workpiece along the angle of inclination of the rotating rotary cutting tool.

The just stated process may produce an internal spline and the adjacent structure may be a counterbore engagement surface and the rotary cutting tool relief extends at the inclination angle into the counterbore. In connection with this process, a step of sizing the rotary cutting tool is based on the tool cone included angle, based on the part space included angle and inclination angle. A smilling process for manufacturing an external spline is disclosed and claimed. The process includes the step of determining the load to be carried by the external spline. The load is determined by parameters of the application. Referring to FIGS. 4-4C and FIGS. 9-9B, a pitch diameter, D, is selected for the external spline based on the determined load. The number of teeth, N, are then selected such that the circular pitch, CP, is sufficiently large and that the teeth of the external spline are sufficiently large and capable of handling the specified load. A length of the external spline is then determined based on the determined load, the selected pitch diameter of the external spline, the circular pitch, CP, shear and compressive stresses on the teeth and shaft, the fit of the spline and the interengagement obtainable between the internal spline teeth and external spline teeth. Next, a tool inclination angle, $\beta$, is selected and a part space included angle, $2\alpha$, is also selected. The part space included angle is selected in a reasonable range of angles. A tool cone included angle, $2\tau$, is calculated based on an algorithm expressed in terms of $\beta$ and $\alpha$. Once the tool cone included angle $2\tau$ is known, a cap radius down to the form diameter establishes one end of the tool and the tool cone extends long enough out of the part to make a complete part.

Next, the workpiece is chucked in an appropriate endmill. Following the chucking, the workpiece is smilled creating an appropriate external space angle (tooth space) using the smilling process with the appropriately sized tool and a 5 axis Mazak endmill. The process further includes smilling an angular relief in an adjacent structure of the workpiece for clearance of the tool. Typically, the workpiece is cylindrically shaped and the adjacent structure is a shoulder. To create the smilled spline the workpiece is rotatably indexed which enables smilling a plurality of equally spaced angles (tooth spaces) about the circumference of the workpiece forming circumferentially spaced external spline teeth. The step of sizing the tool includes use of the algorithm expressed in terms of the inclination angle, $\beta$, and the part space included angle $\alpha$, to arrive at a tool cone included angle $2\tau$. Once $2\tau$ is known, a cap radius down to the form diameter establishes one end of the tool and the tool cone extends long enough out of the part to make a complete part. Typically, but not exclusively, the inclination angle, $\beta$, is preferably in the range of 30-60° and the part space angle, $\alpha$, is preferably in the range of 40-75°.

The rotary cutting tool includes a carbide cutting portion and the tool includes two straight flutes and a radius cap for creating an angular spline. A single flute may be used in an angular application. If an involute spline is desired then the cutting tool includes a plurality of involute radii to produce the appropriate space angle (tooth space) and involute teeth. Several flutes may be used to produce an involute tooth.

If a straight-sided spline is smilled, the rotary cutting tool (endmill) would approach the shape of a cylinder and the inclination angle would approach 90°. The relief smilled into an adjacent structure such as a shoulder would approach a circular path whose depth would be the diameter of the cylindrical-shaped rotary cutting tool.

A process for manufacturing an internal spline is disclosed and claimed and is similar to the process for manufacturing an external spline. The process includes the step of determining the load to be carried by the internal spline which is the same step as described above in connection with the external spline. Next, a pitch diameter of a mating external spline is selected as described above. Next, the length of the internal spline apparatus based on the determined load and the selected pitch diameter of the external spline apparatus is determined. Next, the number of teeth, N, is selected such that the circular pitch of the external spline is sufficiently large and that the teeth of the external spline are capable of handling the load. Next, an external part space included angle, $2\alpha°$ is selected and an internal part space included angle is determined using the formula,)$2\alpha°((360/N)°)$. The rotary cutting end mill tool is then sized based on the algorithm expressed in terms of the inclination angle $\beta$ and the internal part space included angle $2\alpha°-((360/N)°)$, to arrive at a tool cone included angle, $2\tau$. Once $2\tau$ is determined, then the cap radius is located at the form diameter and the other end of the tool extends far enough out of the part to ensure complete smilling of the slots/spaces. An appropriate workpiece is then chucked in a Mazak endmill or any other multiple axis commercially available endmill. The workpiece is then smilled using the rotary cutting carbide tool and an endmill producing an appropriate internal space angle in the workpiece. A rotary cutting carbide tool angular relief is then smilled in an adjacent structure of the workpiece. Typically, the appropriate workpiece includes a counterbore therein and the counterbore, in turn, has an inner circumference. To produce appropriate circumferentially spaced internal spline teeth and equally spaced appropriate internal space angles (tooth space), the workpiece is rotatably indexed which enables smilling a plurality of equally spaced appropriate internal space angles (tooth spaces) about the inner circumference of the workpiece and thus forming circumferentially spaced internal spline teeth.

REFERENCE NUMERALS

Figures 1, 1A:
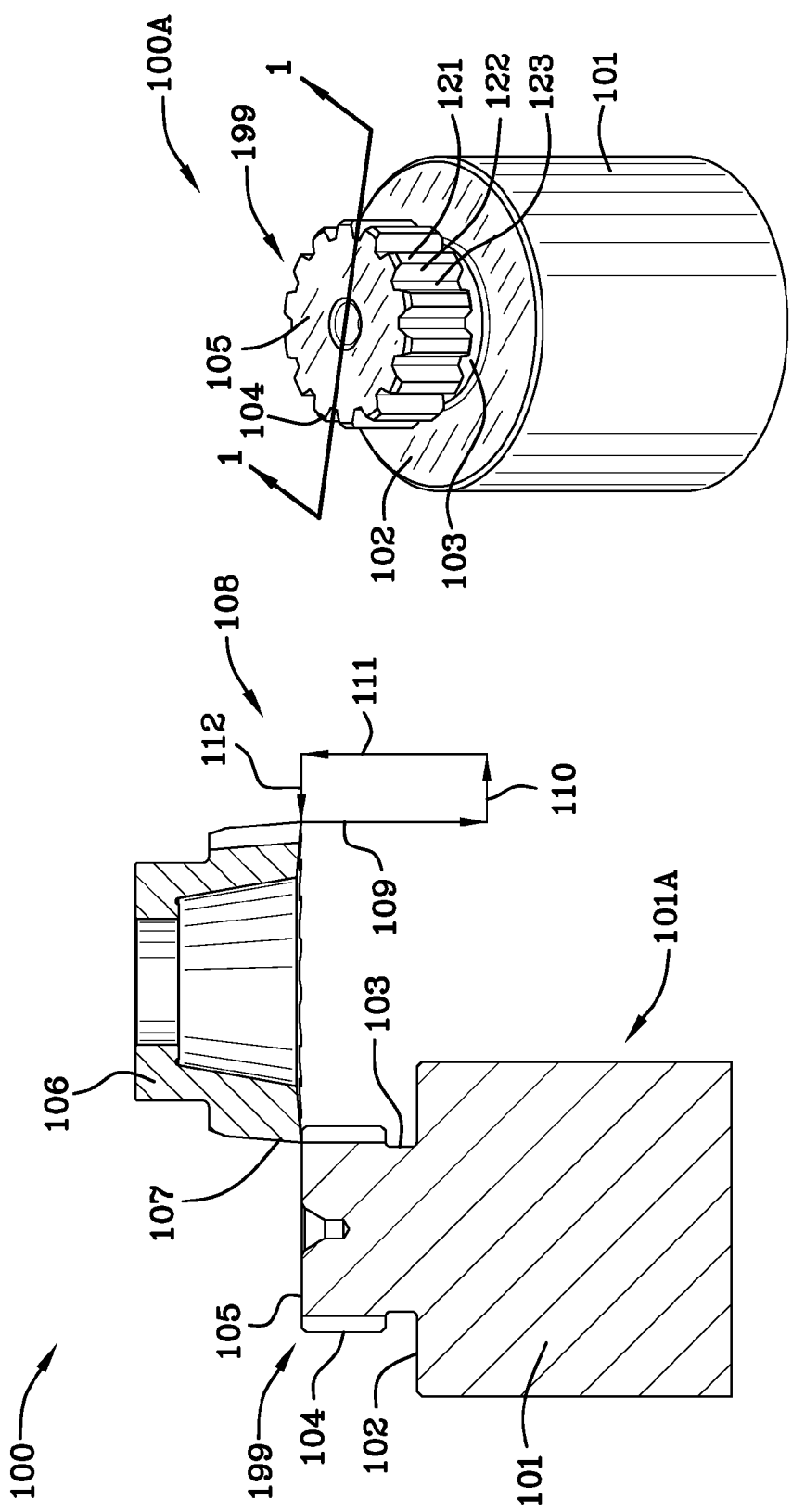
FIG. 1 is a cross-sectional diagrammatic view taken along the lines 1-1 of FIG. 1A of the prior art illustrating the base, shoulder, cylindrical external spline portion, and relief together with a traditional cutter-shaper and its operating path.
FIG. 1A is a perspective view of FIG. 1.
Figure 1C:
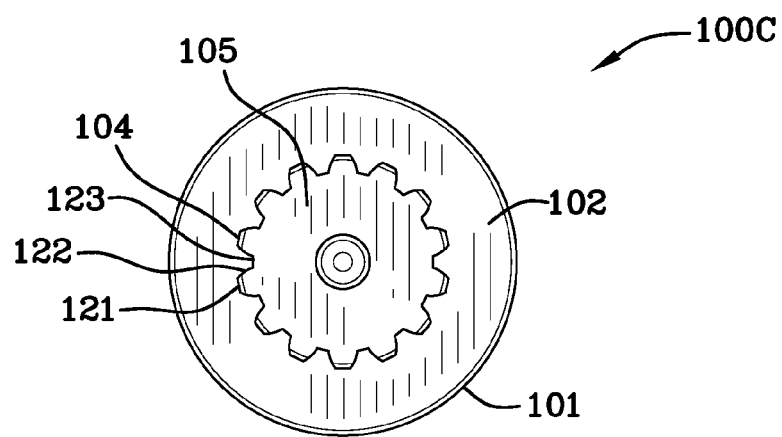
FIG. 1C is a top view of prior art FIG. 1A.
Figure 1B:
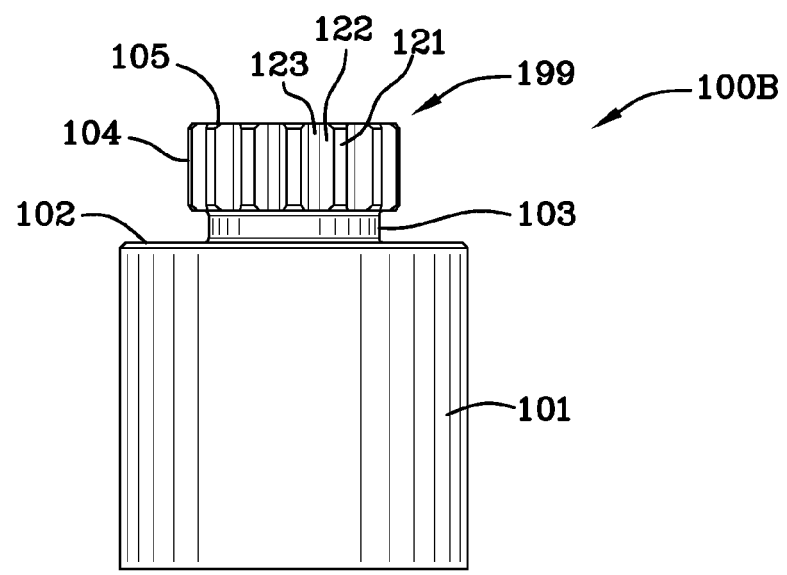
FIG. 1B is an elevation view of prior art FIG. 1A.

100—cross-sectional diagrammatic view of the prior art taken male connection member (shaft member) along the line 1-1 of FIG. 1A illustrating the base, shoulder, cylindrical external spline portion, and relief together with a traditional cutter-shaper and its operating path
100A—perspective view of prior art
100B—elevation view of prior art FIG. 1A
100C—top view of prior art FIG. 1A
101—base
101A—workpiece
102—shoulder
103—relief
104—tooth
105—top of cylindrical section
106—cutter-shaper
107—cutting blade
108—diagram of cutter motion
109—downward stroke of cutter-shaper
110—lateral or transverse stroke removing the cutter-shaper tool from the spline (workpiece)
111—longitudinal or upward stroke of the cutter-shaper tool
112—repositioning stroke moving the cutter-shaper tool in alignment
121—tooth
122—flank or side of tooth
123—fillet
199—cylindrical section
200—perspective view of the prior art illustrating the base, shoulder, cylindrical internal spline portion, and relief of the female connection member (collar member)
200A—cross-sectional view of prior art taken along the lines 2A-2A of FIG. 2
200B—top view of FIG. 2
201—base of the female connection member 201A—female connection member
202—top of the female connection member
203—relief of the female connection member
204—tooth space
205—tooth of the female connection member
206—shoulder or bottom of the female connection member
300—cross-sectional view of the male and female connection members interengaged
400—schematic of angular spline arrangement and principal terms
400A—schematic of involute spline arrangement and principal terms
400B—is a schematic of the external and internal splines of an involute spline connection apparatus manufactured using the smilling process illustrating the pitch diameter, the major and minor external diameters, the major and minor internal diameters and the circular pitch
500—a partial cross-sectional diagrammatic view of a workpiece, taken along the lines 5-5 of FIG. 5A, being machined with an angular carbide endmill to produce an external spline with reliefs cut into a shoulder portion and a base portion of the workpiece
500A—a perspective diagrammatic view of a workpiece illustrating a finished external spline on an upper cylindrical portion, and, reliefs for tool clearance cut into the intermediate shoulder and base portion
500B—a top diagrammatic view of the workpiece depicted in FIG. 5
500C—a cross-sectional view taken along the lines 5C-5C of FIG. 5B
503R, 505R, 507R, 509R, 511R, 513R, 515R, 517R, 519R, 521R, 523R, 525R, 527R, 529R–external spline relief for tool clearance
503S, 505S, 507S, 509S, 511S, 513S, 515S, 517S, 519S, 521S, 523S, 525A, 527S, 529S—tooth spaces, external space for internal mating tooth
504T, 506T, 508T, 510T, 512T, 514T, 516T, 518T, 520T, 522T, 524T, 526T, 528T, 530T—external spline teeth
531—male connection apparatus, workpiece
531A—male or external spline connection apparatus
531B—base portion of male connection apparatus
531C—cylinder portion of male connection apparatus
532—shoulder on male
535—top of cylinder
536—end mill tool, angular, straight, or involute
536A—fluted end of tool
536B—fluted end of tool
536R—arrow indicating rotation of the tool 506
537A—rotation of workpiece 501 positioning it for the next pass of tool 506
539—downward stroke/pass of end mill tool 506
540—withdrawal vector of the tool along the profile of the relief
541—vertical vector of the tool
542—positioning vector of the tool
599S—arrow to the external spline
600—a perspective schematic view of the internal spline residing in a counterbore in the workpiece, the counterbore terminating in a counterbore engagement surface
600A—a cross-sectional view taken along the lines 6A-6A of FIG. 6 illustrating the internal spline and the reliefs cut into the counterbore engagement surface and the upper portion of the workpiece
600B—a top view of the workpiece illustrated in FIGS. 6 and 6A illustrating the upper surface of the top portion of the workpiece.

602R, 604R, 604R, 508R, 610R, 612R, 614R, 616R, 618R, 620R, 622R, 624R, 626R, 628R—external spline relief for tool clearance
602S, 604S, 606S, 608S, 610S, 612S, 614S, 616S, 618S, 620S, 622S, 624A, 626S, 628S—tooth spaces, internal space for external spline mating tooth
603T, 605T, 607T, 609T, 611T, 613T, 615T, 617T, 619T, 621T, 623T, 625T, 627T, internal spline teeth
630C—counterbore engagement surface
631—base portion of female collar apparatus
631A—internal spline connection apparatus
631B—internal spline in the counterbore
632—upper portion of female collar apparatus
700—cross-sectional schematic of the male spline apparatus and the female collar apparatus completely interengaged or coupled together
700A—cross-sectional schematic of the male spline apparatus and the female collar apparatus partially interengaged or coupled together
700B—cross-sectional view of the male spline apparatus and the female collar apparatus separated apart from one another
700C—cross-sectional view taken along the lines 7C-7C of FIG. 7 illustrating the external spline of the male spline apparatus and the internal spline of the female spline apparatus in interengagement
700D—is an enlarged view of a portion of FIG. 7C
700E—a cross-sectional schematic view of both FIG. 7 shown in relation to the prior art view of FIG. 3, illustrating that the apparatus made by the smilling process has an effective face width EFs equal to the length of the spline connection, SC, and that the effective face width EF of the prior art is much smaller than EFs for the same length of the spline connection, SC
800—a front view of an example of the invention, namely, a male spline apparatus illustrating an external spline being smilled on a workpiece using an endmill tool oriented at an inclination angle of 45°.
800A—a perspective view of an example of the invention, namely, a spindle, having a male spline apparatus, including an external spline after completion of the smilling process on a workpiece.
800B—is a top view of the workpiece of FIG. 8A.
800C—a cross-sectional view of FIG. 8B taken along the lines 8C-8C of FIG. 8B.
800D—another example of the invention, namely, a workpiece similar to the workpiece illustrated in FIG. 8A, with an circumferential relief in the shoulder adjacent the external spline.
800E—a top view of FIG. 8D.
800E—a cross-sectional view taken along the lines 8F-8F of FIG. 8E.
800G—a top view taken along the lines 8G-8G of FIG. 8 illustrating the tool smilling an external space into a cylindrical portion of male spline apparatus which is capable of mating with a tooth of an internal spline.
801—base of workpiece
802—intermediate portion of workpiece
803—top of cylindrical portion of workpiece
804—shoulder on workpiece
820—tool holder
821—chuck
825—Mazak 5 axis end mill
831—spindle workpiece
832—rim of spindle
833—threaded bolt holes
834—spindle 836—adjacent shoulder
836A—adjacent shoulder
836G—groove in adjacent shoulder 836A
836C—chamfer, part of groove 836G
837—top of cylindrical portion of male spline apparatus
839T, 841T, 843T, 845T, 847T—external spline tooth
840R, 842R, 844R, 846R, 848R—tool clearance relief
840S, 842S, 844S, 846S, 848S—space angle for receiving a tooth of a mating internal spline
860—recess in the rim 831 of the spindle
869T, 871T, 873T, 875T, 877T—external spline tooth
870S, 872S, 874S, 876S, 878S—space angle for receiving a tooth of a mating internal spline
880—passageway in spindle
888, 889—workpiece chuck
897—arrow pointing to external spline of FIG. 8A
897A—external spline
900—a schematic representation of the smilling process illustrating the smilling cutter carbide tool at an inclination angle of 45° with respect to the workpiece.
900A—is a schematic representation of the smilling cutter carbide tool at an inclination angle, β, and a part space included angle, 2α, shown as part of an elliptical projection, to determine the tool cone included angle, 2τ.
900B—is a view taken along the lines of 9B-9B of FIG. 9A with the elliptical projection rotated 90° counterclockwise orienting the elliptical projection of the part space included angle with the cutting profile of tool as illustrated in FIG. 9C.
900C—is an enlarged portion of FIG. 8G illustrating the carbide smilling cutter oriented in the direction of the elliptical projection of the part space included angle.
900D—a view similar to FIG. 9 illustrating material not yet removed by smilling
900E—a schematic view of the tool, inclination angle, part space angle and an ellipse for calculating the tool cone included angle
901—direction of smilling carbide tool cutter
1000—carrier with counterbore and internal spline therein made by the smilling process
1000A—a top view of FIG. 10.
1003T, 1005T, 1007T—internal spline teeth
1002R, 1004R, 1006R, 1008R—relief in the counterbore engagement surface 1030C
1002S, 1004S, 1006S, 1008S—space angle for receiving a tooth of a mating external spline
1020—counterbore and internal spline
1030C—counterbore engagement surface
1100—a front view of the involute carbide end mill cutting tool having first and second flutes
1100A—an end view of the involute carbide end mill cutting tool
1100B—an enlargement of the surfaces of the involute end mill illustrating different radii, R1, R2 and R3
1101—length of tool, approximately 4 inches
1102—involute end mill carbide cutting tool
1103—shank diameter of tool, approximately 0.56 inches
1104—first flute
1105—second flute
1107—first cutting angle modified by radii, R1, R2, and R3
1200—front view of an angular carbide end mill cutting tool.
1200A—an end view of the angular carbide end mill cutting tool of FIG. 12.
1201—shank diameter of angular carbide end mill cutting tool, approximately 0.56 inches
1202—length of cutting tool, 4 inches
1203—tool space included angle 41.40°
1204—length of cutting surfaces, approximately 0.543 inches
1205—length of flute surfaces approximately 0.875 inches
1206, 1207—first flute
1208, 1209—second flute
B—backlash
BC—base circle, the circle from which involute spline tooth profiles are constructed
CR—root clearance
D—pitch diameter, the diameter of the pitch circle, which is determined as the ratio of the number of teeth to the diametral pitch
Db—the diameter of the base circle
CP—circular pitch, the distance along the pitch circle between corresponding points of adjacent spline teeth
$L_1$—length of external spline made by smilling process
$L_2$—length of internal spline made by smilling process
P—diametral pitch, the number of spline teeth per inch of pitch diameter
R1, R2, R3—radii on the involute end mill cutting tool 1102
TT—tooth thickness at pitch diameter
SW—space width at pitch diameter
Dfi—form internal diameter
Dfe—form external diameter
Dai—minor internal diameter
Dre—minor external diameter
Dae—major external diameter
Dri—major internal diameter
SAi—space angle, internal
SAe—space angle, external
TAi—tooth angle, internal
TAe—tooth angle, external
$C_r$—prior art annular cutter relief, equal to annular reliefs 103, 203
SC—length of spline connection
EF—effective face width length, prior art
EFs—effective face width length, smilling
FW—manufactured face width length
α—part space half angle
β—inclination angle
τ—tool cone half angle
X—coordinate on elliptical projection
Y—coordinate on elliptical projection
$W_1$=tool ellipse major semi-axis,
$W_2$=tool ellipse minor semi-axis,
Φ—pressure angle, the angle between a line tangent to an involute and radial line through the point of tangency The invention has been set forth by way of example only in accordance with the invention fully disclosed herein Changes and modifications to the examples provided herein may be made and those changes and modifications are specifically included herein and any such changes and modifications are within the scope of the appended claims.

The invention claimed is:

1. A female collar connection apparatus, comprising
a base portion and an upper portion;
a generally cylindrically shaped hub portion, said hub portion includes an internal spline therein;
said internal spline terminating in a counterbore engagement surface;
said internal spline includes a plurality of tooth spaces therein circumferentially spaced apart from each other forming a plurality of teeth between adjacent tooth spaces, said tooth spaces are formed by sides of adjacent teeth and a fillet joining said adjacent teeth; and, each of said plurality of said tooth spaces includes a spline relief portion for tool clearance extending angularly into said counterbore engagement surface.

2. A female collar connection apparatus as claimed in claim 1, wherein each of said plurality of teeth of said internal spline includes angular sides.

3. A female collar connection apparatus as claimed in claim 1, wherein each of said plurality of teeth of said internal spline includes straight sides.

4. A female collar connection apparatus as claimed in claim 1, wherein each of said plurality of teeth of said internal spline includes involute sides.

5. A female collar connection apparatus as claimed in claim 1, wherein each of said plurality of teeth of said internal spline includes full curve sides.

6. A spline connection apparatus, comprising:
a male spline apparatus, said male spine apparatus includes: a base portion, a shoulder portion and a cylindrical portion; said shoulder portion resides intermediate said base portion and said cylindrical portion; said cylindrical portion includes an external spline thereon and an upper surface, said external spline extends from said shoulder portion to said upper surface of said cylindrical portion, said external spline includes a plurality of first tooth spaces therein circumferentially spaced apart from each other forming external spline teeth between adjacent first tooth spaces, each of said first tooth spaces are formed by sides of adjacent external spline teeth and a fillet joining said adjacent external spline teeth; and, each of said plurality of said first tooth spaces includes a spline relief portion for tool clearance extending angularly and conically into said shoulder portion and said base portion of said male spline apparatus;
a female collar apparatus, said female collar apparatus includes: a base portion and an upper portion; a generally cylindrically shaped hub portion having an inner circumference, said hub portion includes an internal spline therein; said upper portion includes an upper surface; said internal spline extending from said upper surface of said upper portion and terminating in a counterbore engagement surface; said internal spline includes a plurality of second tooth spaces therein circumferentially spaced apart from each other forming internal spline teeth between adjacent second tooth spaces, said second tooth spaces are formed by sides of adjacent internal spline teeth and a fillet joining said adjacent internal spline teeth; and, each of said plurality of said second tooth spaces includes an internal spline relief portion for tool clearance extending angularly and conically into said counterbore engagement surface;
each of said plurality of external spline teeth of said external spline resides in a respective one of said plurality of said second tooth spaces of said internal spline; and,
each of said plurality of internal spline teeth of said internal spline resides in a respective one of said plurality of said first tooth spaces of said external spline.

7. A spline connection apparatus, as claimed in claim 6, wherein:
each of said plurality of said external spline teeth of said external spline may interengage two of said plurality of said internal spline teeth and wherein each of said plurality of internal spline teeth may interengage two of said plurality of said external spline teeth of said external spline.

8. A spline connection apparatus as claimed in claim 6, wherein each of said plurality of said external spline teeth of said external spline of said male spline apparatus has a first length and wherein each of said plurality of said internal spline teeth of internal spline of said hub portion of said female collar apparatus has a second length, and said first length and said second length are equal.

9. A spline connection apparatus as claimed in claim 7, wherein each of said plurality of said external spline teeth of said external spline of said male spline apparatus has a first length and wherein each of said plurality of said internal spline teeth of internal spline of said hub portion of said female collar apparatus has a second length, and said first length and said second length are equal.

10. A spline connection apparatus as claimed in claim 6 wherein said first and second lengths are the effective face width of: said external spline of said male spline apparatus; and, said internal spline of said female collar apparatus.

11. A spline connection apparatus as claimed in claim 6 wherein:
said cylindrical portion of said male spline apparatus engages said counterbore engagement surface of said generally cylindrically shaped hub portion recessed in said upper portion of said female collar apparatus; and,
said shoulder of said male spline apparatus engages said upper surface of said upper portion of said female collar portion.

12. A spline connection apparatus as claimed in claim 10 wherein:
said cylindrical portion of said male spline apparatus engages said counterbore engagement surface of said generally cylindrically shaped hub portion recessed in said upper portion of said female collar apparatus; and,
said shoulder of said male spline apparatus engages said upper surface of said upper portion of said female collar portion.

13. A spline connection apparatus as claimed in claim 6, wherein:
a portion of said plurality of said external spline teeth of said external spline teeth interengages a portion of said plurality of said internal spline teeth.

14. A spline connection apparatus as claimed in claim 6, wherein:
each of said plurality of external spline teeth of said external spline includes angular sides; and,
each of said plurality of internal spline teeth of said internal spline includes angular sides.

15. A spline connection apparatus as claimed in claim 6, wherein:
each of said plurality of external spline teeth of said external spline includes straight sides; and,
each of said plurality of internal spline teeth of said internal spline includes straight sides.

16. A spline connection apparatus as claimed in claim 6, wherein:
each of said plurality of external spline teeth of said external spline includes involute sides; and,
each of said plurality of internal spline teeth of said internal spline includes involute sides.

17. A spline connection apparatus as claimed in claim 6, wherein:
each of said plurality of external spline teeth of said external spline includes full curve sides; and,
each of said plurality of internal spline teeth of said internal spline includes full curve sides.

18. A spline connection apparatus, comprising:
a male member, said male member includes: a shoulder portion and a cylindrical portion; xsaid cylindrical portion includes an upper surface and an external spline thereon, said external spline includes a plurality of first tooth spaces therein circumferentially spaced apart from each other forming external spline teeth between adjacent first tooth spaces, each of said plurality of said first tooth spaces includes a spline relief portion for tool clearance extending angularly into said shoulder of said male member;

a female member, said female member includes: a base portion and an upper portion; a generally cylindrically shaped hub portion having an inner circumference, said hub portion includes an internal spline therein; said internal spline terminating in a counterbore engagement surface; said internal spline includes a plurality of second tooth spaces therein circumferentially spaced apart from each other forming internal spline teeth between adjacent second tooth spaces, said second tooth spaces are formed by sides of adjacent internal spline teeth and a fillet joining said adjacent internal spline teeth; and, each of said plurality of said second tooth spaces includes an internal spline relief portion for tool clearance extending angularly into said counterbore engagement surface;

said external teeth of said external spline have a first length and said internal teeth of said internal spline have a second length, said first and second lengths are equal;

said male and female members being coupled together, said shoulder portion of said male member engages said upper portion of said female member, said upper surface of said cylindrical portion of said male member engages said counterbore engagement surface of said female member, said external teeth of said external spline completely intermeshed with said internal teeth of said of said internal spline along said first length of said external teeth and said second length of said internal teeth such that the effective face width of said engagement is equal to the length of said of said external and internal teeth.

19. A spline connection apparatus, comprising:
a male member, said male member includes: a shoulder portion and a cylindrical portion; said cylindrical portion includes an upper surface; said cylindrical portion of said male member extends from said shoulder portion to said upper surface; said cylindrical portion of said male member includes an external spline having a first length extending from said shoulder portion to said upper surface;
a female member, said female member includes: a base portion and an upper portion; said upper portion includes a counterbore therein having an internal spline therein and said counterbore includes a counterbore engagement surface; said upper portion includes an upper surface; and, said internal spline having a second length extending from said upper surface of said upper portion and terminating in said counterbore engagement surface;
said male and female members being coupled together, said shoulder portion of said male member engaging said upper portion of said female member, said upper surface of said cylindrical portion of said male member engaging said counterbore engagement surface of said female member, said first length of said external spline and said second length of said internal spline being equal, said external spline completely intermeshed with said internal spline, and said effective face width of said connection is equal to said first length and said second length of said splines.

20. A male spline connection apparatus, comprising:
a base portion, a shoulder portion and a cylindrical portion;
said shoulder portion resides intermediate said base portion and said cylindrical portion;
said cylindrical portion includes an external spline thereon, said external spline includes a plurality of tooth spaces therein circumferentially spaced apart from each other forming a plurality of teeth between adjacent tooth spaces, said tooth spaces are formed by sides of adjacent teeth and a fillet joining said adjacent teeth;
each of said plurality of said tooth spaces includes a spline relief portion for tool clearance extending angularly into said shoulder portion and said base portion of said male spline connection apparatus; and,
each of said plurality of said teeth of said external spline includes involute sides.

21. A male spline connection apparatus, comprising:
a base portion, a shoulder portion and a cylindrical portion;
said shoulder portion resides intermediate said base portion and said cylindrical portion;
said cylindrical portion includes an external spline thereon, said external spline includes a plurality of tooth spaces therein circumferentially spaced apart from each other forming a plurality of teeth between adjacent tooth spaces, said tooth spaces are formed by sides of adjacent teeth and a fillet joining said adjacent teeth;
each of said plurality of said tooth spaces includes a spline relief portion for tool clearance extending angularly into said shoulder portion and said base portion of said male spline connection apparatus; and,
each of said plurality of said teeth of said external spline includes full curve sides.

* * * * *